(12) United States Patent
Koike et al.

(10) Patent No.: US 8,848,048 B2
(45) Date of Patent: Sep. 30, 2014

(54) ELECTRONIC MIRRORING SYSTEM

(75) Inventors: Hiroshi Koike, Tokyo (JP); Masanori Mori, Tokyo (JP); Noriko Matsumoto, Tokyo (JP)

(73) Assignee: Non-Grid Inc., Tokyo (JP)

( * ) Notice: Subject to any disclaimer, the term of this patent is extended or adjusted under 35 U.S.C. 154(b) by 586 days.

(21) Appl. No.: 13/120,585

(22) PCT Filed: Mar. 7, 2011

(86) PCT No.: PCT/JP2011/055269
§ 371 (c)(1),
(2), (4) Date: Jun. 7, 2011

(87) PCT Pub. No.: WO2012/120622
PCT Pub. Date: Sep. 13, 2012

(65) Prior Publication Data
US 2012/0229616 A1  Sep. 13, 2012

(51) Int. Cl.
*H04N 7/18* (2006.01)
(52) U.S. Cl.
CPC ............... *H04N 7/183* (2013.01); *H04N 7/181* (2013.01)
USPC .................................... 348/77; 348/E07.085

(58) Field of Classification Search
CPC ............................... H04N 7/183; H04N 7/181
USPC ........................................................... 348/77
See application file for complete search history.

(56) References Cited

U.S. PATENT DOCUMENTS 6,419,367 B1* 7/2002 Dion et al. ..................... 359/612
2007/0040033 A1* 2/2007 Rosenberg ............... 235/462.36

FOREIGN PATENT DOCUMENTS

| JP | 11-112970 A | 4/1999 |
| JP | 2001-025004 A | 1/2001 |
| JP | 2002-290964 A | 10/2002 |
| JP | 2009-284361 A | 12/2009 |
| JP | 4598842 B2 | 10/2010 |

OTHER PUBLICATIONS

International Search Report for International Application No. PCT/JP2011/055269.

* cited by examiner

*Primary Examiner* — Andy Rao
*Assistant Examiner* — Nguyen Truong
(74) *Attorney, Agent, or Firm* — Nath, Goldberg & Meyer; Jerald L. Meyer

(57) ABSTRACT

An electronic mirroring system comprises a mirroring unit (12) consisted of a flat panel television (10) attached a touch panel (11), a front video camera (13), a rear video camera (14), and a main unit (21). A front image and a back image are displayed on the flat panel television (10) of the mirroring unit (12) simultaneously.

15 Claims, 53 Drawing Sheets

FIG. 10

| PRESENT STATE | EVENT | TRANSITION MODE |
|---|---|---|
| (1) POWER ON | | VIDEO MODE |
| (2) VIDEO MODE | → TOUCH | → FRONT IMAGE MODE |
| (3) MIRRORING FRONT IMAGE MODE | → BACK BUTTON | → BACK IMAGE MODE |
| (4) MIRRORING FRONT IMAGE MODE | → FRONT AND BACK BUTTON | → FRONT AND BACK IMAGE MODE |
| (5) MIRRORING FRONT IMAGE MODE | → VIDEO BUTTON | → VIDEO MODE |
| (6) MIRRORING BACK IMAGE MODE | → VIDEO BUTTON | → VIDEO MODE |
| (7) MIRRORING BACK IMAGE MODE | → FRONT BUTTON | → FRONT IMAGE MODE |
| (8) FRONT AND BACK IMAGE MODE | → VIDEO BUTTON | → VIDEO MODE |
| (9) FRONT AND BACK IMAGE MODE | → FRONT BUTTON | → FRONT IMAGE MODE |
| (10) FRONT AND BACK IMAGE MODE | → BACK BUTTON | → BACK IMAGE MODE |

FIG. 11

| TRANSITION MODE | SELECTING BUTTON TABLE |
|---|---|
| VIDEO MODE | |
| MIRRORING FRONT IMAGE MODE | FRONT IMAGE BUTTON TABLE (46b) |
| MIRRORING BACK IMAGE MODE | BACK IMAGE BUTTON TABLE (46c) |
| FRONT AND BACK IMAGE MODE | FRONT AND BACK IMAGE BUTTON TABLE (46d) |
| VIDEO MODE | |
| VIDEO MODE | |
| MIRRORING FRONT IMAGE MODE | FRONT IMAGE BUTTON TABLE (46b) |
| VIDEO MODE | |
| MIRRORING FRONT IMAGE MODE | FRONT IMAGE BUTTON TABLE (46b) |
| MIRRORING BACK IMAGE MODE | BACK IMAGE BUTTON TABLE (46c) |
| | |

FIG. 12

FRONT IMAGE BUTTON TABLE 46b (a)
| TOUCH PANEL COORDINATE TGi | BUTTON NAME |
|---|---|
| x x x x | MIRRORING BACK IMAGE BUTTON |
|  | VIDEO BUTTON |
| x x x x x | MIRRORING FRONT AND BACK IMAGES BUTTON |

BACK IMAGE BUTTON TABLE 46c (b)
| TOUCH PANEL COORDINATE TGi | BUTTON NAME |
|---|---|
| x x x x | MIRRORING FRONT IMAGE BUTTON |
|  | VIDEO BUTTON |
| x x x x x | MIRRORING FRONT AND BACK IMAGES BUTTON |

FRONT AND BACK IMAGE BUTTON TABLE 46d (c)
| TOUCH PANEL COORDINATE TGi | BUTTON NAME |
|---|---|
| x x x x | MIRRORING FRONT IMAGE BUTTON |
| x x x x | MIRRORING BACK IMAGE BUTTON |
|  | VIDEO BUTTON |

THIRD FRONT IMAGE BUTTON TABLE          81a

| TOUCH PANEL COORDINATE Gi(X, Y) | BUTTON NAME | START |
|---|---|---|
| × × × | FRONT AND BACK IMAGES BUTTON | FRONT IMAGE RECORD/STOCK/COMPARISON UNIT 86 |
| × × × × | BACK IMAGE BUTTON | |
| × × | VIDEO BUTTON | |
| × × × × × | COMPARISON BUTTON | |
| × △ × × | SAVE BUTTON | |
| × × × △ | RECORD BUTTON | |
| × △ × | CANCEL BUTTON | |
| | STOCK | |
| | THUMBNAIL | |

(b)

THIRD BACK IMAGE BUTTON TABLE

| TOUCH PANEL COORDINATE Gi(X, Y) | BUTTON NAME | |
|---|---|---|
| × × × | FRONT AND BACK IMAGES BUTTON | 81b |
| × × × × | FRONT IMAGE BUTTON | |
| × × | VIDEO BUTTON | 71b |
| × × × × × | COMPARISON BUTTON | |
| × △ × × | SAVE BUTTON | |
| × × × △ | RECORD BUTTON | |
| × △ × | CANCEL BUTTON | |
| | STOCK | |
| | THUMBNAIL | |

THIRD FRONT AND BACK IMAGES BUTTON TABLE 81c

| TOUCH PANEL COORDINATE Gi(X, Y) | BUTTON NAME | START |
|---|---|---|
| × × × | FRONT IMAGE BUTTON | FRONT AND BACK IMAGES RECORD/STOCK/COMPARISON UNIT 72 |
| × × × × | BACK IMAGE BUTTON | |
| × × | VIDEO BUTTON | |
| × × × × × | COMPARISON BUTTON | |
| × △ × × | SAVE BUTTON | |
| × × × △ | RECORD BUTTON | |
| × △ × | CANCEL BUTTON | |
| | STOCK | |

(b)

SIMULTANEOUS COMPARISON BUTTON TABLE

| TOUCH PANEL COORDINATE | BUTTON NAME | |
|---|---|---|
| | FRONT AND BACK IMAGES COMPARISON | ~81d |
| | FRONT IMAGE COMPARISON | |
| | BACK IMAGE COMPARISON | |

FRONT IMAGE RECORD MODE (a)

| BUTTON NAME | BUTTON TABLE NAME | START |
|---|---|---|
| RECORD → | THIRD FRONT IMAGE BUTTON TABLE 81a → | FRONT IMAGE STILLING UNIT |

BACK IMAGE RECORD MODE (b)

| BUTTON NAME | BUTTON TABLE NAME | START |
|---|---|---|
| RECORD → | THIRD BACK IMAGE BUTTON TABLE 81b → | BACK IMAGE STILLING UNIT |

FRONT IMAGE STOCK MODE (c)

| BUTTON NAME | BUTTON TABLE NAME | START |
|---|---|---|
| FRONT STOCK → | 81c → | FRONT IMAGE STOCK UNIT |

BACK IMAGE STOCK MODE (d)

| BUTTON NAME | BUTTON TABLE NAME | START |
|---|---|---|
| STOCK → | 81b → | BACK IMAGE STOCK UNIT |

FRONT IMAGE COMPARISON MODE (e)

| BUTTON NAME | BUTTON TABLE NAME | START |
|---|---|---|
| COMPARISON → | 81a → | FRONT IMAGE COMPARISON UNIT |

BACK IMAGE COMPARISON MODE (f)

| BUTTON NAME | BUTTON TABLE NAME | START |
|---|---|---|
| COMPARISON → | 81b → | BACK IMAGE COMPARISON UNIT |

FRONT AND BACK IMAGES STOCK MEMORY    82

| STOCK FILE NUMBER STfi | STOCK COORDINATE STGi | STOCK NUMBER Sgi | FRONT IMAGE FILE NUMBER Mfi | FRONT STOCK IMAGE | BACK IMAGE FILE NUMBER Bfi | BACK STOCK IMAGE |
|---|---|---|---|---|---|---|
| ○○○ | ××× | " | ×△× | $SZMk_1$ | △×△ | $SZBk_1$ |
| ○×○ | ××× | " | ×○× | $SZMk_2$ | ○△× | $SZBk_2$ |
| ⋮ | ⋮ | ⋮ | ⋮ | ⋮ | ⋮ | ⋮ |

↑ UPDATE (b)

FRONT IMAGES STOCK MEMORY    83

| STOCK FILE NUMBER SFi | Sgi | MEMORY DISPLAY AREA COORDINATE STGi | FRONT IMAGE FILE NUMBER Mf | FRONT STOCK IMAGE |
|---|---|---|---|---|
| ○○○○ |  | ××× | ××× | $SMk_1$ |
| ○××○ |  | ××× | ×××× | $SMk_2$ |
| ⋮ | ⋮ | ⋮ | ⋮ | ⋮ |

↑ UPDATE (c)

BACK IMAGES STOCK MEMORY    84

| STOCK FILE NUMBER SFi | Sgi | MEMORY DISPLAY AREA COORDINATE STGi | BACK IMAGE FILE NUMBER Bfi | BACK STOCK IMAGE SBki |
|---|---|---|---|---|
| ○×○○ |  | ××× | ××××× | $SBk_1$ |
| △××× |  | ××× | ×××××× | $SBk_2$ |
| ⋮ | ⋮ | ⋮ | ⋮ | ⋮ |

↑ UPDATE

FIG. 31

(a) FRONT AND BACK STILL IMAGES MEMORY 85

| FRONT STILL IMAGE ZMhi FILE NUMBER Mfi | IMAGE | BACK STILL IMAGE FILE NUMBER Bfi | IMAGE |
|---|---|---|---|
| ×△× | FRONT STILL IMAGE ZMk1 | △×△ | BACK STILL IMAGE ZBk1 |
| ×○× | FRONT STILL IMAGE ZMk2 | ○△× | FRONT STILL IMAGE ZBk2 |
| --- | --- | --- | --- |

(b) FRONT STILL IMAGES MEMORY 78

| FRONT STILL IMAGE Mki FILE NUMBER Mfi | IMAGE |
|---|---|
| ××× | FRONT STILL IMAGE Mk1 |
| ×××× | FRONT STILL IMAGE Mk2 |
| --- | --- |

(c) BACK STILL IMAGES MEMORY 79

| BACK STILL IMAGE Bki FILE NUMBER Bfi | IMAGE |
|---|---|
| ××××× | BACK STILL IMAGE Bk1 |
| ×××××× | BACK STILL IMAGE Bk2 |
| --- | --- |

FIG. 48
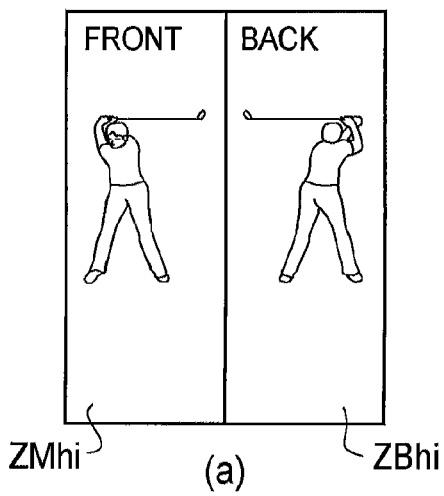
(a)  ZMhi  ZBhi
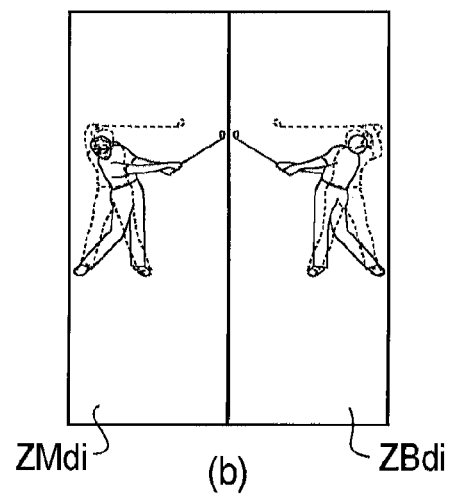
(b)  ZMdi  ZBdi
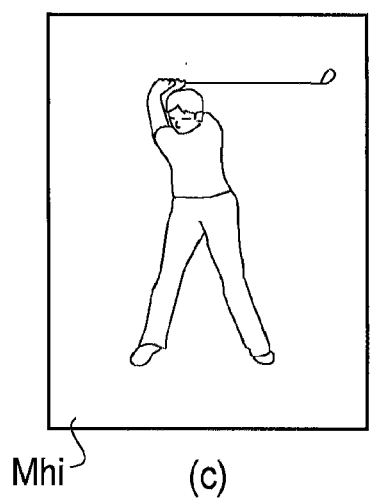
Mhi  (c)
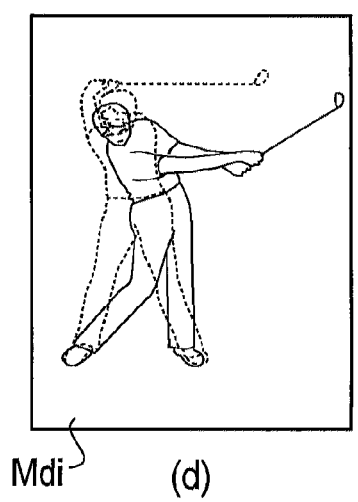
Mdi  (d)
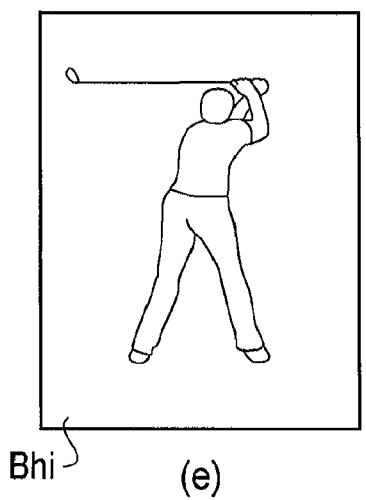
Bhi  (e)
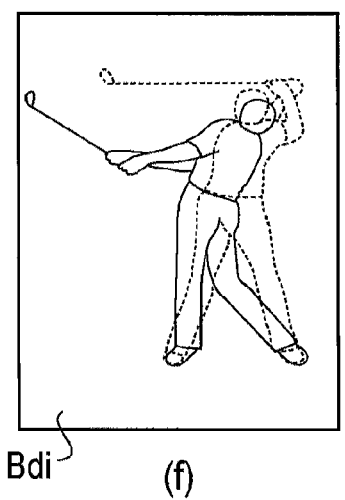
Bdi  (f)

FIG. 49
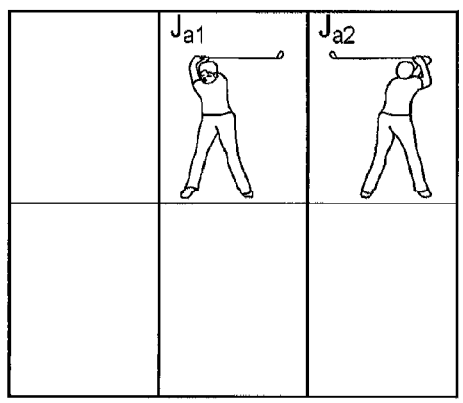
(a)
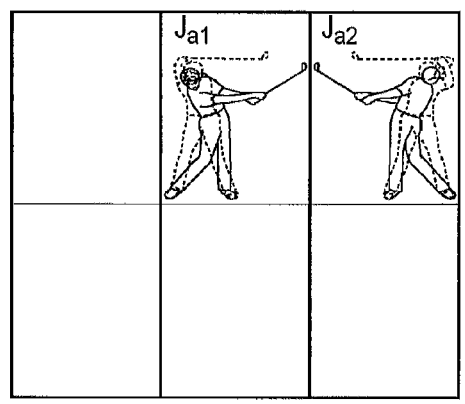
(b)
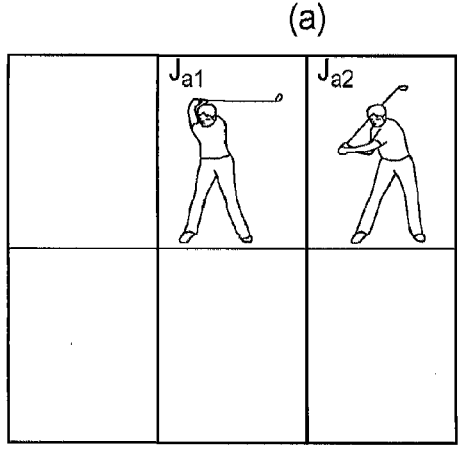
(c)
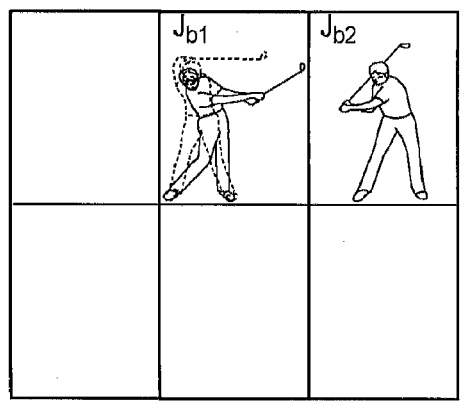
(d)
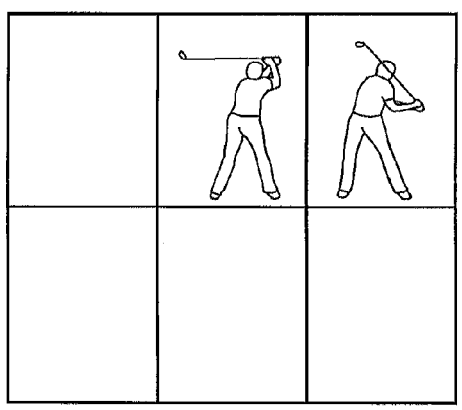
(e)
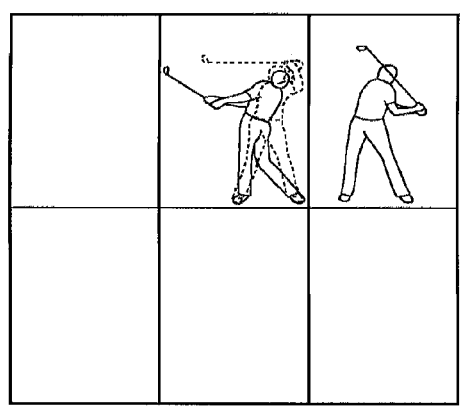
(f)

ELECTRONIC MIRRORING SYSTEM

This is a National Phase Application filed under 35 USC 371 of International Application No. PCT/JP2011/055269, filed on Mar. 7, 2011, the content of which is hereby incorporated by reference in its entirety.

TECHNICAL FIELD

The present invention relates to an electronic mirroring system that displays the images recorded from several directions on a display in a user's demanded direction.

BACKGROUND ART

Recently, there are the electronic mirroring devices to provide same visual sense with a general mirror by displaying the images of the subject recorded with a camera on the display in place of the mirror due to the high speed image processing technique.

For instance, Patent Literature 1 discloses a monitor screen placed at a mirror of a wash stand with video cameras arranged on the right side and the left side of the monitor screen in order to display a front image of a user stood in front of the wash stand regardless the user's height while showing the weather forecast, and so on simultaneously.

On the other hand, some shops in the apparel industry install the electronic mirroring device because of displaying the front image of the subject recorded with a camera on the display instantaneously (refer to Patent Literature 2).

CITATION LIST

Patent Literature

PTL 1: Japanese Patent No. 3505575
PTL 2: Japanese Patent No. 4598842

SUMMARY OF INVENTION

TECHNICAL PROBLEM

Patent Literature 1 and Patent Literature 2 disclose the electronic mirroring device to display the images recorded the front of the subject on the display (a monitor, or a flat panel television). Therefore the electronic mirroring device is not able to display a back image of the subject unless the subject turns around to record the back image.

In Patent Literature 2, the back image is possible to be displayed on the display by storing the back image (a still image) recorded with the camera when the subject turns around.

That is, the back image is not able to display unless the user turns around to show the back toward the camera arranged on the side of the display in Patent Literature 2. The problem is that the action is troublesome for the user as the subject.

Moreover, the user may want to display a wearing image of a pair of shoes at the same time when the user tries on the shoes. The user may also want to display a side image at the same time (so called the multi-direction view).

However, the electronic mirroring device disclosed in Patent Literature 1 and Patent Literature 2 records the images from the front side only so that the electronic mirroring device is not able to carry out the user's demand.

The present invention provides the electronic mirroring system to display the images of the multi-direction view (a back, a front, a side, or a part) at the same time.

Solution to Problem

A summary of the present invention is an electronic mirroring system for interlockingly displaying images of a person as a subject taken from multiple directions, the electronic mirroring system comprising: a mirroring unit including a display of i pixels in length by m pixels in width and a touch panel provided on the display, the mirroring unit being arranged in front of the subject; a front video camera having a CCD of i pixels in length by m pixels in width and a wide-angle control for widening a view angle and being arranged on a side of the mirroring unit for taking a front image of the subject, the front video camera being configured to output a frame of an image taken without the wide-angle control as a first front image and another frame of an image taken with the wide-angle control as a second front image; a rear video camera having a CCD of i pixels in length by m pixels in width and a wide-angle control for widening a view angle and being arranged behind the subject for taking a back image of the subject, the rear video camera being configured to output a frame of an image taken without the wide-angle control as a first back image and another frame of an image taken with the wide-angle control as a second back image; a first means for capturing the first front image or the second front image outputted from the front video camera; a second means for capturing the first back image or the second back image outputted from the rear video camera; a third means for outputting to the mirroring unit and displaying the first front image on the display while stopping input of the first back image or the second back image; a fourth means for sending a wide-angle control signal to the front video camera and the rear video camera in order to widen view angles while canceling the stopping of the input by the third means in response to an instruction for interlocking display of the front image and the back image; a fifth means for extracting an image of a first range including the subject therein from the second front image and outputting the extracted image as an extracted front image in response to the instruction for interlocking display; a sixth means for extracting an image of a second range including a back of the subject therein from the second back image and outputting the extracted image as an extracted back image in response to the instruction for interlocking display; a seventh means for changing the extracted front image outputted from the fifth means to a size of e pixels in length by h pixels in width smaller than the size of i pixels in length by m pixels in width of the display and displaying the changed image as a mirroring front image on a first area in the display; and a eighth means for changing the extracted back image outputted from the sixth means to a size of r pixels in length by s pixels in width smaller than the size of i pixels in length by m pixels in width of the display and displaying the changed image as a mirroring back image on a second area different from the first area in the display.

Advantageous Effects of Invention

According to the present invention, it is possible to display the front image and the back image of a person as the subject on the display of i pixels in length by m pixels in width by enlarging the images as large as possible.

BRIEF DESCRIPTION OF DRAWINGS

FIG. 1 is an outline view of the electronic mirroring system according to the embodiment of the present invention.

FIG. 2 is an explanatory drawing to show the interlocking display of the mirroring front image and the mirroring back image by the electronic mirroring system according to the embodiment of the present invention.

FIG. 3 is a side view of the electronic mirroring system according to the embodiment 1 of the present invention.

FIG. 4 is a front view of the mirroring unit.

FIG. 5 is a top view of the electronic mirroring system according to the embodiment 1.

FIG. 6 is a top view of the electronic mirroring system according to the embodiment 1.

FIG. 7 is an outline block diagram of a main unit according to the embodiment 1.

FIG. 8 is an explanatory drawing to show a display area on the flat panel television.

FIG. 9 is an outline block diagram of a first image/button transition management unit.

[FIG. 10] FIG. 10 is an explanatory drawing to explain the operation of a mode determining unit.

[FIG. 11] FIG. 11 is an explanatory drawing to explain the operation of a button storing unit.

[FIG. 12] FIG. 12 (a) to (c) is an explanatory drawing to explain a button table.

FIG. 13 is an explanatory drawing to explain a display image selecting unit.

FIG. 14 is a flow chart to explain an outline process of the electronic mirroring system according to the embodiment 1.

FIG. 17 is an explanatory drawing to explain the display of the mirroring front image according to the embodiment 1.

FIG. 18 is an explanatory drawing of an example of the simultaneous display by a front and back images mode process.

FIG. 19 is an explanatory drawing of an example of the display by a back image mode process.

FIG. 22 is an outline block diagram of the electronic mirroring system according to the embodiment 2 of the present invention.

FIG. 24 is an outline block diagram of the electronic mirroring system according to the embodiment 3 of the present invention.

[FIG. ]

[FIG. 26] FIG. 26 (a), (b) is an explanatory drawing of a third transition table.

[FIG. 27] FIG. 27 (a), (b) is an explanatory drawing of the third transition table.

[FIG. 29] FIG. 29 (a) to (f) is an explanatory drawing to explain each mode process according to the embodiment 3.

[FIG. 30] FIG. 30 (a) to (c) is an explanatory drawing to explain each image stock memory.

[FIG. 31] FIG. 31 (a) to (c) is an explanatory drawing to explain each image memory.

FIG. 32 is an outline block diagram of a front and back images record/stock/comparison unit.

FIG. 33 is a flow chart to explain the process of the electronic mirroring system according to the embodiment 3.

FIG. 34 is a flow chart to explain the process of the electronic mirroring system according to the embodiment 3.

FIG. 35 is an explanatory drawing to explain an example of the display by a front and back images mode process according to the embodiment 3.

FIG. 36 is an explanatory drawing to explain an example of the display by the front and back images mode process according to the embodiment 3.

FIG. 37 is an explanatory drawing to explain an example of the display by the front and back images mode process according to the embodiment 3.

FIG. 38 is an explanatory drawing to explain an example of the display by the front and back images mode process according to the embodiment 3.

FIG. 39 is an explanatory drawing to explain an example of the display by a comparison mode process according to the embodiment 3.

FIG. 40 is an explanatory drawing to explain an example of the display by the comparison mode process according to the embodiment 3.

FIG. 42 is an outline block diagram of the electronic mirroring system according to the embodiment 4 of the present invention.

FIG. 43 is an outline block diagram of the electronic mirroring system according to the embodiment 5 of the present invention.

FIG. 44 is an explanatory drawing to explain an example of the unit image display by the electronic mirroring system according to the embodiment 5.

FIG. 45 is an explanatory drawing to explain an example of the unit image display by the electronic mirroring system according to the embodiment 5.

FIG. 46 is an explanatory drawing to explain an example of the unit image display by the electronic mirroring system according to the embodiment 5.

FIG. 47 is an outline block diagram of the electronic mirroring system according to the embodiment 6 of the present invention.

[FIG. 48] FIG. 48 (a) to (f) is an explanatory drawing of an example of the moving images display by the electronic mirroring system according to the embodiment 6.

[FIG. 49] FIG. 49 (a) to (f) is an explanatory drawing of an example of the moving images display by the electronic mirroring system according to the embodiment 6.

FIG. 50 is an outline view of the electronic mirroring system according to the embodiment 7 of the present invention.

FIG. 52 is an explanatory drawing of the electronic mirroring system according to other embodiments.

FIG. 53 is an explanatory drawing of the electronic mirroring system according to other embodiments.

DESCRIPTION OF EMBODIMENTS

Figure 1:
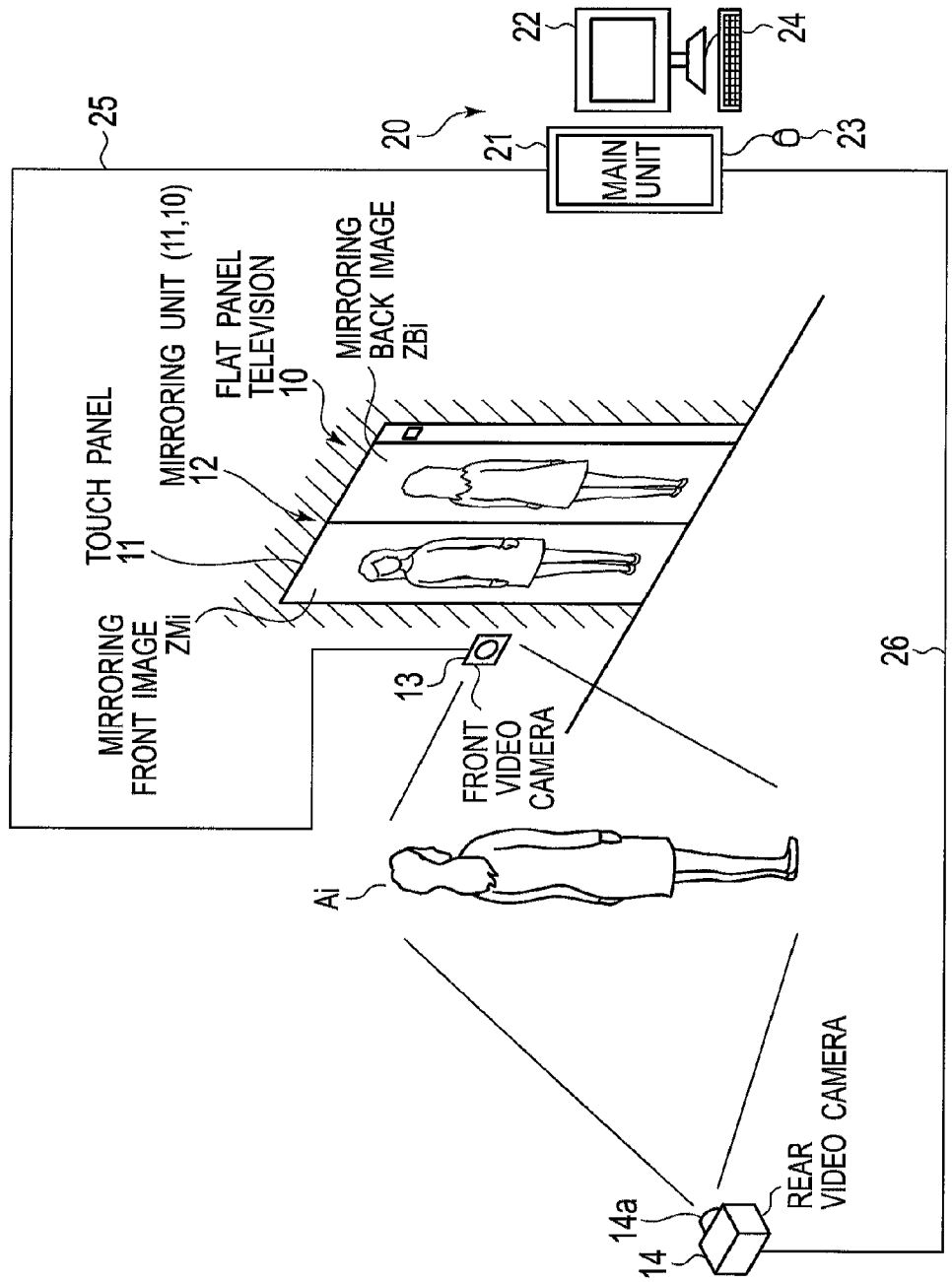
[FIG. 1]

The embodiments of the present invention are explained in detail by referring to the drawings.

However, the drawings show a typical composition of the device and the system. It should be noted that the composition shown in the drawings may be different from the actual one. Therefore, a concrete composition should be defined by taking the following explanations into consideration. Moreover, it is obvious that some units of the composition may be different among the drawings.

Moreover, the following embodiments of the present invention illustrate the device and the method in order to realize the technical thought of the present invention and not to limit the materials, the shapes, the structures, and the arrangements to the following illustrated ones in the present invention. Technical thought of the present invention may be modified by adding various changes in a technical range described in the claims.

The electronic mirroring system (or a multi-direction view electronic mirroring system) of the embodiments can be used at the places such as a clothing store, a photo studio, a game shop, a lobby in a company, an optician, an elevator, a beauty parlor, a hotel, a house, a facility in an airport and so on.

FIG. 1 is an outline view of the electronic mirroring system according to the embodiment. The electronic mirroring system shown in FIG. 1 comprises a mirroring unit 12 (or a display unit) composed of a flat panel television 10 (a liquid crystal display or a plasma display (PDP)) and a touch panel 11 (electrostatic type, piezoelectric type, etc) attached on the flat panel television 10, and a video camera 13 (or a front video camera 13) arranged on a side (a right side, a left side or an upper side) of the mirroring unit 12.

The touch panel 11 outputs X and Y coordinates of a touched position (touch panel coordinates TGi) when the touch panel 11 is touched.

Figure 2:
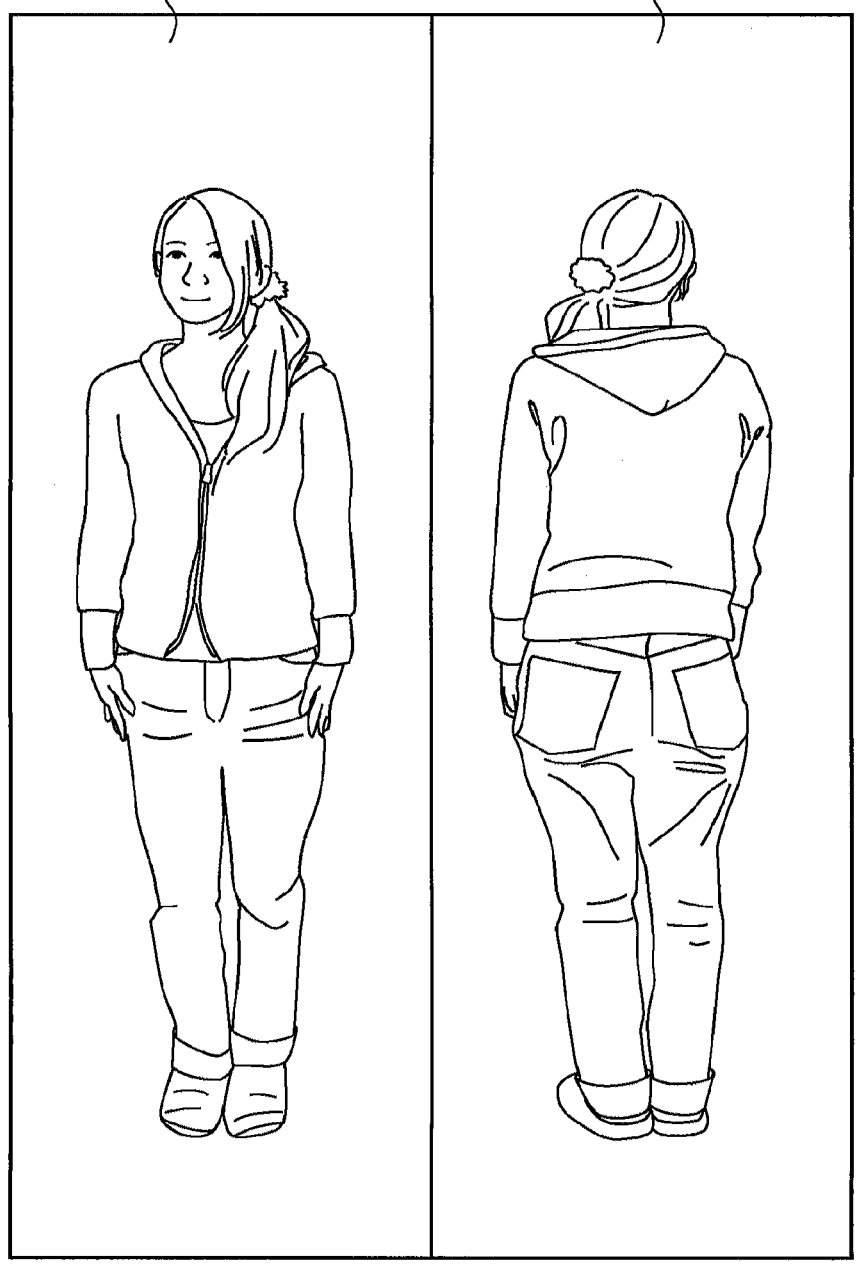
[FIG. 2]

The electronic mirroring system further comprises a video camera 14 (or a rear video camera 14) placed behind a subject Ai and an electronic mirroring device 20 (a main unit 21, a display device 22 and a mouse 23 are included). As shown in FIG. 2, the flat panel television 10 (a monitor) of the mirroring unit 12 is able to display both the front image and the back image at the same time (or a simultaneous display mode).

In case of the simultaneous display mode, a mirroring front image ZMi created by applying a size correction process described later to the image of the front of the subject Ai recorded with the front video camera 13 and a mirroring back image ZBi created by applying a glare eliminating process and the size correction process described later to the image of the back of the subject Ai recorded with the rear video camera 14 are displayed at the same time.

When the subject Ai is recorded from the back side with the rear video camera 14, the recorded image may contain the flat panel television 10 so that the image recorded with the rear video camera 14 may have a "glare" part (or a halation part). To avoid the "glare", a polarizing filter 14a may be set on the lens of the rear video camera 14.

The mirroring image is a moving image. The main unit 21 of the electronic mirroring device 20 in the embodiment uses a high-speed CPU and hardware circuits. Therefore, the image of the subject Ai is displayed on the flat panel television 10 instantaneously like a mirror when the subject Ai stands in front of the mirroring unit 12. The moving images recorded with the video cameras and displayed on the flat panel television 10 are called the mirroring images.

In the embodiment, the mirroring images displayed on the flat panel television 10 in the simultaneous display mode are called the mirroring front image ZMi and the mirroring back image ZBi.

Moreover, the mirroring image displayed on the flat panel television 10 in the front image mode is called the mirroring front image Mi, and the mirroring image in the back image mode is called the mirroring back image Bi.

The main unit 21 is included in each embodiment described later, and the sign for the main unit 21 is not changed for explanation.

The flat panel television 10 in the mirroring unit 12 is the plasma display (PDP) or the liquid crystal display of about 50 inches size (about 1920 pixels in length by 1080 pixels in width) in the embodiment. The mirroring unit 12 may be put in the wall, or arranged on the wall.

Figure 3:
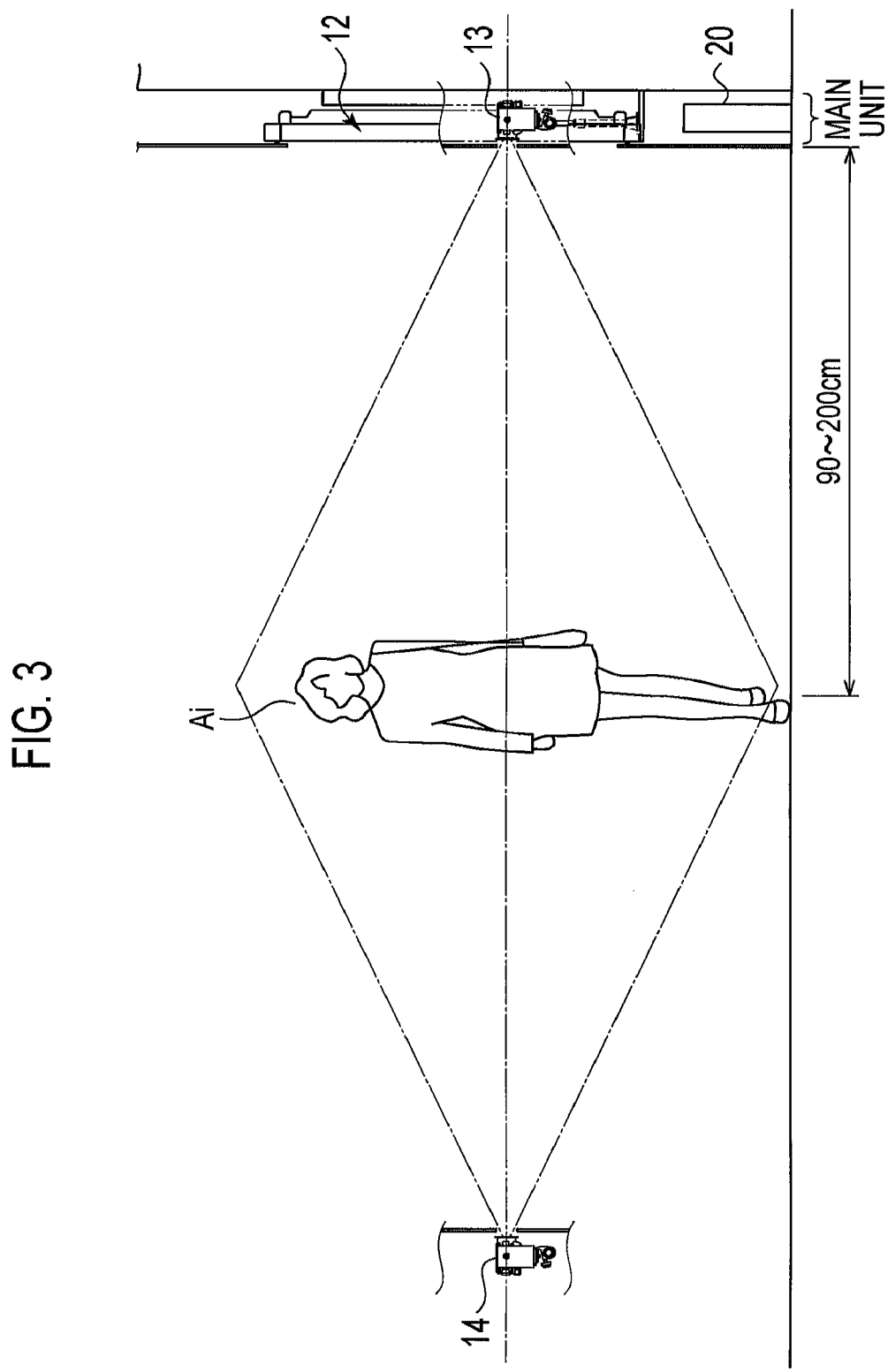
[FIG. 3]
Figure 4:
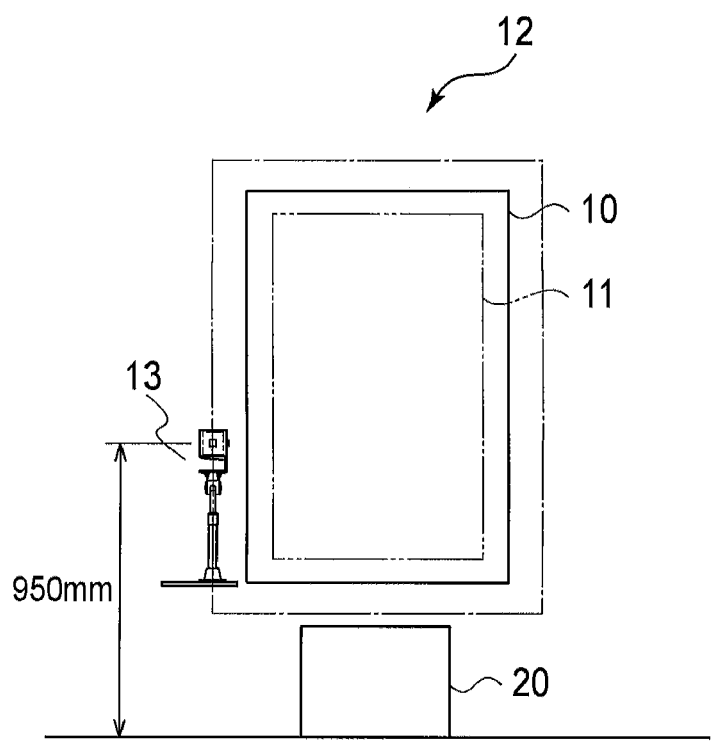
[FIG. 4]
Figure 5:
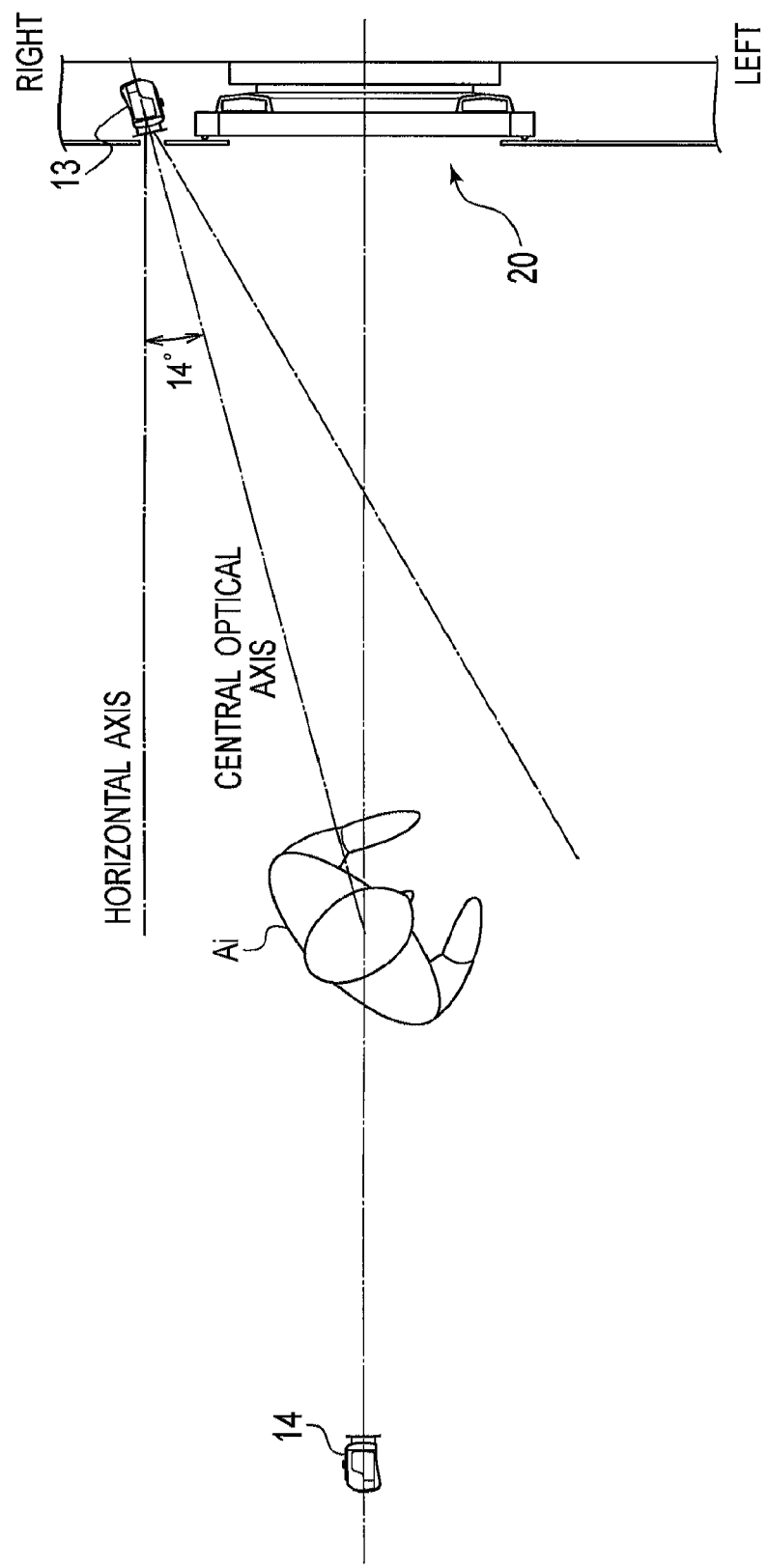
[FIG. 5]

FIG. 3 is a side view of the electronic mirroring system according to the embodiment 1. FIG. 4 is a front view of the mirroring unit. FIG. 5 is a top view of the electronic mirroring system according to the embodiment 1.

As shown in FIG. 3, the distance between the front video camera 13 and the subject Ai may be about from 150 centimeters to 200 centimeters. About 150 centimeters is preferable for recording the whole figure and about 50 centimeters is preferable for recording the head. The electronic mirror device 20 is put under the mirroring unit 12.

In addition, the distance between the rear video camera 14 and the subject Ai may be about from 150 centimeters to 200 centimeters. About 150 centimeters is preferable for recording the whole figure and about 80 centimeters is preferable for recording the head.

As shown in FIG. 4, the front video camera 13 is arranged at the right side of the mirroring unit 12 in designated height (About 950 millimeters) and direction.

As shown in FIG. 5, the front video camera 13 (with a resolution of 1920 pixels in length by 1080 pixels in width) is arranged to incline the central optical axis about 14 degrees to the horizontal axis.

In addition, as shown in FIG. 5, the rear video camera 14 (with a resolution of 1920 pixels in length by 1080 pixels in width) is arranged behind the subject Ai to aim the central optical axis at the center of the mirroring unit 12.

The rear video camera 14 may be put in the wall (or arranged on the wall), or placed on a tripod (not shown).

The height of the front video camera 13 and the rear video camera 14 is adjustable to about 950 millimeters for the Japanese (for instance, person of 1650 millimeters in height), and to about 1000 millimeters, 1050 millimeters, or 1010 millimeters in the countries of tall persons.

Figure 6:
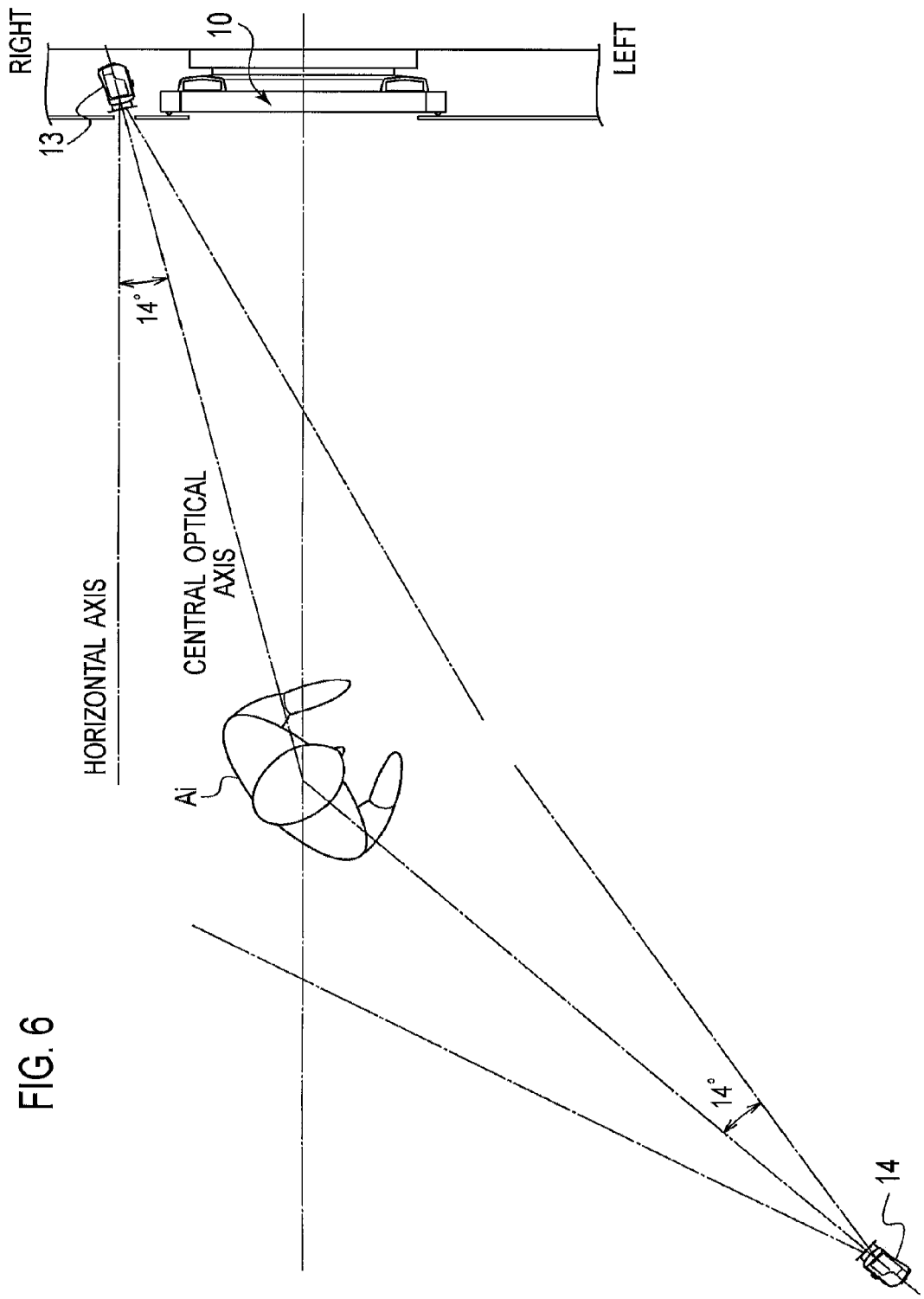
[FIG. 6]

As shown in FIG. 6, the rear video camera 14 may be arranged on the left side of the mirroring unit 12 (in view of the mirroring unit 12) and behind the subject Ai to incline the central optical axis about 14 degrees to the horizontal axis. Then the rear video camera 14 is not displayed on the flat panel television 10.

Embodiment 1

Figure 7:
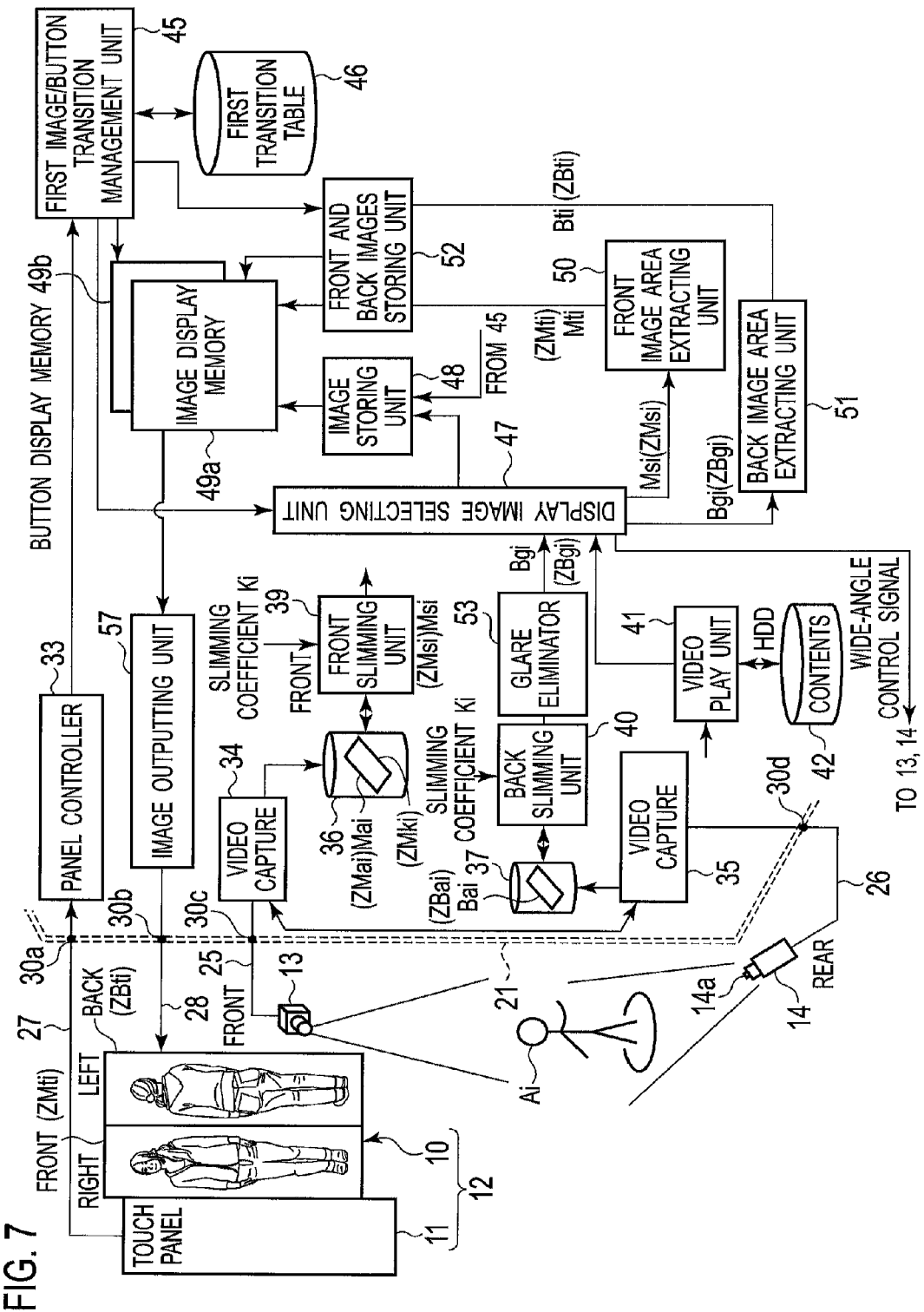
[FIG. 7]

FIG. 7 is an outline block diagram of the main unit 21 according to the embodiment 1.

As shown in FIG. 7, the main unit 21 comprises a panel controller 33, a video capture 34 (or a front video capture 34) to capture the images recorded with the front video camera 13, and a video capture 35 (or a back video capture 35) to capture the images recorded with the rear video camera 14.

The front video camera 13 and the back video camera 14 have a color CCD with a resolution of i by m pixels and are controlled to widen an angle of view by a control signal (or a wide-angle control signal) sent from the outside (an automatic wide-angle control function).

In FIG. 7, the image output from the front video capture 34 is called a front image Mai (or a recorded front image), and the image output from the back video capture 35 is called a back image Bai (or a recorded back image).

The panel controller 33 is connected to the touch panel 11 with a cable 27 through a connector 30a. And the front video capture 34 is connected to the front video camera 13 with a cable 25 through a connector 30c. The back video capture 35 is connected to the rear video camera 14 with a cable 26 through a connector 30d.

The main unit 21 is connected to the flat panel television 10 with a cable 28 through a connector 30b.

Moreover, the main unit 21 comprises an image buffer memory 36 (or a front image buffer memory 36) for storing the front image Mai outputted from the front video capture 34, an image buffer memory 37 (or a back image buffer memory 37) for storing the back image Bai outputted from the back video capture 35, a front slimming unit 39, a back slimming unit 40, a hard disk 42 for storing video contents, a first image/button transition management unit 45, a display image selecting unit 47, an image display memory 49a, a button display memory 49b, an image storing unit 48, a back image area extracting unit 51, a front image area extracting unit 50, a glare eliminator 53, and so on.

Figure 8:
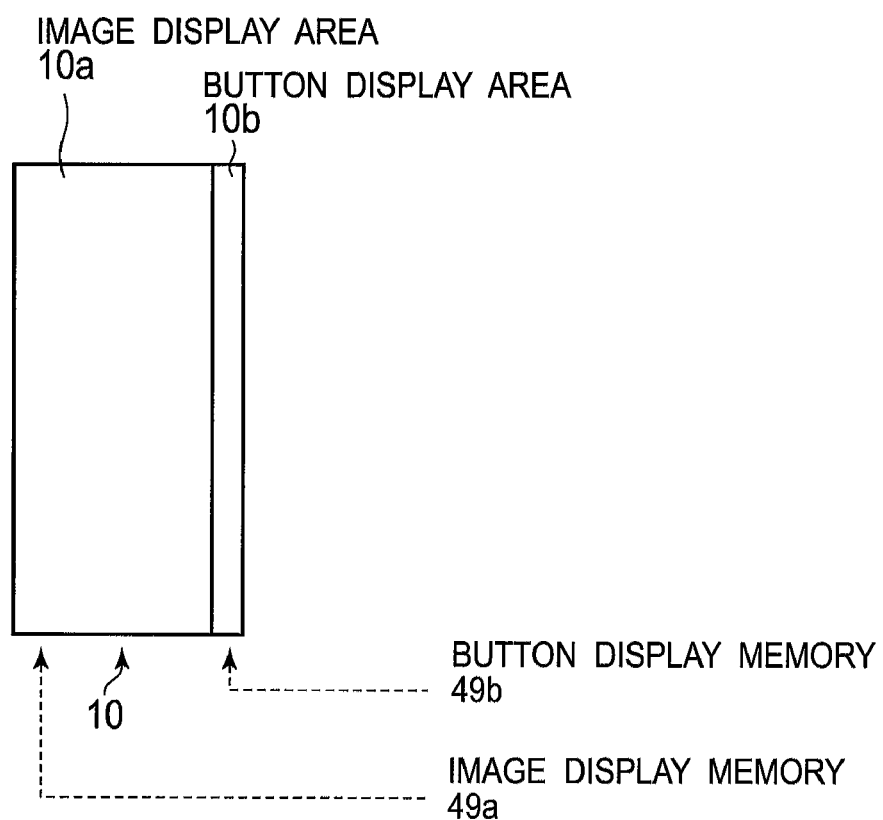
[FIG. 8]

As shown in FIG. 8, the image display memory 49a is a memory for displaying images on an image display area 10a in the flat panel television 10, and the button display memory 49b is a memory for displaying the buttons on a button display area 10b.

In FIG. 7, the image processed by the front slimming unit 39 is called a front image Msi, and the image processed by the back slimming unit 40 is called a back image Bgi.

Moreover, the image extracted by the front image area extracting unit 50 is called a front image Mti, and the image extracted by the back image area extracting unit 51 is called a back image Bti.

In addition, the images recorded with the video cameras (13 and 14) controlled to widen the angle of view are distinguished from other images by putting the sign Z in the simultaneous display mode.

That is, the image outputted from the front video capture 34 is called a front image ZMai, the image processed by the front slimming unit 39 is a front image ZMsi, and the image extracted by the front image area extracting unit 50 is a front image ZMti.

The image outputted from the back video capture 35 is called a back image ZBai, the image processed by the back slimming unit 40 is a back image ZBsi, the image through the glare eliminator 53 is a back image ZBgi, and the image extracted by the back image area extracting unit 51 is a back image ZBti.

The main unit 21 has a central information processing unit (CPU) consisted of a processor, a microcomputer, logics, and registers, an external communication channel, a read only memory (ROM) and a random access memory (RAM) for storing an operating system and application programs to be run by the central information processing unit.

The front slimming unit 39, the back slimming unit 40, the first image/button transition management unit 45, the display image selecting unit 47, the image storing unit 48, the back image area extracting unit 51, the front image area extracting unit 50, the glare eliminator 53 (the video captures may be included) shown in FIG. 7 are the application programs and are illustrated by a rectangle in the block diagram.

(Explanation of Each Unit)

The front video capture 34 stores color image signals (a image, a recorded date, a camera code, . . . : a supplementary information) per one frame sent from the front video camera 13 in the front image buffer memory 36 (or a first memory) by converting to a computer readable form linking with the image (the front image Mai or the front image ZMai).

The back video capture 35 stores color image signals (a image, a recorded date, a camera code, . . . : a supplementary information) per one frame sent from the back video camera 14 in the back image buffer memory 37 (or a second memory) by converting to the computer readable form linking with the image (the back image Bai or the back image ZBai).

The front video capture 34 and the back video capture 35 synchronize the recordings of the front video camera 13 and the rear video camera 14.

The front slimming unit 39 outputs the slimming front image ZMsi to the display image selecting unit 47 by slimming the front image Mai (or ZMai) of the front image buffer memory 36 based on a designated slimming coefficient Ki (for instance, zero percent reduction in length and three percents reduction in width).

The back slimming unit 40 outputs the slimming back image ZBsi to a following unit by slimming the back image Bai (or ZBai) of the back image buffer memory 37 based on the designated slimming coefficient Ki (for instance, zero percent reduction in length and three percents reduction in width).

The glare eliminator 53 and the polarizing filter 14a may not be required.

For example, the glare eliminator 53 eliminates an irregular brightness from the back image Bsi (or ZBsi) after the steps of applying the Fourier transform to the image, removing the regular periodic component caused by the pixels of the surface, and evaluating the glare by applying the inverse Fourier transform.

A video play unit 41 plays the video images stored in the hard disk (HDD) 42. The some video images are stored in the HDD 42. A video menu (not shown) is displayed on the mirroring unit by switching on by the video play unit 41. When one of the videos is selected, the selected video image (for instance, scenery, a scene of a town, or a concert, and so on) is displayed as an initial display after the system is started.

The panel controller 33 supplies X and Y axis drive signal to the touch panel 11 and outputs the touch panel coordinates (Xi,Yi) of the touched position in the touch panel 11 to the first image/button transition management unit 45.

The first image/button transition management unit 45 manages the present image displayed on the flat panel television 10, and determines the next image to be displayed be referring to the first transition table 46 described later when the touch panel coordinates are inputted. The determined result is outputted to the display image selecting unit 47, and one of the front image Mi, the back image Bi, the video image, or both the front image ZMi and the back image ZBi is displayed.

Moreover, the first image/button transition management unit 45 stores the button image in the button display memory 49b for the button display area 10b (the memory corresponding to the left side of the display of the flat panel television) when the touch panel coordinates TGi are inputted.

In addition, the first image/button transition management unit 45 instructs the image storing unit 48 to store the image in the image display memory 49a to display on a full area (i by m) when the video image, the front image Mi, or the back image Bi is determined to be displayed (so called the video mode, the front image mode, or the back image mode respectively).

The first image/button transition management unit 45 instructs the front and back images storing unit 52 to store the images in the image display memory 49a to display the front image ZMti on a half area and the back image ZBti on another half area when both the front image ZMi and the back image ZBi are determined to be displayed.

The display image selecting unit 47 outputs the front image Msi, the back image Bsi, or the video image to the image storing unit 48 corresponding to the determined result of the first image/button transition management unit 45. When the simultaneous display of the front and back images mode is determined, the display image selecting unit 47 outputs the front image ZMsi to the front image area extracting unit 50 and outputs the back image ZBsi to the back image area extracting unit 51.

The image storing unit 48 stores the front image Msi or the back image Bsi inputted from the display image selecting unit 47 in the image display memory 49a corresponding to the instruction from the first image/button transition management unit 45.

The front image area extracting unit 50 extracts a designated extraction area of the front image ZMsi inputted from the display image selecting unit 47, and enlarges the extracted front image to half of 1080 pixels in width (area correction), then outputs the enlarged image as a front image ZMti.

The back image area extracting unit 51 extracts a designated extraction area of the back image ZBsi inputted from the display image selecting unit 47, and enlarges the extracted back image to half of 1080 pixels in width (area correction), then outputs the enlarged image as a back image ZBti.

The above-mentioned extraction area Tbi may be adjusted.

The display image selecting unit 47 displays the front image Msi, the back image Bsi, or the video image without the area correction when an instruction button for the simultaneous display of the front image and the back image (or the front and back images button) is not selected. And the front image ZMsi and the back image ZBsi have the area correction when the front and back images button is selected. The reason is described later.

The front and back images storing unit 52 stores the back image ZBti inputted from the back image area extracting unit 51 in the left half of the image display memory 49a for the display area of the flat panel television 10, and stores the front image ZMti inputted from the front image area extracting unit 50 in the right half of the image display memory 49a.

The enlargement of the front image and the back image may be carried out by the front and back images storing unit 52. To enlarge the images, enlargement size information may store to the image display memory 49a by outputting to the front and back images storing unit 52 with the front image ZMti and the back image ZBti. Then the image outputting unit 57 may enlarge the images base on the enlargement size information.

Figure 9:
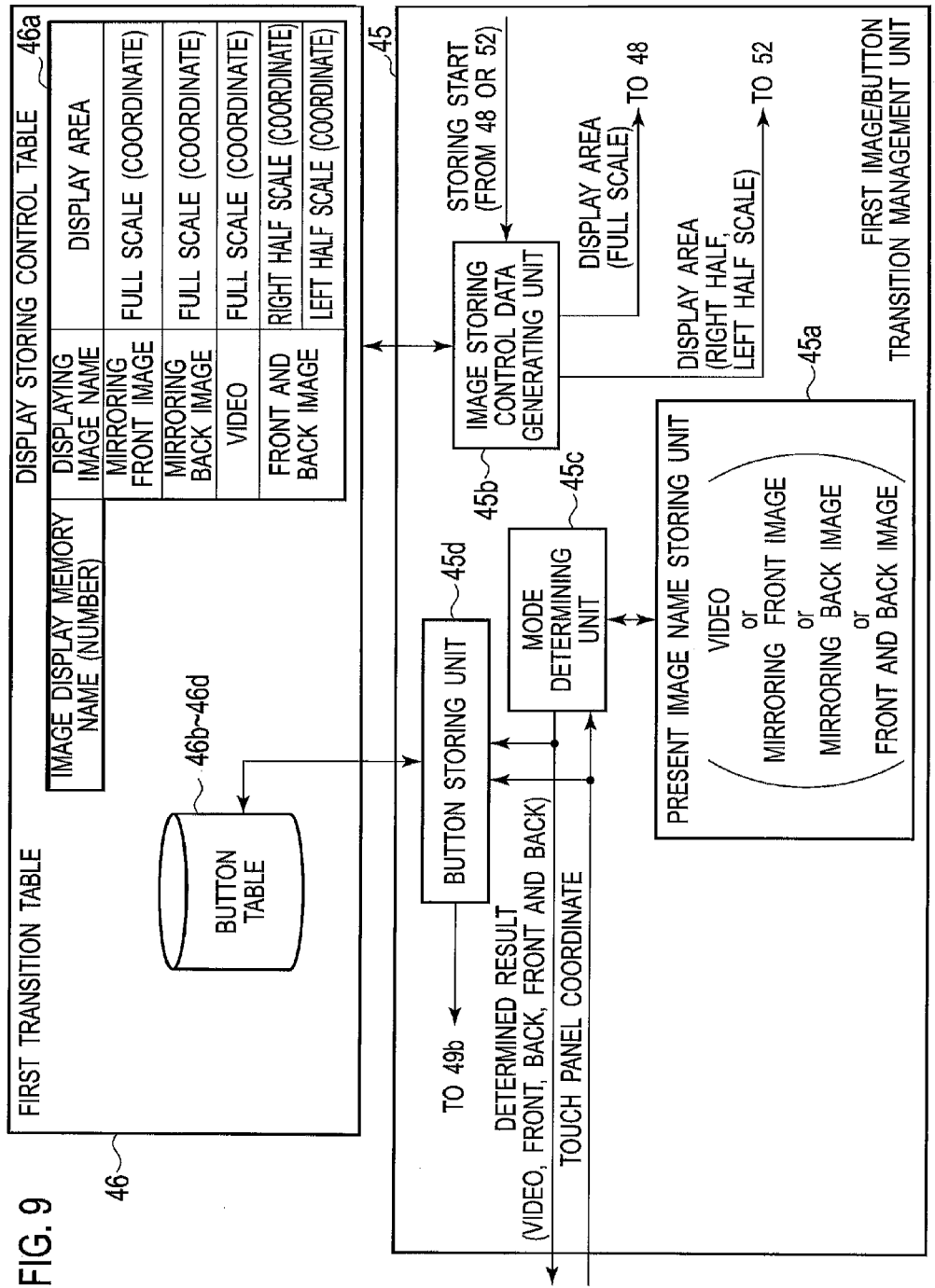
[FIG. 9]

Next, the first image/button transition management unit 45 is explained by referring to FIG. 9.

As shown in FIG. 9, the first image/button transition management unit 45 has a present image name storing unit 45a, an image storing control data generating unit 45b, a mode determining unit 45c, and so on. In FIG. 9, a display storing control table 46a and button tables 46b - 46d are illustrated in the first transition table 46.

The display storing control table 46a has a displaying image name (the front image, the back image, the video, the front and back images) and a corresponded display area (a full scale, a right half scale, and a left half scale) with a name (or number) of the image display memory 49a.

The present image name storing unit 45a memorizes a present display mode name (a present image name) determined by the mode determining unit 45c in a memory (not shown).

The image storing control data generating unit 45b reads the present image name (the video, the front image, the back image, the front and back images) stored in the present image name storing unit 45a and finds a record having the same present image name in the display storing control table 46a when the image storing unit 48 or the front and back images storing unit 52 starts storing.

Then, the image storing control data generating unit 45b reads the display area (the full scale, the right half scale, or the left half scale) in the record and outputs to the image storing unit 48 or the front and back images storing unit 52.

The mode determining unit 45c determines the mode by comparing with the present display image of the present image name storing unit 45a when the touch panel coordinates is inputted from the panel controller 33.

For instance, as shown in FIG. 10, (1) When the current state is a power-on and the video is selected after some process is finished, the video mode is determined.

(2) When the current state is the video mode and the event is "touch", the front image mode is determined.

(3) When the current state is the front image mode and the event is "back button", the back image mode is determined.

(4) When the current state is the front image mode and the event is "front and back button", the front and back images mode is determined. (5) When the current state is the front image mode and the event is "video button", the video mode is determined.

(6) When the current state is the back image mode and the event is "video button", the video mode is determined.

(7) When the current state is the back image mode and the event is "front button", the front image mode is determined.

(8) When the current state is the front and back images mode and the event is "video button", the video mode is determined.

(9) When the current state is the front and back images mode and the event is "front button", the front image mode is determined.

(10) When the current state is the front and back images mode and the event is "back button", the back image mode is determined.

As shown in FIG. 11, a button storing unit 45d selects the button table (46b, 46c or 46d) corresponding to the determined result from the mode determining unit 45c, and stores the button corresponding to the inputted touch panel coordinates in the image display memory 49a to display on the button display area in the flat panel television 10.

As shown in FIG. 12, the button tables are a front image button table 46b for the front image display (FIG. 12 (a)), a back image button table 46c for the back image display (FIG. 12 (b)), and a front and back images button table 46d for the simultaneous display of the front and back images (FIG. 12 (c)). The button tables relate the button name (or code number) with the touch panel coordinates so that the buttons (the front button, the back button, the front and back button, and so on) are displayed on the positions designated by the touch panel coordinates.

Figure 13:
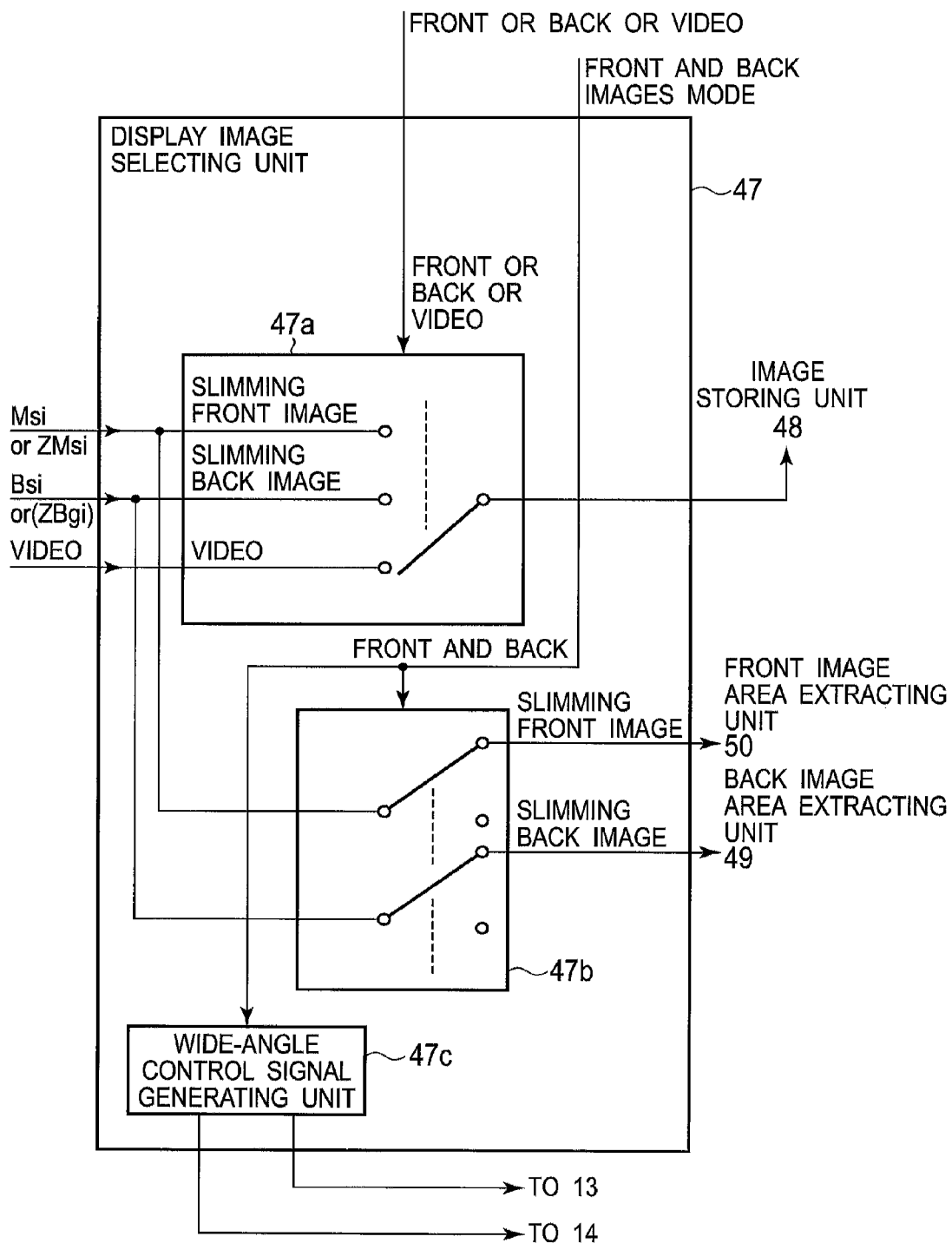
[FIG. 13]

Next, the display image selecting unit 47 is explained. FIG. 13 is an explanatory drawing to explain the display image selecting unit 47.

As shown FIG. 13, the display image selecting unit 47 has a first image selecting unit 47a, a second image selecting unit 47b, and a wide-angle control signal generating unit 46c. The wide-angle control signal generating unit 46c may be installed alone.

The first image selecting unit 47a selects the video image from the video play unit 41 and outputs the image to the image storing unit 48 when the determined result of the first image/button transition management unit 45 is the video mode.

The first image selecting unit 47a selects the slimming front image Msi and outputs the image to the image storing unit 48 when the determined result of the first image/button transition management unit 45 is the front image mode.

The first image selecting unit 47a selects the back image Bgi and outputs the image to the image storing unit 48 when the determined result of the first image/button transition management unit 45 is the back image mode.

The second image selecting unit 47b selects the front image ZMsi and the back image ZBgi from the front slimming unit 39 and outputs the front image ZMsi to the front image area extracting unit 50 and outputs the back image ZBgi to the back image area extracting unit 51 when the determined result of the first image/button transition management unit 45 is the front and back images mode.

The wide-angle control signal generating unit 47c sends the control signals for widening the view angles to the front video camera 13 and the rear video camera 14 when the determined result of the first image/button transition management unit 45 is the front and back images mode. In other words, the subject Ai is recorded small by expanding the view angle in order to be within the range of 540 pixels in width when the image is enlarged (the front image is e pixels in length by h pixels in width: about 1920 pixels, and the back image is r pixels in length by s pixels in width: about 1920 pixels).

The width of the flat panel television 10 (50 inches) is 1080 pixels and is not enough to display the images recorded by the front video camera and the rear video camera even if an unnecessary unit (right and left edges) of the image is trimmed. Then, the view angle is controlled to be wide so that the image of subject Ai becomes small in recording.

The image outputting unit 57 reads the images stored in the image display memory 49a and the button display memory 49b at certain intervals and outputs both images to the flat panel television 10.

The CCDs of the front video camera and the rear video camera and the flat panel television 10 are 1920 pixels in length by 1080 pixels in width. Therefore, the image from the video camera is not necessary to rotate 90 degrees to display on the flat panel television 10 placed vertically. Because extra rotation process is not required, processing of the image becomes fast.

(Explanation of the Operation)

The operation of the electronic mirroring system of the embodiment 1 composed as described above is explained. The sales person (person other than the subject) may operate (or touch) the buttons displayed on the panel. Thus, a customer as the subject is able to display designated images while talking with the sales person.

Figure 14:
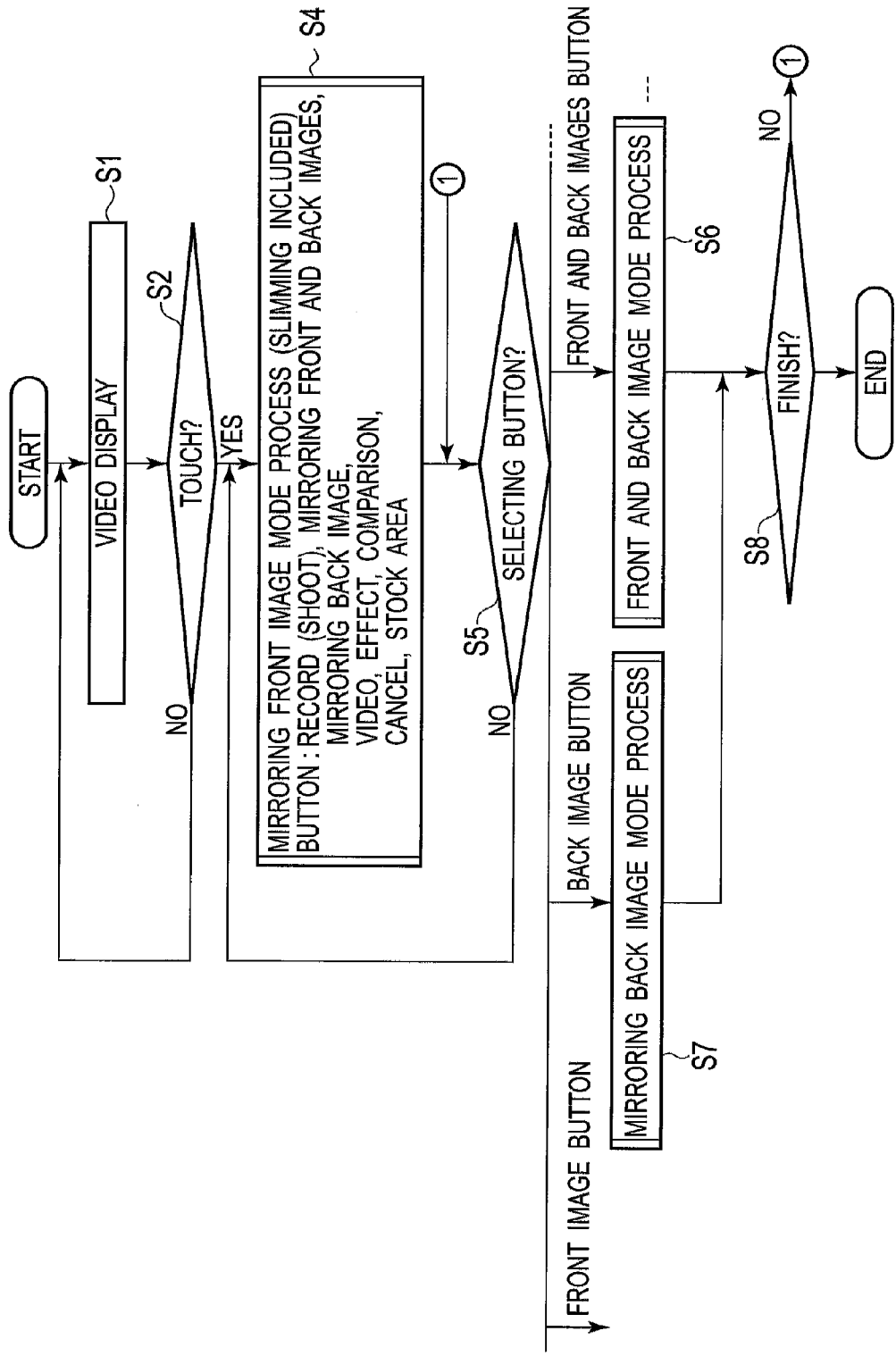
[FIG. 14]
Figure 15:
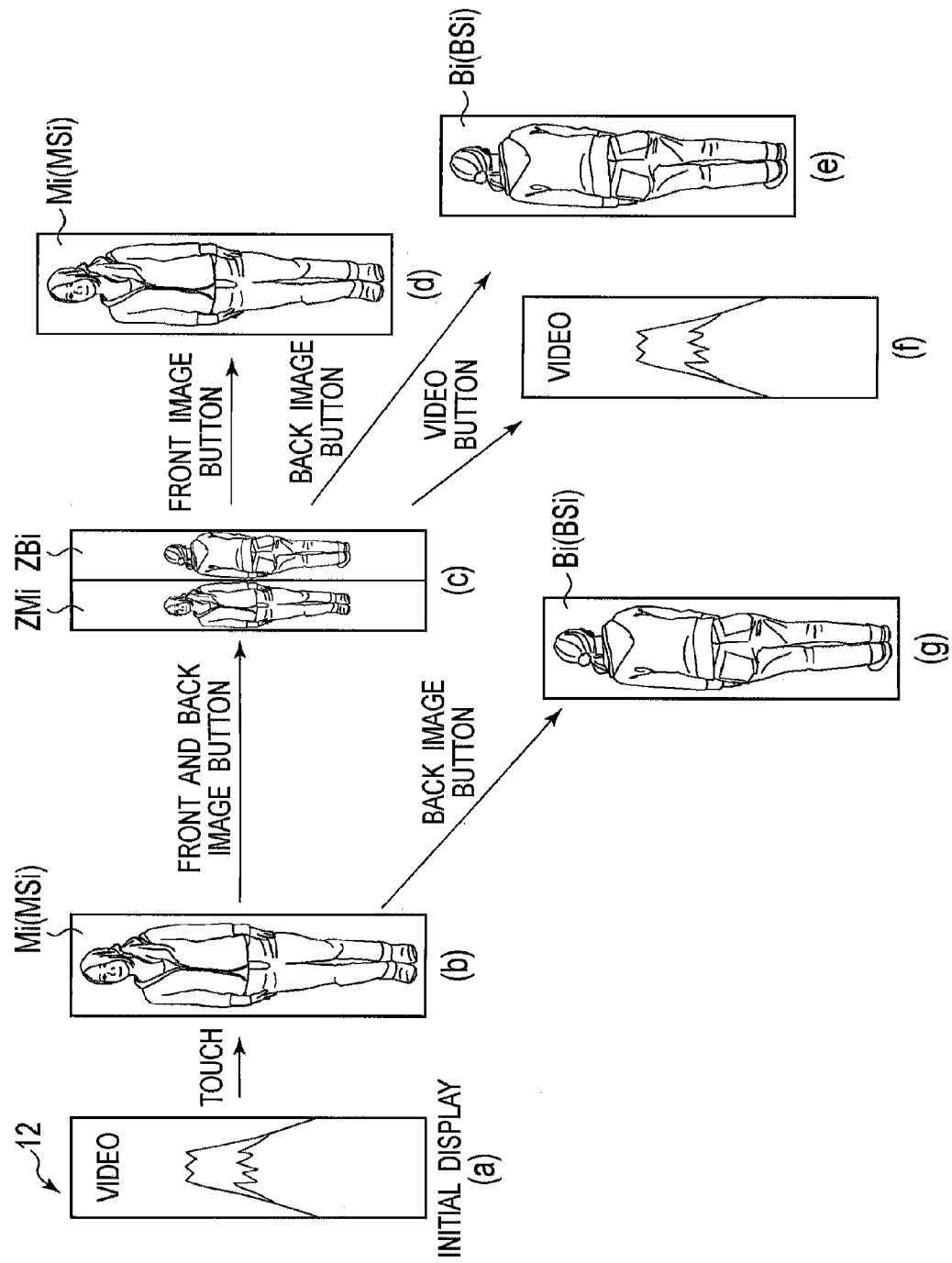
[FIG. 15] FIG. 15 (a) to (g) is a transition chart of the image displayed on the display of the flat panel television according to the embodiment 1.
Figure 16:
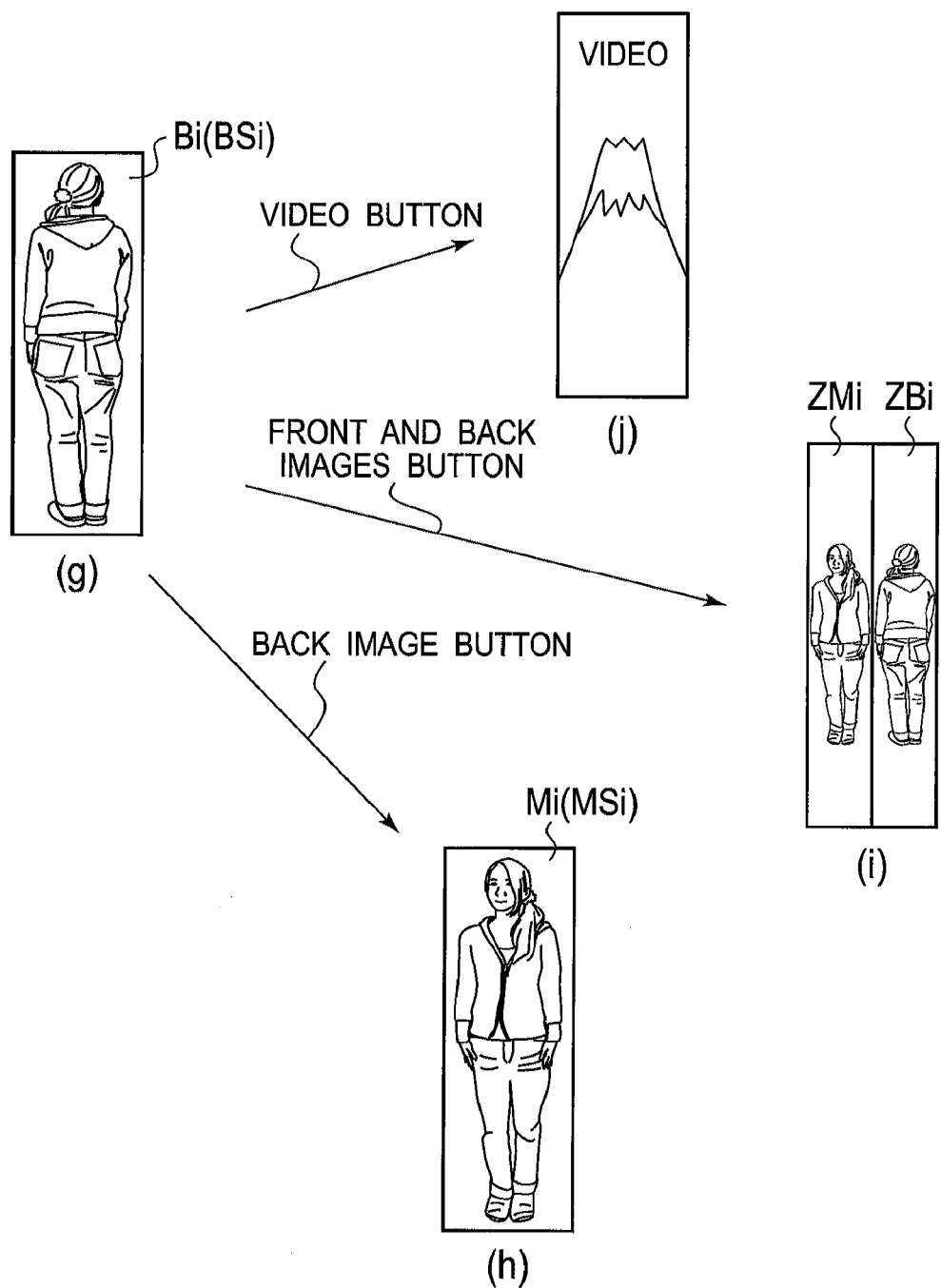
[FIG. 16] FIG. 16 (g) to (j) is a transition chart of the image displayed on the display of the flat panel television according to the embodiment 1.

FIG. 14 is a flow chart to explain the outline process of the electronic mirroring system according to the embodiment 1. FIG. 15 and FIG. 16 are transition charts of the image displayed on the display of the flat panel television 10 according to the embodiment 1.

In the embodiment 1, the front video camera 13 and the rear video camera 14, the front video capture 34, and the back video capture 35 are in operation. The front image Mai (of each frame) is memorized in the front image buffer memory 37 by the front video capture 34 whenever the front image Mai is sent from the front video camera 13. The back image Bai is memorized in the back image buffer memory 38 by the back video capture 35 whenever the back image Bai is sent from the rear video camera 14.

In the embodiment 1, the video play unit 41 plays the designated video image stored in the HDD 42 and displays on the flat panel television 10 as shown in FIG. 15 (a) (Si).

The processing of the video display is explained.

The some video images are stored in the HDD 42. The video menu is displayed on the display by switching on by the video play unit 41. When one of the videos is selected, the selected video image (for instance, scenery, a scene of a town, or a fashion show, etc.) is displayed as the initial display after the system is started.

The first image/button transition management unit 45 determines whether the touch panel coordinates is inputted from the panel controller 44 in the state (S2).

When the touch panel coordinates is inputted, the first image/button transition management unit 45 determines the front image mode and sends the determined result to the display image selecting unit 47. Then, the display image selecting unit 47 executes a front image mode process in order to display the front image Mi on the flat panel television 10 as shown in FIG. 15 (b) (S4). In the embodiment, it is preferable to display the front image Mi first. In general, the person moves toward the center of a mirror when he/she looks in the mirror. Therefore, the front image is displayed first in the embodiment.

In addition, the flow chart is explained by referring to FIG. 7.

Figure 17:
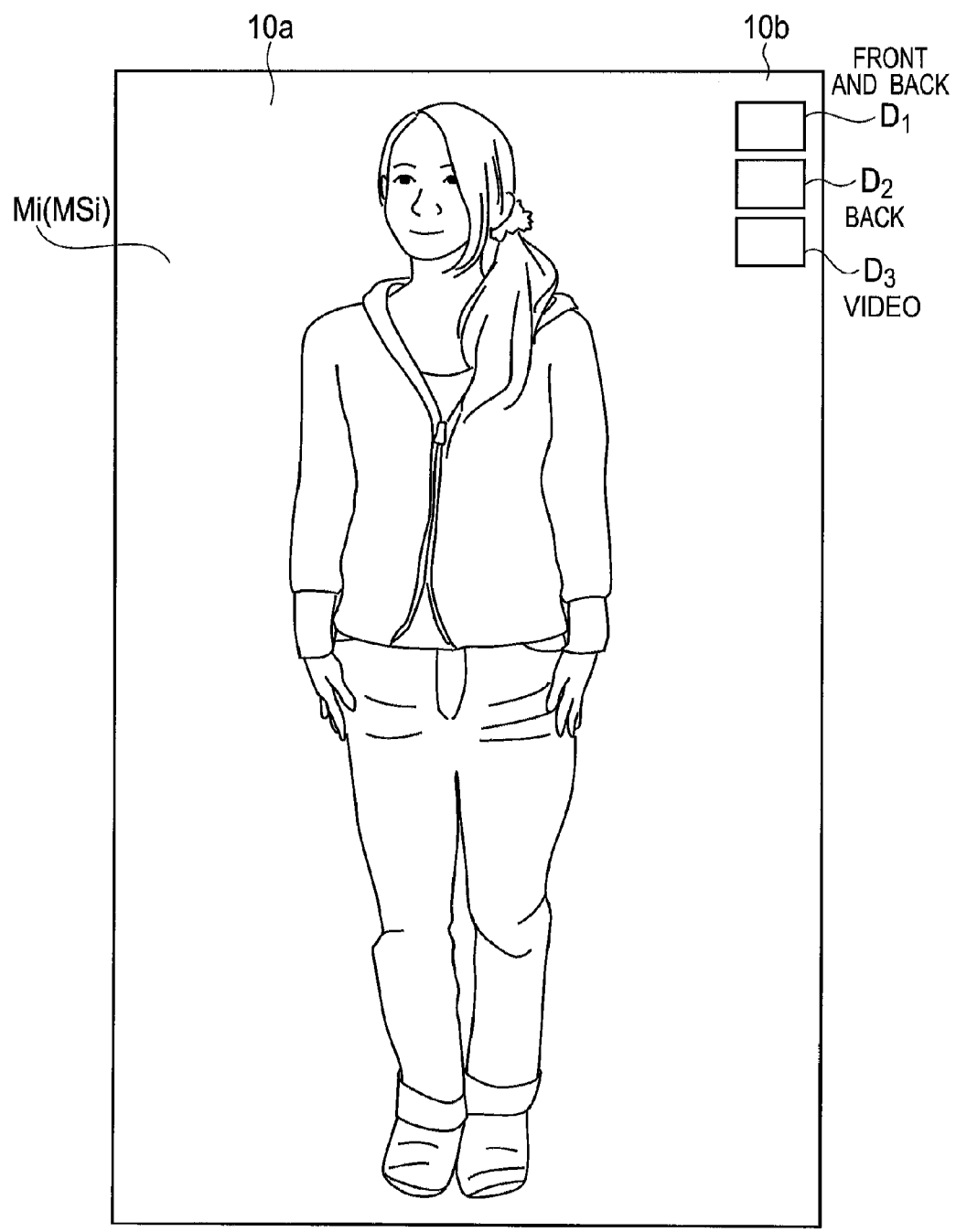
[FIG. 17]

When the front image mode is determined, the button storing unit 45d in the first image/button transition management unit 45 selects the front image button table 46b of the first transition table 46 and stores the front and back button D1, the back button D2, the video button D3 in the button display memory 49b for the button display area in order to display various buttons for the front image mode with the front image Mi as shown in FIG. 17. The process up to this step is called the front image process.

Next, the first image/button transition management unit 45 determines whether any button is selected. If no button is selected, the process is returned to the step S4 (S5).

The determination of a kind of selected button is done by the mode determining unit 45c in the first image/button transition management unit 45. When the inputted touch panel coordinates are found in the button tables 46b, 46c and 46d, the button is determined as selected.

Figure 18:
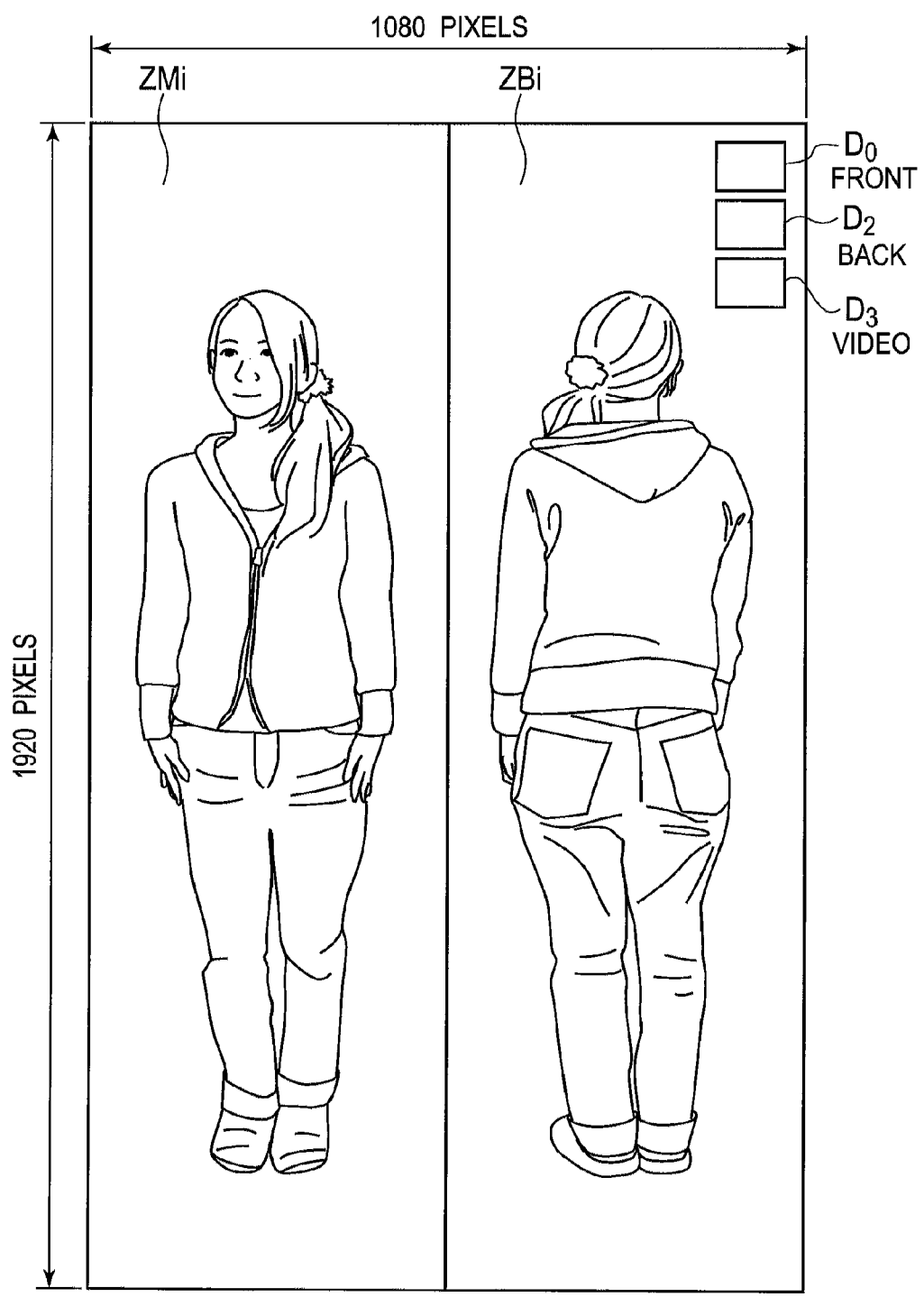
[FIG. 18]

When the button is selected and the button is determined as the front and back images button D1 by the first image/button transition management unit 45 at the step S5, the front and back images mode process is executed in order to display the front image ZMi and the back image ZBi on the flat panel television 10 simultaneously as shown in FIG. 18 (S7).

The selection and the determination of the front and back images button D1 are explained.

In case the front image Mi is displayed, the button storing unit 45d selects the front image button table 46b. When the inputted touch panel coordinates is matched the touch panel coordinates for the front and back images button stored in the front image button table 46b, the selected button is determined as the front and back images button.

When the front image button is selected in the front and back images mode (or the simultaneous display mode) shown in FIG. 18 (FIG. 15 (c)), the front image Mi is displayed in the front image mode as shown in FIG. 15 (d) (refer to FIG. 17).

Figure 19:
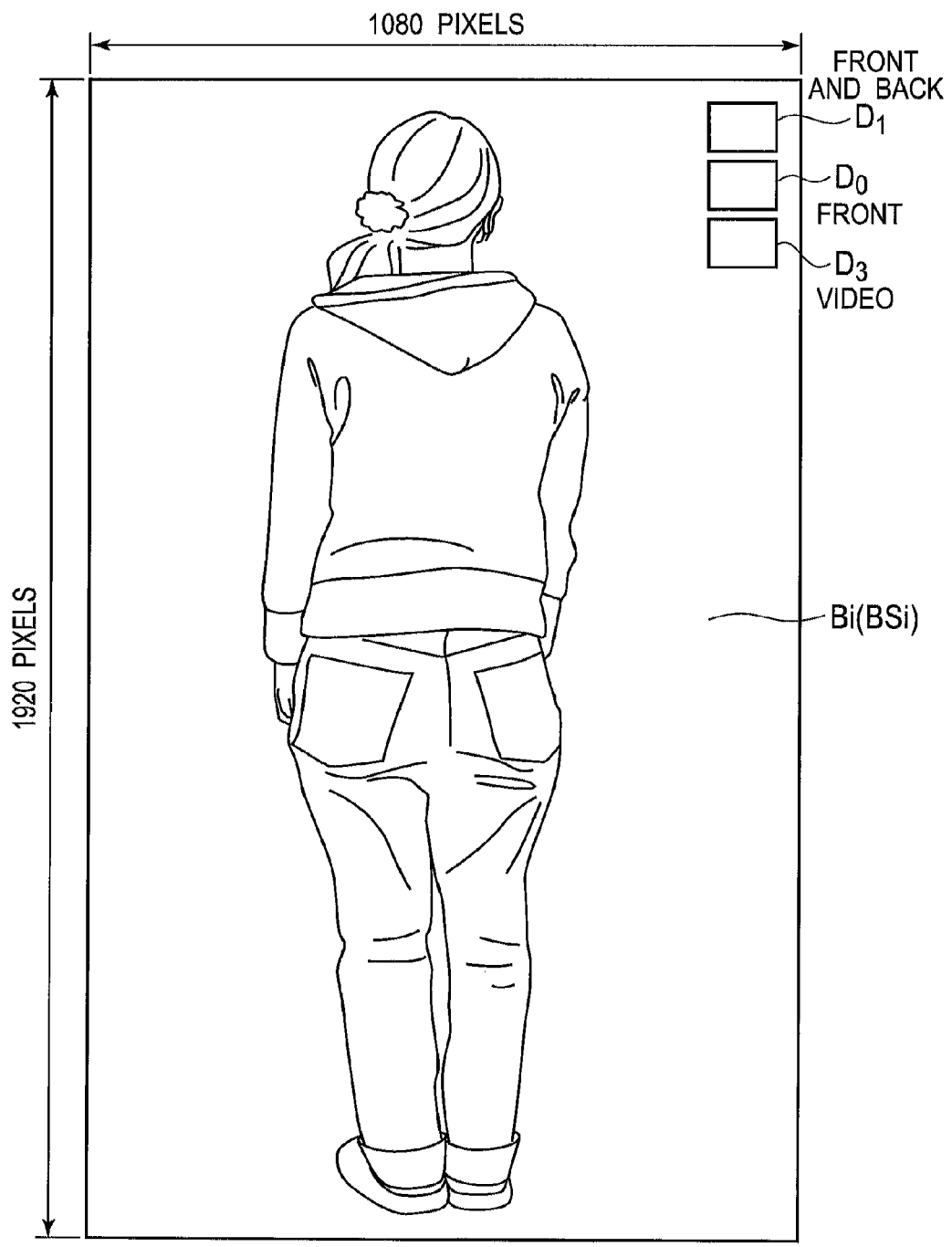
[FIG. 19]

When the back image button is selected in the front and back images mode shown in FIG. 18, the back image Bi is displayed in the back image mode as shown in FIG. 15 (*e*) (refer to FIG. 19).

When the video button is selected in the front and back images mode shown in FIG. 18, the video image is displayed in the video mode as shown in FIG. 15 (*f*).

When the selected button is determined as the back images button by the first image/button transition management unit 45 at the step S6, the back image mode process is executed in order to display the back image Bi on the flat panel television 10 as shown in FIG. 15 (*g*) (S8).

The details according to the mirroring back image Bi are shown in FIG. 19.

When the front image button is selected in the back image mode (refer to FIG. 16 (*g*)), the first image/button transition management unit 45 displays the front image Mi (refer to FIG. 16 (*h*)). When the front and back images button is selected, the front and back images are displayed simultaneously (refer to FIG. 16 (*i*)). And when the video button is selected, the video image is displayed (refer to FIG. 16 (*j*)).

In case the front and back images are displayed, the button storing unit 45*d* selects the front and back images button table 46*d*. When the inputted touch panel coordinates is matched the touch panel coordinates for the back image button stored in the front and back images button table 46*d*, the selected button is determined as the back image button.

And it is judged whether the process is finished. If the process is not finished, the process is returned to the step S5 (S9).

In addition, the front and back images mode process is explained.

(The Front and Back Images Mode Process)

When the mode determining unit 45*c* in the first image/button transition management unit 45 shown in FIG. 9 determines that the mode is the simultaneous display mode, the first image selecting unit 47*a* stops outputting while the second image selecting unit 47*b* selects the front image ZMsi and the back image ZBgi, and outputs the front image ZMsi and the back image ZBgi.

That is, the front image ZMsi is outputted to the front image area extracting unit 50 and the back image ZBgi is outputted to the back image area extracting unit 51.

In case of the simultaneous display mode, the wide-angle control signal generating unit 47*c* may send the wide-angle control signals for widening the view angles to the front video camera 13 and the rear video camera 14 before selecting the front image ZMsi and the back image ZBgi. Then, the subject Ai is recorded small by widening the view angle.

The reason of the wide-angle control is explained in detail.

Figure 20:
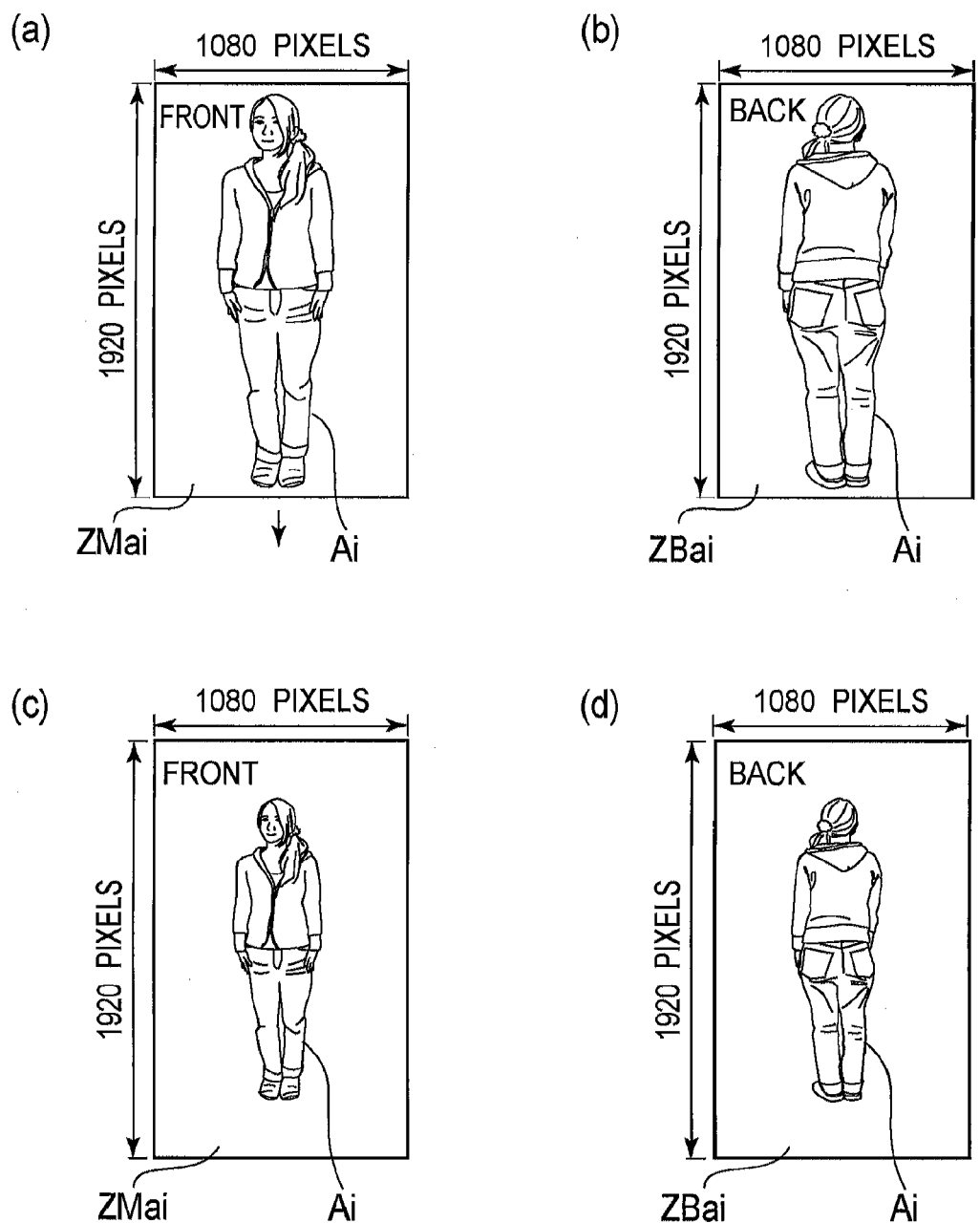
[FIG. 20] FIG. 20 (a) to (d) is an explanatory drawing to explain the size of the subject recorded with a CCD (i×m) with a wide-angle control.

FIG. 20 is an explanatory drawing to explain the size of the subject recorded with the CCD (i pixels in length by m pixels in width) by the wide-angle control.

For instance, the images shown in FIG. 20 (*a*) and (*b*) are recorded with the CCD when the subject Ai standing at a designated position in front of the mirroring unit (the middle between the front and the rear) is recorded from the front and the rear.

On the other hand, the width of the flat panel television 10 placed vertically is 1080 pixels in the embodiment. If the range of 1080×1920 pixels on a light receiving surface of the CCD is extracted, the width of the flat panel television 10 must be twice 1080 pixels in order to display both images in parallel. Therefore, both the front image and the back image must be reduced before or after the images are combined, otherwise the images are not able to be displayed on the flat panel television 10 at the same time.

The background image data exists on the right and left sides and the upper and lower sides of the subject even if both reduced images are displayed on the display at the same time. And the front image and the back image of the subject become much small when both images are reduced.

Then, the subject Ai is recorded small as shown in FIG. 20 (*c*) and (*d*) by widening the view angle. The wide-angle control, for instance, is desirable to widen the view angle for reducing the size of the mirroring front image of the subject Ai (a figure only) displayed on the full scale of the flat panel television 10 from 0.75 to 0.4 size of the subject when the distance between the front video camera and the subject Ai is about one meter. The same is for the mirroring back image of the subject Ai.

The front image ZMai recorded with the wide-angle control is captured by the front video capture 34 and is memorized in the front image buffer memory 36. Then, the front image ZMai is slimmed to make the front image ZMsi by the front slimming unit 39.

At the same time, the back image ZBai recorded with the wide-angle control is captured by the back video capture 35 and is memorized in the back image buffer memory 37. Then, the back image ZBai is slimmed to make the back image ZBsi by the back slimming unit 40. In addition, the glare is eliminated to make the back image ZBgi by the glare eliminator 53.

The front image ZMsi is outputted to the front image area extracting unit 50 and the back image ZBgi is outputted to the back image area extracting unit 51 by the second image selecting unit 47*b* in the display image selecting unit 47.

The front image area extracting unit 50 and the back image area extracting unit 51 apply a extraction window Tbi (for instance, a vertical window of 540 by 1680 pixels) over the front image ZMsi (i by m) as shown in FIG. 20 (*a*) by adjusting to a designated reference point (a central pixel of i by m is preferable). For instance, the number of pixels of the extraction window Tbi (a first designated area and a second designated area) may be 520 by 1600 pixels, or 600 by 1700 or 1800 pixels. The extraction window Tbi of 540 pixels by 1680 pixels is used in the embodiment. The extraction window Tbi may be same size for the both images. Or the first designated area for the front image may be large and the second area for the back image may be small. The condition may be opposite. The purpose is to correspond to several cases such as enlarging the front image, enlarging the back image, enlarging the face image only, or enlarging the head image only. As for the size of the extraction window Tbi, the size value is stored in a memory (not shown) of the front image area extracting unit 50, the back image area extracting unit 51, or the front and back images storing unit 52 by indicating a setting box for the size of the extraction window (not shown) by a keyboard or a mouse.

Figure 21:
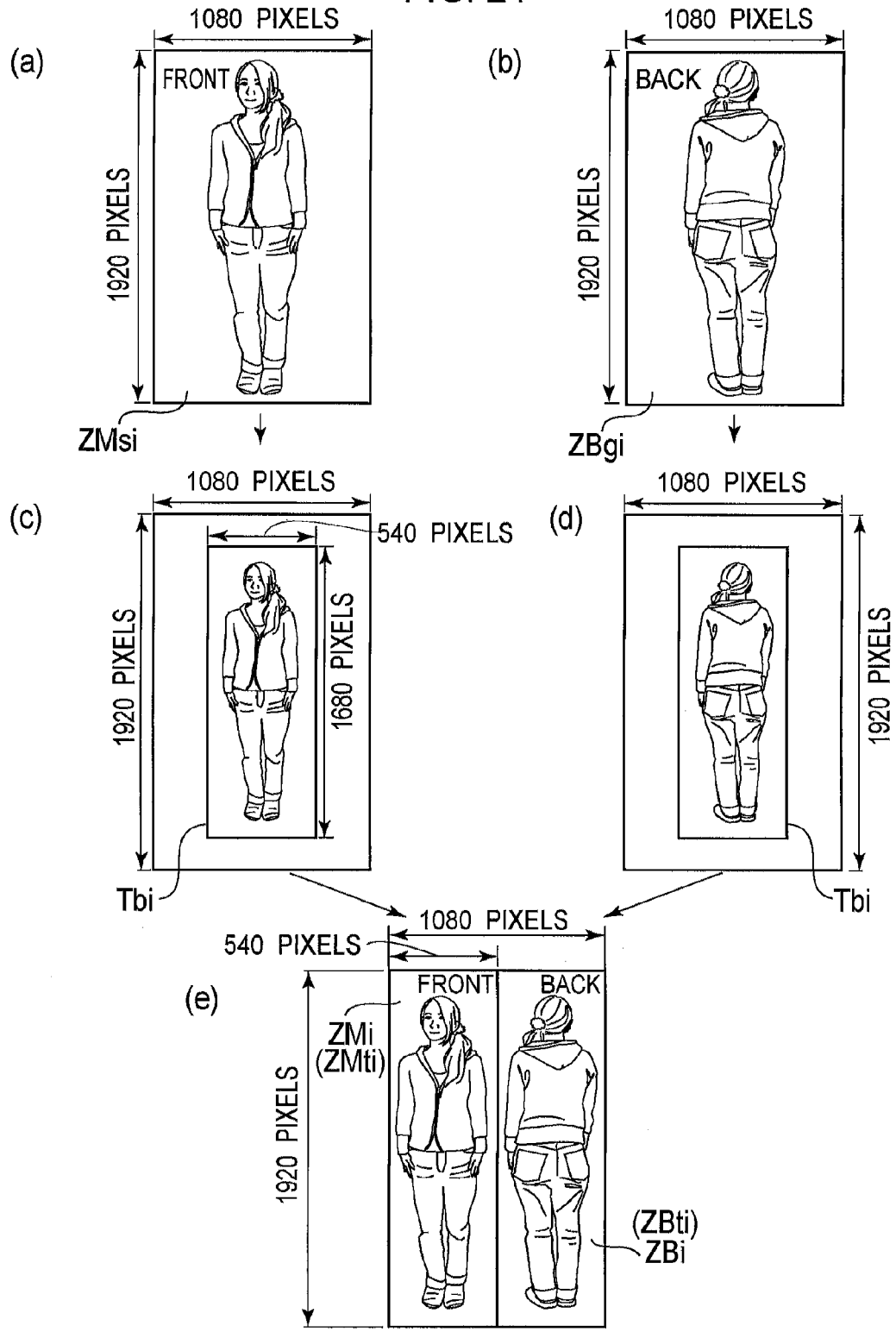
[FIG. 21] FIG. 21 (a) to (e) is an explanatory drawing to explain the process of a front image area extracting unit and a back image area extracting unit.

The image data in the extraction window Tbi is extracted as shown in FIG. 21 (*c*) and (*d*) (the figure area with the minimum background). The front image area extracting unit 50 and the back image area extracting unit 51 output the images (h pixels in width by e pixels in length) created by reducing or enlarging the extracted image by using a designated coefficient to display on the area of 540 pixels in width by 1920 pixels in length to the front and back images storing unit 52. The images are the front image ZMti and the back image ZBti. The designated coefficient for the front image to reduce or to enlarge is called a third designated area. The designated coefficient for the back image to reduce or to enlarge is called a fourth designated area.

The front and back images storing unit 52 reads the display area from the image storing control data generating unit 45*b* in the first image/button transition management unit 45. Then, the front and back images storing unit 52 stores the front image ZMti outputted from the front image area extracting unit 50 in the right half scale (540 pixels by 1680 pixels) indicated as the display area and the back image ZBgi outputted from the back image area extracting unit 51 in the left half scale (540 pixels by 1680 pixels). That is, the front and back images are stored in the image display memory 49a and the front image ZMi and the back image ZBi are displayed on the flat panel television 10 at the same time as shown in FIG. 21 (*e*).

On the other hand, the button storing unit 45d stores the front image button, the back image button, and the video button set in the selected button table in the button area 10b of the button display memory 49b.

The image outputting unit 57 reads the image display memory 49a and the button display memory 49b periodically and displays the front image ZMi and the back image ZBi on the display as shown in FIG. 21 (*e*) by processing the stored images as described above.

The wide-angle control is carried out to both video cameras in the embodiment. And the wide-angle control is optional.

In case the wide-angle control is not carried out, the front image area extracting unit 50 and the back image area extracting unit 51 may reduce the images (540 pixels in width) and may output to the front and back images storing unit 52 to display simultaneously.

The front image and the back image are displayed on the same size area of the right and left half in the embodiment 1. The size of one side may be smaller than the size of another side.

In addition, the front image area extracting unit 50 and the back image area extracting unit 51 may store the background image recorded by the front video camera and the rear video camera in advance. The image of the subject Ai may be extracted from the front image ZMai or the back image ZBgi by a differential process. When the image of the subject Ai is not in a designated size, the wide-angle control signal may be sent to the video camera (the front or the rear) that records the unsized image. Thus, the whole image of the subject Ai is extracted even if the subject Ai is not positioned at the center between the front video camera and the rear video camera. The front and back images of the subject Ai are preferable to be the designated size.

A mat installed a pressure sensor may be laid at the center between the front video camera and the rear video camera. Then, the recording of the subject may be started when the subject stands on the mat.

Embodiment 2

Figure 22:
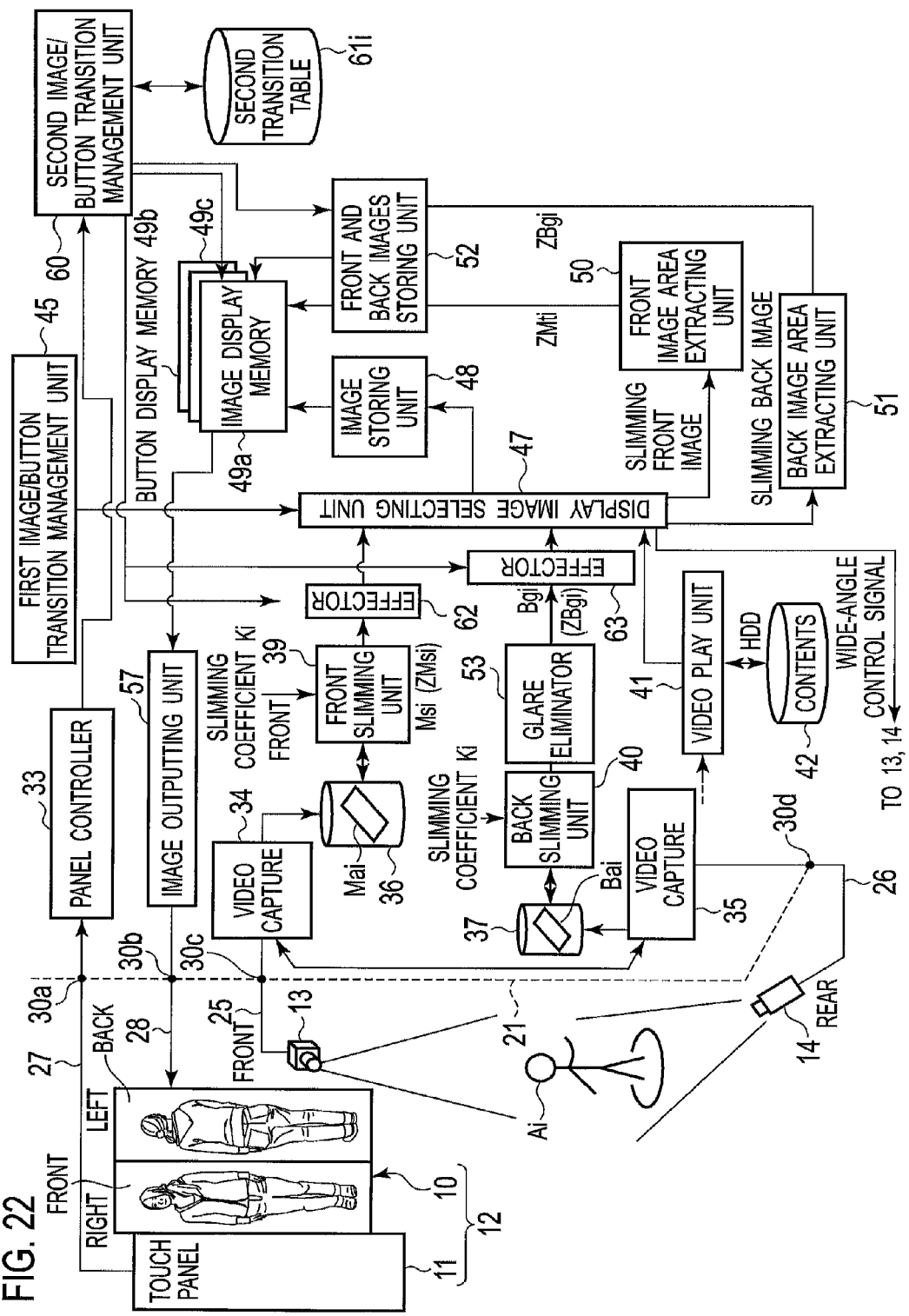
[FIG. 22]

FIG. 22 is an outline block diagram of the electronic mirroring system according to the embodiment 2. The explanation for the one in FIG. 22 with the same sign of FIG. 7 is omitted. As shown in FIG. 22, a front effector 62 is followed by the front slimming unit 36. And a back effector 63 is followed by the back slimming unit 38. In addition, a second image/button transition management unit 60 and a second transition table 61 are equipped.

The front effector 62 enlarges and reduces a part of the front image Msi (ZMsi). The back effector 63 enlarges and reduces a part of the back image Bgi (ZBgi).

The second transition table 61 relates an effect button with the touch panel coordinates of the effect button in the touch panel. This is prepared for each button table described above.

Figure 23:
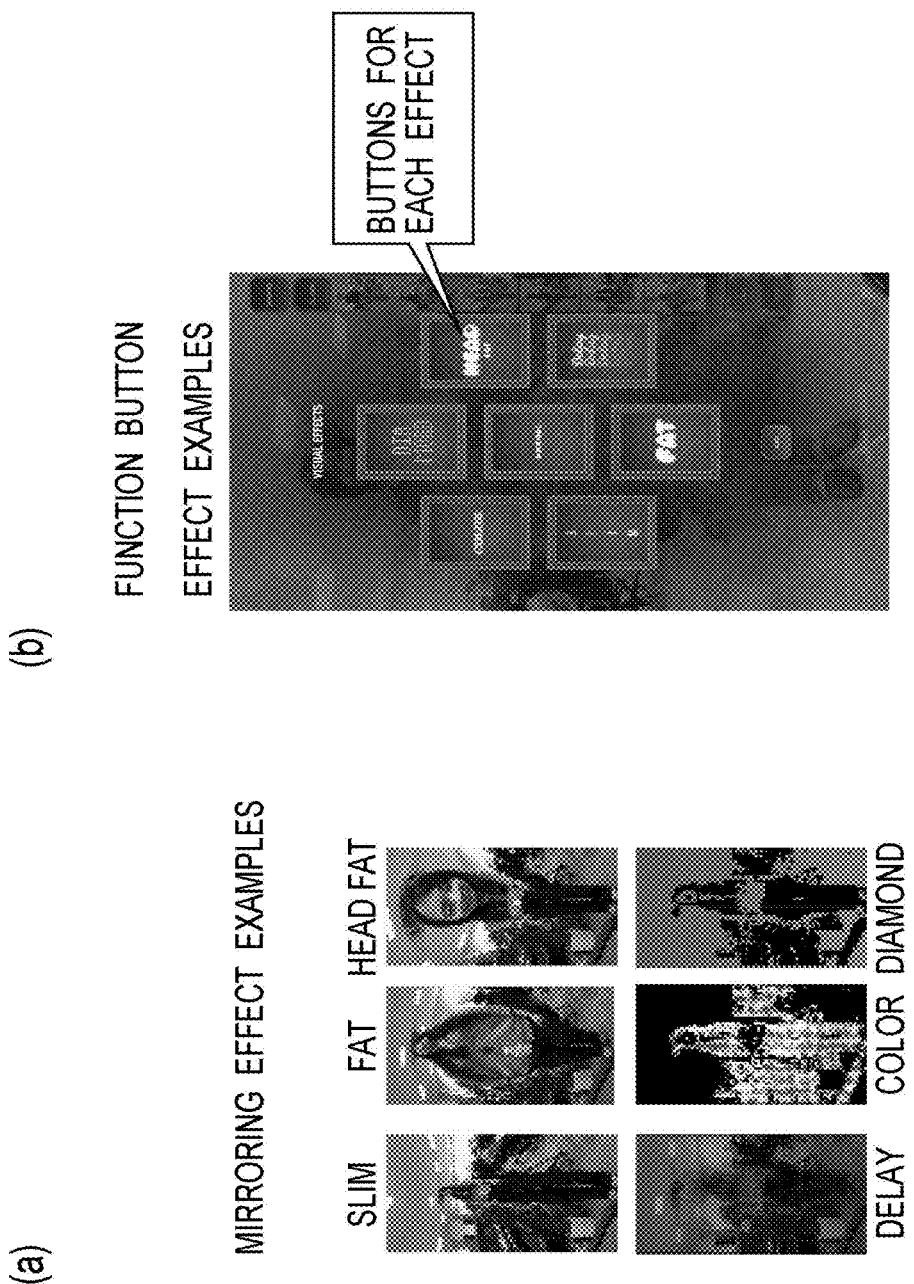
[FIG. 23] FIG. 23 (a), (b) is an explanatory drawing to explain the effects.

The second image/button transition management unit 60 stores effect buttons shown in FIG. 23 (*a*) in the effect display memory 49c to display when the touch panel coordinates indicate the effect.

For instance, as show in FIG. 23 (*b*), the image (the front or the back) is modified to the long feet figure and is displayed when the SLIM button is selected.

The image is modified to the plump figure and is displayed when the FAT button is selected.

The upper part (head) of the image is modified to big and is displayed when the HEADFAT button is selected.

The image with some time lag is generated and is displayed when the DELAY button is selected.

The image is binarized, then the white area of the image is extracted and emphasized to display when the COLOR button is selected.

The image is binarized to create a composite image with an image of a character and is displayed when the DIAMOND button is selected.

In the effect mode, the RECORD button, the CANCEL button, and the VIDEO button are displayed.

Embodiment 3

Figure 24:
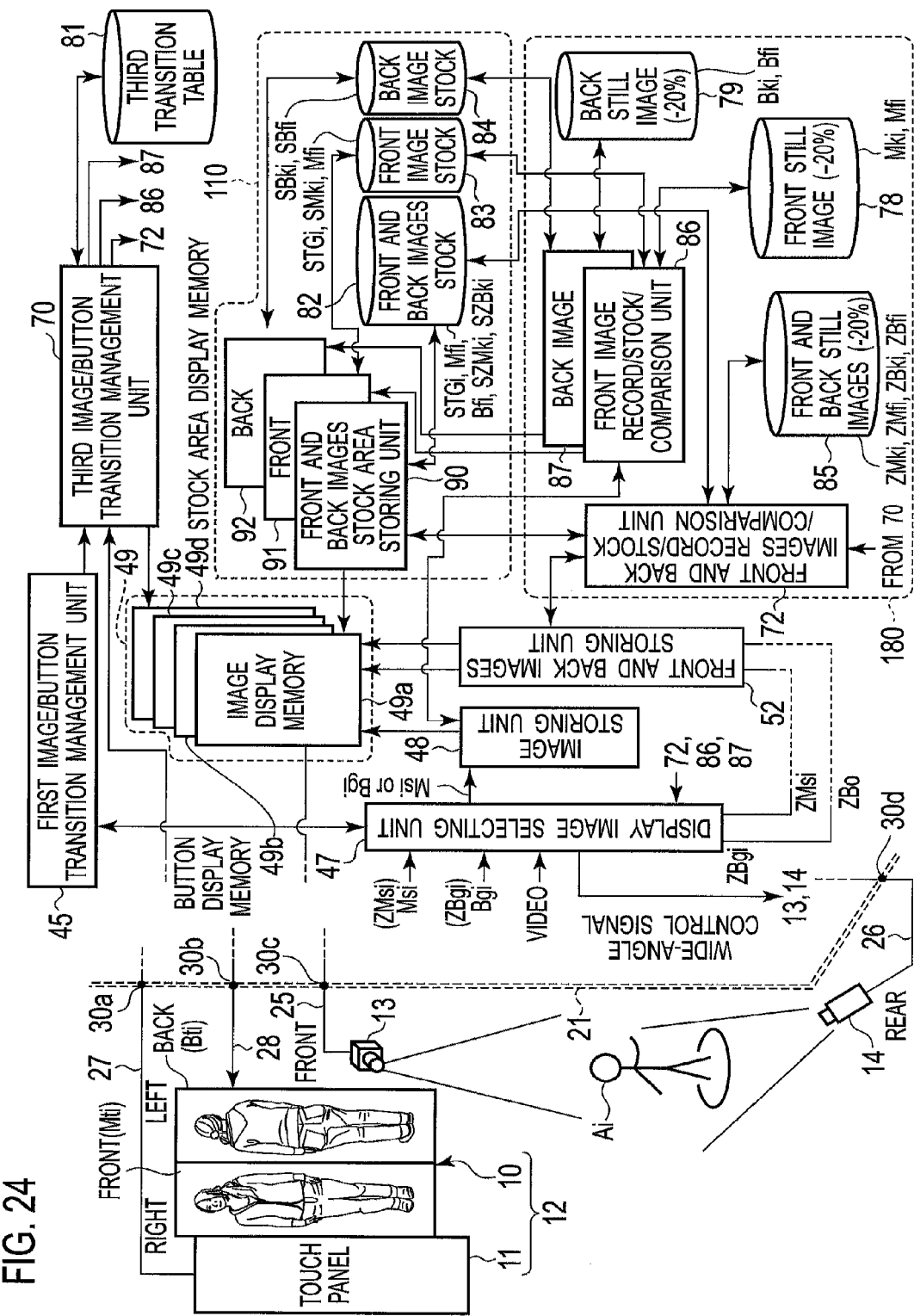
[FIG. 24]

FIG. 24 is an outline block diagram of the electronic mirroring system according to the embodiment 3. The explanation for the one in FIG. 24 with the same sign of FIG. 7 is omitted. In FIG. 24, the panel controller 33, the image outputting unit 57, the front video capture 34, the back video capture 35, the front slimming unit 39, the back slimming unit 40, the video play unit 41, the front image buffer memory 36, the back image buffer memory 37, the hard disk 42, the glare eliminator 53, the front image area extracting unit 50, the back image area extracting unit 51, and the second image/button transition management unit 60 shown in FIG. 7 are omitted.

As shown in FIG. 24, the electronic mirroring system in the embodiment 3 further comprises a third image/button transition management unit 70, a front and back images record/stock/comparison unit 72, a front image record/stock/comparison unit 86, a back image record/stock/comparison unit 87, a front and back images stock area storing unit 90, a front image stock area storing unit 91, a back image stock area storing unit 92, a third transition table 81, and a front and back images stock memory 82. The supplementary information described above is stored in the front and back images stock memory 82. The supplementary information may be displayed or may not be displayed. The setting whether the supplementary information is displayed or not is done in advance.

Moreover, a front image stock memory 83, a back image stock memory 84, a front and back still images memory 85 (or a simultaneous display image memory 85), a front still image memory 78 (or a front image memory 78), a back still image memory 79 (or a back image memory 79), and a stock area display memory 49d are comprised.

The front image stock memory 83, the back image stock memory 84, the front and back still images memory 85 (or the simultaneous display image memory 85), the front still image memory 78 (or the front image memory 78), the back still image memory 79 (or the back image memory 79), and the stock area display memory 49d store the supplementary information described above. The supplementary information may be displayed or may not be displayed. The setting whether the supplementary information is displayed or not is done in advance.

The image display memory 49a, the button display memory 49b, the effect display memory 49c, and the stock area display memory 49d are called a display memory 49 as a general term.

The front and back images record/stock/comparison unit 72, the front image record/stock/comparison unit 86, the back image record/stock/comparison unit 87, the simultaneous display image memory 85, the front image memory 78, and the back image memory 79 are called an image record/stock/comparison unit 180 as a general term.

The front and back images stock area storing unit 90, the front image stock area storing unit 91, the back image stock area storing unit 92, the front and back images stock memory 82, the front image stock memory 83, and the back image stock memory 84 are called a stock area storing unit 110 as a general term.

Figure 25:
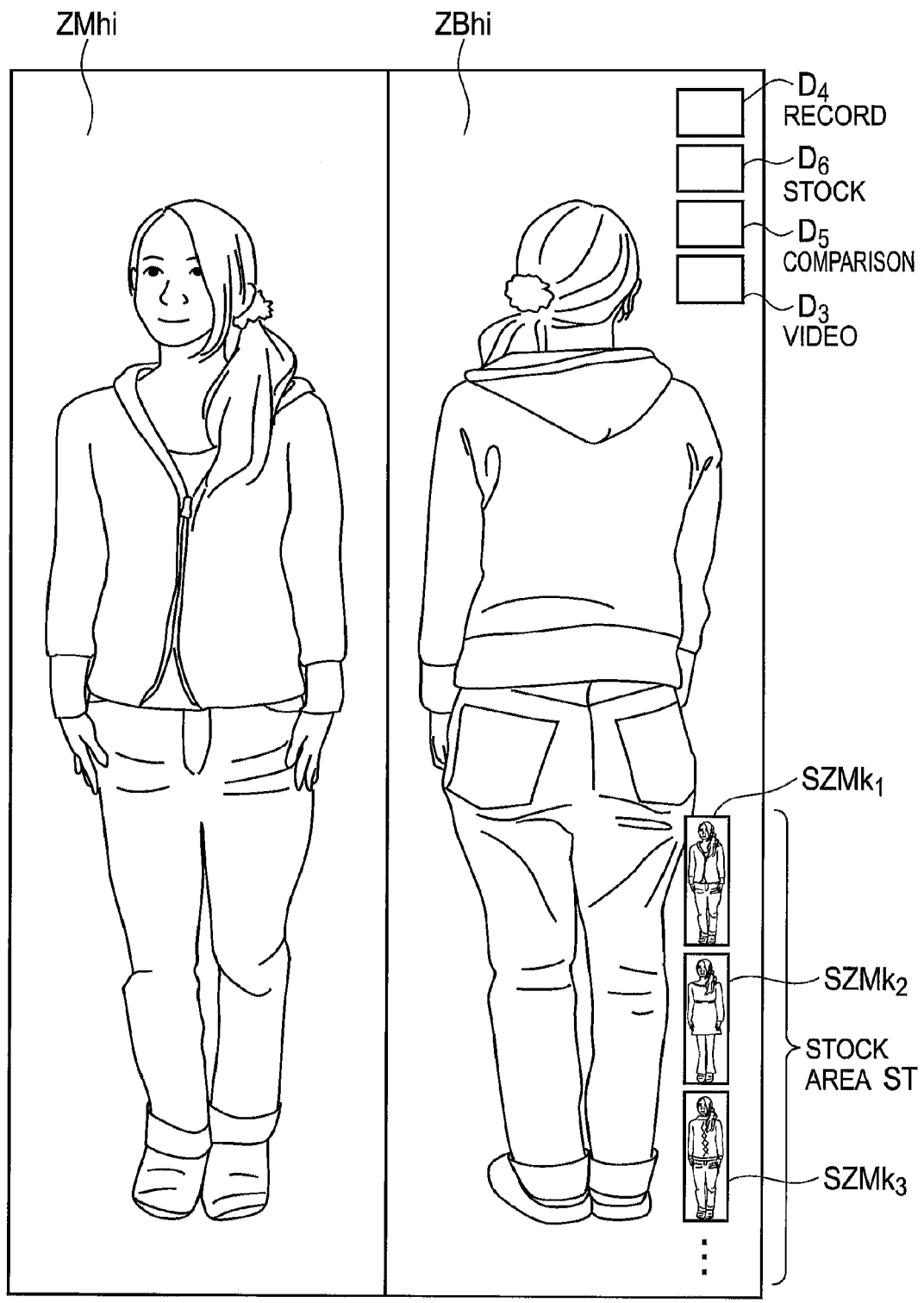
FIG. 25 is an explanatory drawing to explain the display of a stock area according to the embodiment 3.

As shown in FIG. 25, when the recorded front still image ZMhi (or the front still image Mhi: a sign h indicates a still image) is selected by touching the record button D4, the reduced front still image SZMki (or SMki: a sign k indicates a image with a low resolution) of the front still image ZMhi (or Mhi) is displayed on the stock area ST.

When the front still image SZMki (or SMki) displayed on the stock area ST is selected, the front still image ZMki (or Mki) and the back still image ZBki (or Bki) linked to the selected front still image SZMki (or SMki) are retrieved and displayed by representing with a high resolution.

As shown in FIG. 26, the third transition table has a third front image button table 81a (shown as FIG. 26 (a)), a third back image button table 81b (shown as FIG. 26 (b)), a third front and back images button table 81c (shown as FIG. 27 (a)), and a simultaneous comparison button table 81d (shown as FIG. 27 (b)).

The tables relate the touch panel coordinates with the button name, and also relate to the process to be started.

For instance, the third front and back images button table 81c relates each touch panel coordinates (the button display area) with the front image button, the back image button, the video button, the comparison button, the save button, the record button, the effect button, the cancel button, and so on. The process to be started is related to the front and back images record/stock/comparison unit 72.

Moreover, the simultaneous comparison button table 81d relates each touch panel coordinates with a front and back images comparison button (or a simultaneous comparison button), a front image comparison button (or a front comparison button), and a back image comparison button (or a back comparison button).

The third image/button transition management unit 70 starts the front and back images record/stock/comparison unit 72, the front image record/stock/comparison unit 86, or the back image record/stock/comparison unit 87 based on the mode determined by the first image/button transition management unit 45 and the second image/button transition management unit 60.

Moreover, the third image/button transition management unit 70 retrieves the button table corresponding to the display mode determined by the mode determining unit 45c, and stores the buttons set in the button table in the button display memory 49b to display.

For instance, the third front image button table 81a is retrieved when the front image mode is determined. The third back image button table 81b is retrieved when the back image mode is determined. The third front and back images button table 81c is retrieved when the front and back images mode is determined. Then the buttons set in the table are stored in the button display memory 49b to display.

Figure 28:
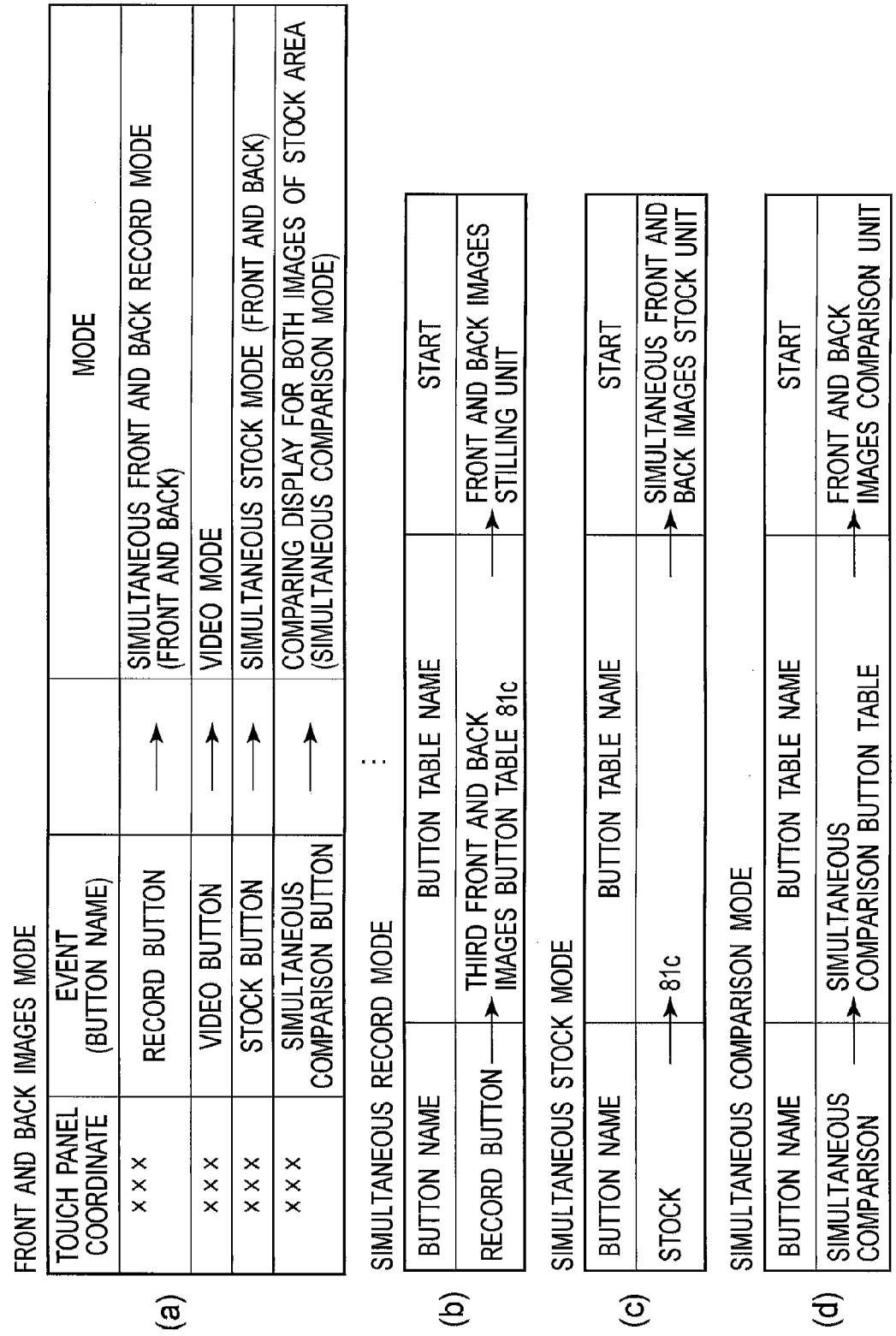
[FIG. 28] FIG. 28 (a) to (d) is an explanatory drawing to explain each mode process according to the embodiment 3.

FIG. 28 (a) shows the buttons (the record button, the video button, the stock button, and the simultaneous comparison button) to be displayed and the mode (the simultaneous front and back record mode, the video mode, the simultaneous stock mode, and the simultaneous comparison mode) to be determined when the button is selected in the front and back images mode.

FIG. 28 (b) shows the button table name and the process unit to be started (the front and back images stilling unit) in the simultaneous record mode.

FIG. 28 (c) shows the button table name and the process unit to be started (the simultaneous front and back images stock unit) in the simultaneous stock mode.

FIG. 28 (d) shows the button table name and the process unit to be started (the front and back images comparison unit) in the simultaneous comparison mode.

FIG. 29 shows the button table name and the process unit to be started in each mode such as the front image record mode, the back image record mode, the front image stock mode, the front image comparison mode, the back image comparison mode.

Next, the image stock memory is explained by referring to FIG. 30. The data of the front and back images stock memory 82 is listed in FIG. 30 (a).

As shown in FIG. 30 (a), the front and back images stock memory 82 stores a record consisted of a stock file number STfi, a stock area coordinates STGi for displaying, a stock number Sgi, a front stock image SZMki displayed on the stock area coordinates STGi, a front image file number Mfi of the front image corresponding the front stock image SZMki, a back image file number Bfi, and a back stock image SZMki. Each data of the record is created by the front and back images record/stock/comparison unit 72 described later.

As shown in FIG. 30 (b), the front image stock memory 83 stores a record consisted of the stock file number STfi, the stock area ST coordinates STGi, the stock number Sgi, the front stock image file number Mfi, and the front stock image SMki. Each data of the record is created by the front image record/stock/comparison unit 86 described later.

As shown in FIG. 30 (c), the back image stock memory 84 stores a record consisted of the stock file number STfi, the stock area ST coordinates STGi, the stock number Sgi, a back image file number Bfi, and the back stock image SBki. Each data of the record is created by the back image record/stock/comparison unit 87 described later.

FIG. 31 shows the data in the front and back still images memory 85, in the front still image memory 78, and in the back still image memory 79.

As shown FIG. 31 (a), the front and back still images memory 85 stores a record consisted of a file number Mfi of the front still image ZMki, the front still image ZMki corresponding to the file number Mfi, a file number Bfi of the back still image ZBki, and the back still image ZBki corresponding to the file number Bfi.

As shown FIG. 31 (b), the front still image memory 78 stores a record consisted of the file number Mfi of the front still image Mki, and the front still image Mki corresponding to the file number Mfi.

As shown FIG. 31 (c), the back still image memory 79 stores a record consisted of the file number Bfi of the ack still image Bki, and the back still image Bki corresponding to the file number Bfi.

(The Explanation of Each Unit)

The third image/button transition management unit 70 retrieves the third front image button table 81a shown in FIG. 26 (a) when the first image/button transition management unit 45 determines the front image mode. Then, the third image/button transition management unit 70 starts the front image record/stock/comparison unit 86 when the touch panel coordinates TGi indicate the record button D4, the stock button D6, or the comparison button D5.

The third image/button transition management unit 70 retrieves the third back image button table 81b shown in FIG. 26 (b) when the first image/button transition management unit 45 determines the back image mode. Then, the third image/button transition management unit 70 starts the back image record/stock/comparison unit 87 when the touch panel coordinates TGi indicate the record button D4, the stock button D6, or the comparison button D5.

Moreover, the third image/button transition management unit 70 retrieves the third front and back images button table 81c shown in FIG. 27 (a) when the first image/button transition management unit 45 determines the front and back images mode. Then, the third image/button transition management unit 70 starts the front and back images record/stock/comparison unit 72 when the touch panel coordinates indicate the record button D4, the stock button D6, or the comparison button D5.

(The Explanation of the Front and Back Images Record/Stock/Comparison Unit 72)

Figure 32:
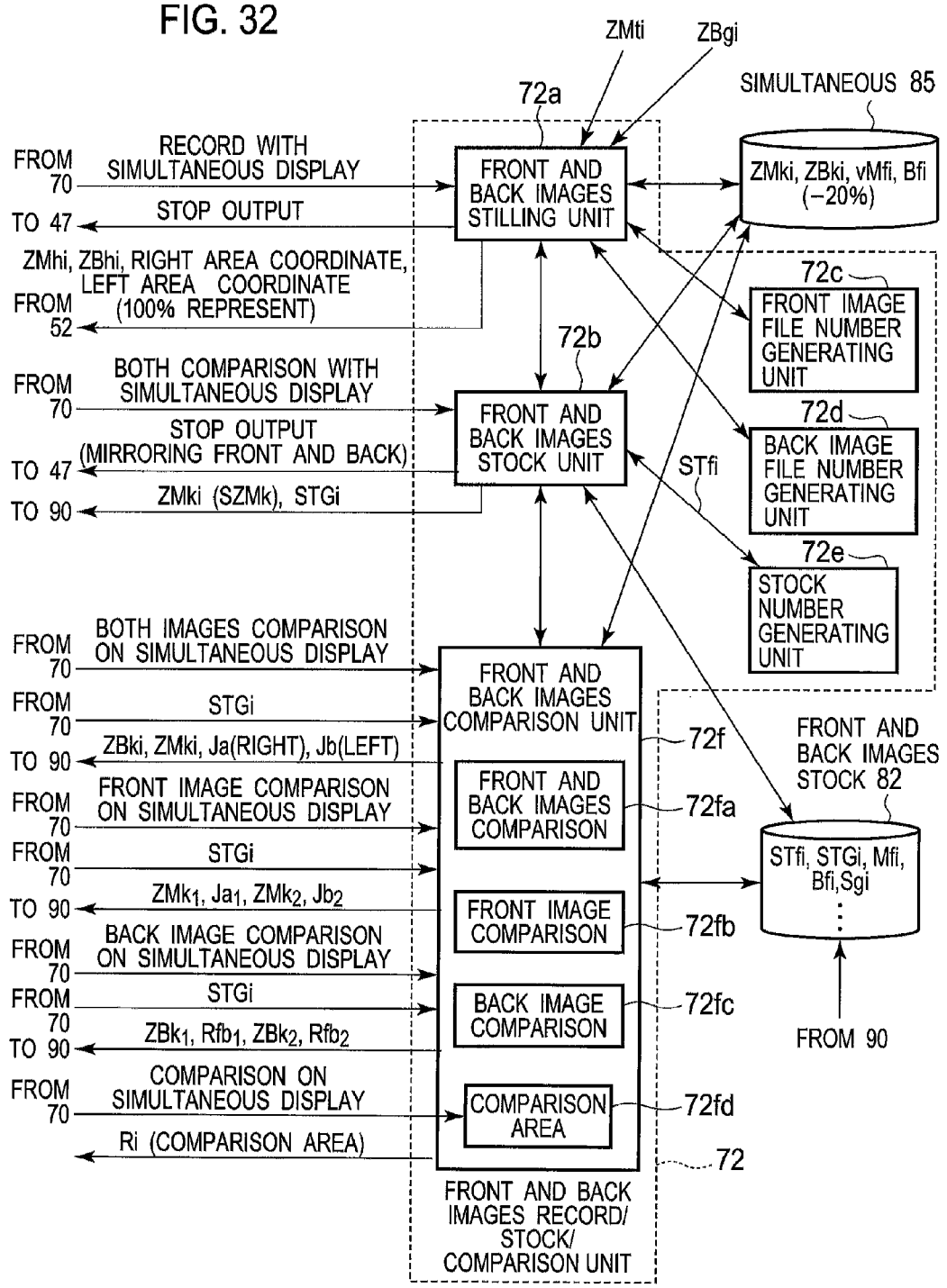
[FIG. 32]

FIG. 32 is an outline block diagram of the front and back images record/ stock/comparison unit 72.

As shown in FIG. 32, the front and back images record/stock/comparison unit 72 comprises a front and back images stilling unit 72a, a front and back images stock unit 72b, a front image file number generating unit 72c, a back image file number generating unit 72d, a stock number generating unit 72e, and a front and back images comparison unit 72f.

The front and back images stilling unit 72a is started when the third image/button transition management unit 70 determines that the record button is selected in the front and back images mode.

At start, the front and back images stilling unit 72a reads the front image ZMti (one frame) and the back image ZBgi to store in the simultaneous display image memory 85, then sends a stop output signal to the display image selecting unit 47. When the images are stored in the simultaneous display image memory 85, the resolution of each image is decreased by about 20 percents (the front still image ZMki and the back still image ZBki).

At the time, the front and back images stilling unit 72a starts the front image file number generating unit 72c and the back image file number generating unit 72d. Then, the front and back images stilling unit 72a relates the front image file number Mfi generated by the front image file number generating unit 72c and the back image file number Bfi generated by the back image file number generating unit 72d to the front still image ZMki and the back still image ZBki respectively (a front and back still images information) to store in the simultaneous display image memory 85 (refer to FIG. 31).

The front and back images stilling unit 72a represents the front still image ZMki and the back still image ZBki stored in the simultaneous display image memory 85 with the high resolution (100 percents representation). Then, the front and back images stilling unit 72a sends the represented images to the front and back images storing unit 54 as the front still image ZMhi and the back still image ZBhi in order to store in the image display memory 49a for displaying on the flat panel television 10 simultaneously.

The front and back images stock unit 72b is started when the third image/button transition management unit 70 determines that the stock button (STOCK) is selected in the front and back images mode.

At start, the front and back images stock unit 72b displays the present front still image ZMhi on the stock area ST by reducing the size with the decreased resolution, and stores the back still image ZBhi displayed simultaneously by linking with the front still image ZMhi.

In detail, the front and back images stock unit 72b reads the front still image ZMki and the back still image ZBki having the file number Bif of the back still image linked with the front still image ZMki from the simultaneous display image memory 85. Then, the front and back images stock unit 72b starts the stock number generating unit 72e and creates a information (a front and back images stock information) by relating the stock number Sgi described later with the stock file number STfi, the file number Mfi of the front still image ZMki and the file number Bif of the back still image ZBki stored in the simultaneous display image memory 85, and the stock area coordinates STgi to store in the front and back images stock memory 82.

Next, the front and back images stock unit 72b reads the front still image ZMki having the front image file number Mfi stored in the front and back images stock memory 82 from the front and back still images memory 85, and outputs the image with the stock area coordinates STGi to the front and back images stock area storing unit 90 in order to display the front stock image SZMki only on the stock area ST. When the front and back images stock area storing unit 90 displays the front stock image SZMki on the stock area ST, the related stock number Sgi is generated and stored in the front and back images stock memory 82. At the time, the third image/button transition management unit 70 changes the mode to the simultaneous display mode.

On the other hand, the image comparison unit 72f comprises a front and back images comparison process 72fa, a front image comparison process 72fb, and a back image comparison process 72fc, and a comparison area creating process 72fd.

The comparison area creating process 72fd displays a comparison area Ri having a plurality of frames at start of the front and back images comparison process 72fa, the front image comparison process 72fb, or the back image comparison process 72fc.

The front and back images comparison process 72fa is started when the third image/button transition management unit 70 determines that the front and back images comparison button is selected in the front and back images mode.

The front and back images comparison process 72fa reads the file number Mfi of the front still image ZMki and the file number Bfi of the back still image ZBki linked with the front stock image SZMki from the front and back images stock memory 82 whenever the front stock image SZMki displayed on the stock area ST is selected.

Then, the front and back images comparison process 72fa reads the front still image ZMki having the file number Mfi and the back still image ZBki having the file number Bfi from the simultaneous display image memory 85. The front and back images comparison process 72f sends the images and the coordinates Ji (right frame coordinates ja, left frame coordinates jb) of the comparison area Ri to the front and back images storing unit 52 in order to display the images by arranging on the comparison area Ri in the flat panel television 10. The coordinates Ji (right frame coordinate ja, left frame coordinate jb) corresponds to a frame number.

The front image comparison process 72fb is started when the third image/button transition management unit 70 determines that the front image comparison button is selected in the front and back images mode.

The front image comparison process 72fb reads the file number Mfi of the front still image ZMki linked with the front stock image SZMki from the front and back images stock memory 82 whenever the front stock image SZMki displayed on the stock area ST is selected.

Then, the front image comparison process 72fb reads the front still image ZMki having the file number Mfi from the simultaneous image display memory 85. The front image comparison process 72fb sends the image and the coordinates Ji of the comparison area Ri to the front and back images storing unit 52 in order to display the image by arranging on the comparison area Ri in the flat panel television 10.

For instance, the stock image ZMki selected first is displayed in the right frame and the stock image ZMki selected next is displayed in the left frame.

The back image comparison process 72fc is started when the third image/button transition management unit 70 determines that the back image comparison button (compare the back image only) is selected in the front and back images mode.

The back image comparison process 72fc reads the file number Bfi of the back still image ZBki linked with the front stock image SZMki from the front and back images stock memory 82 whenever the front stock image SZMki displayed on the stock area ST is selected. Then, the back image comparison process 72fc reads the back still image ZBki having the file number Bfi from the simultaneous display image memory 85. The back image comparison process 72fc sends the image and the coordinates Ji of the comparison area Ri to the front and back images storing unit 52 in order to display the image by arranging on the comparison area Ri.

For instance, the stock image ZBki selected first is displayed in the right frame and the stock image ZBki selected next is displayed in the left frame.

(The Front Image Record/Stock/Comparison Unit 86)

The front image record/stock/comparison unit 86 is started when it is determined that the record button is selected in the front image mode.

At start, the front image record/stock/comparison unit 86 is reads the front image Msi (one frame) and decreases the resolution of the image (–20 percents) to store in the front still image memory 78 as the front still image Mki. At the time, the front image record/stock/comparison unit 86 starts the front image file number generating unit 72c, and the file number Mfi is stored in the front still image memory 78 with the image.

The front image record/stock/comparison unit 86 outputs the front still image Mki (with Mfi) in the front still image memory 78 to the image storing unit 48 in order to store in the image display memory 49a for displaying the front still image Mhi.

When the third image/button transition management unit 70 determines that the stock button is selected in the front image mode, the front image record/stock/comparison unit 86 reads the front still image Mki having the file number Mfi of the front still image Mhi (touched the panel) from the front image memory 78. Then, the front image record/stock/comparison unit 86 reads the stock area coordinates STgi and stores the front still image Mki as the front stock image SMki in the front image stock memory 83 by relating with the file number Mfi and the stock area coordinates STgi (STgi, SMki, Mfi, and Sgi are called a front image stock information).

The front image record/stock/comparison unit 86 outputs the front image stock information to the front and back images stock area storing unit 90 in order to store in the stock area display memory 49d for displaying on the stock area ST.

When it is determined that the comparison button is selected in the front image mode, the front image record/stock/comparison unit 86 reads the front still image Mki having the file number Mfi linked with the front stock image SMki from the front image stock memory 83 whenever the front stock image SMki displayed on the stock area ST is selected. The image is displayed by arranging on the comparison area Ri having a plurality of frames.

(The Back Image Record/Stock/Comparison Unit)

The back image record/stock/comparison unit 87 is started when it is determined that the record button is selected in the front image mode.

At start, the front image record/stock/comparison unit 87 is reads the back image Bsi (one frame) and decreases the resolution of the image (–20 percents) to store in the back still image memory 79 as the back still image Bki. At the time, the back image record/stock/comparison unit 87 starts the back image file number generating unit, and the file number Bfi is stored in the back still image memory 79 with the image.

The back image record/stock/comparison unit 87 represents the back still image Bki stored in the back still image memory 79 with the high resolution (100 percents). Then, the back image record/stock/comparison unit 87 sends the represented images to the image storing unit 48 (with Bhi) in order to store in the image display memory 49a for displaying the back still image Bhi.

When the third image/button transition management unit 70 determines that the stock button is selected in the front image mode, the back image record/stock/comparison unit 87 reads the back still image Bki having the file number Bfi of the back still image Bhi (touched the panel) from the back image memory 79. Then, the back image record/stock/comparison unit 87 reads the stock area coordinates STgi and stores the back still image Bki as the back stock image SBki in the back image stock memory 84 by relating with the file number Bfi and the stock area coordinates STgi (STgi, SBki, Bfi, and Sgi are called a back image stock information).

The back image record/stock/comparison unit 87 outputs the back image stock information to the front and back images stock area storing unit 90 in order to store in the stock area display memory 49d for displaying on the stock area ST.

When it is determined that the comparison button is selected in the back image mode, the back image record/stock/comparison unit 87 reads the back still image Bki having the file number Bfi linked with the back stock image SBki from the back image stock memory 84 whenever the back stock image SBki displayed on the stock area ST is selected. The image is displayed by arranging on the comparison area Ri having a plurality of frames.

(The Explanation of Operation)

The operations of the electronic mirroring system of the embodiment 3 composed as stated above are explained.

Figure 33:
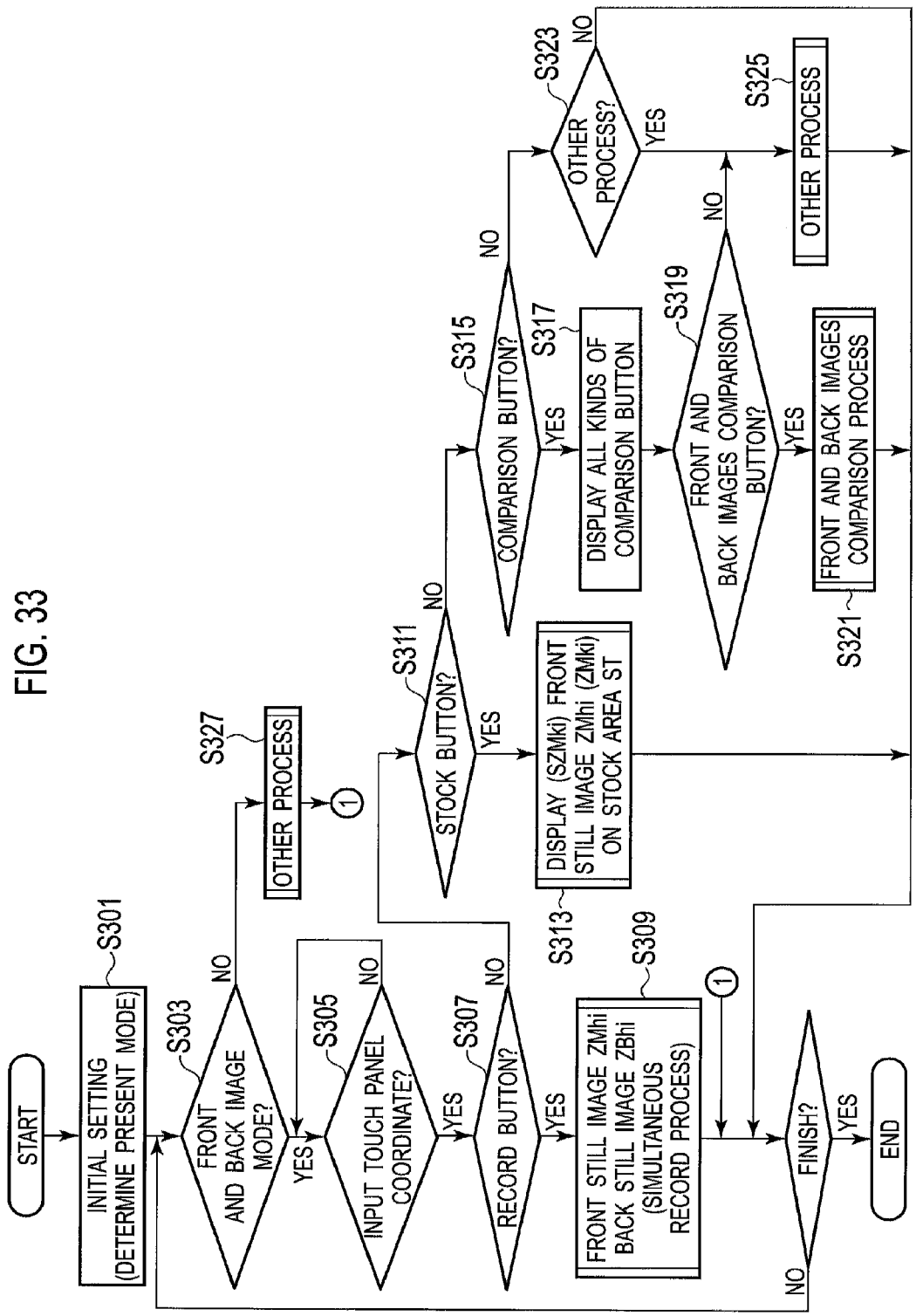
[FIG. 33]
Figure 35:
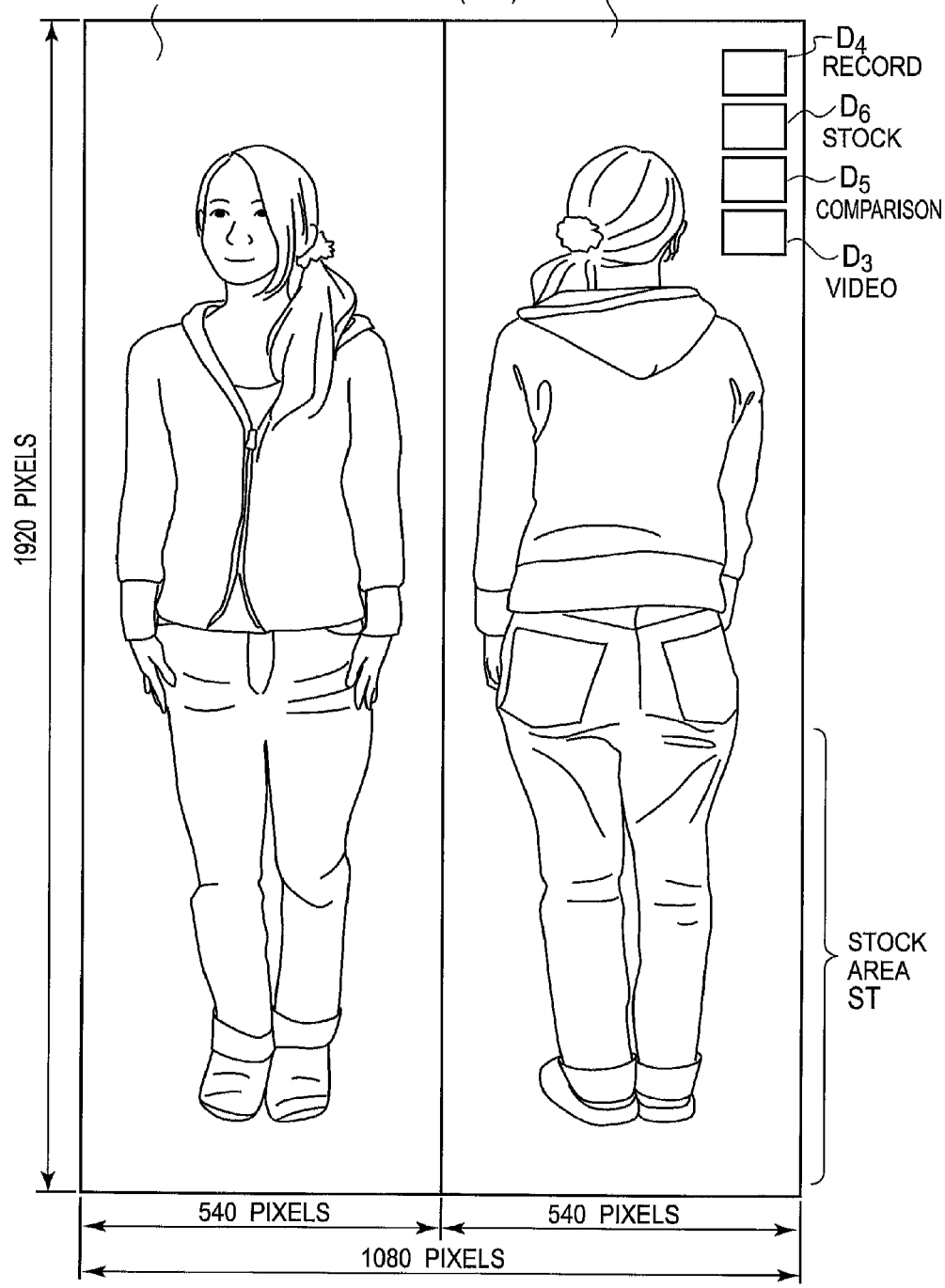
[FIG. 35]

FIG. 33 is a flow chart to explain the process of the electronic mirroring system according to the embodiment 3. The condition for the following explanation is assumed that the mirroring front image ZMi (ZMti), the mirroring back image ZBi (ZBgi) and various buttons are displayed on the flat panel television 10 at the same time as shown in FIG. 35, and the present mode determined by the third image/button transition management unit 70 is the front and back images mode.

As shown in FIG. 33, the third image/button transition management unit 70 determines the present mode while each unit is in operation state (S302 initial setting).

Next, the third image/button transition management unit 70 compares the determined result of the step S302 with the front and back images mode (S303).

When the third image/button transition management unit 70 determines the front and back images mode at the step S303, the third image/button transition management unit 70 retrieves the third front and back images button table 81c (refer to FIG. 27 (a)) and determines whether the touch panel coordinates TGi are inputted (S305).

If it is confirmed that the touch panel coordinates TGi are inputted as a result of the step S305, the third image/button transition management unit 70 determines whether the selected button is the record button by comparing the touch panel coordinates TGi with the data in the third front and back images button table 81c (S307).

Specifically, the third image/button transition management unit 70 retrieves the third front and back images button table 81c, and compares the inputted touch panel coordinates TGi with the data in the third front and back images button table 81c. If the touch panel coordinates TGi match the coordinates corresponded to the record button, it is determined that the record button is selected in the front and back images mode.

Figure 37:
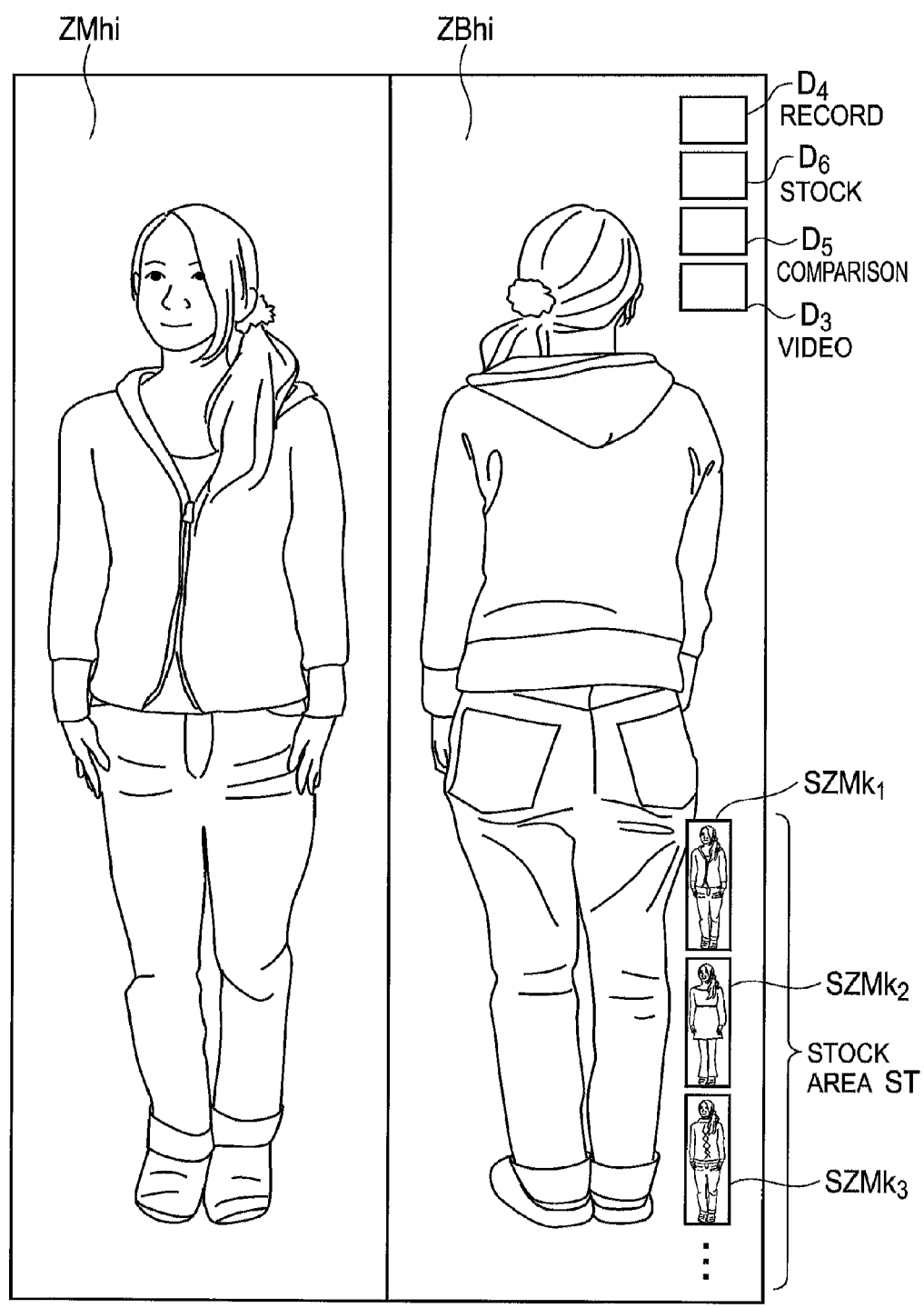
[FIG. 37]

If it is determined that the record button is selected, the third image /button transition management unit 70 starts the front and back images record/stock/comparison unit 72 to record the front image ZMti and the back image ZBgi (displaying the front still image ZMhi and the back still image ZBhi refer to FIG. 37) (S309).

Figure 34:
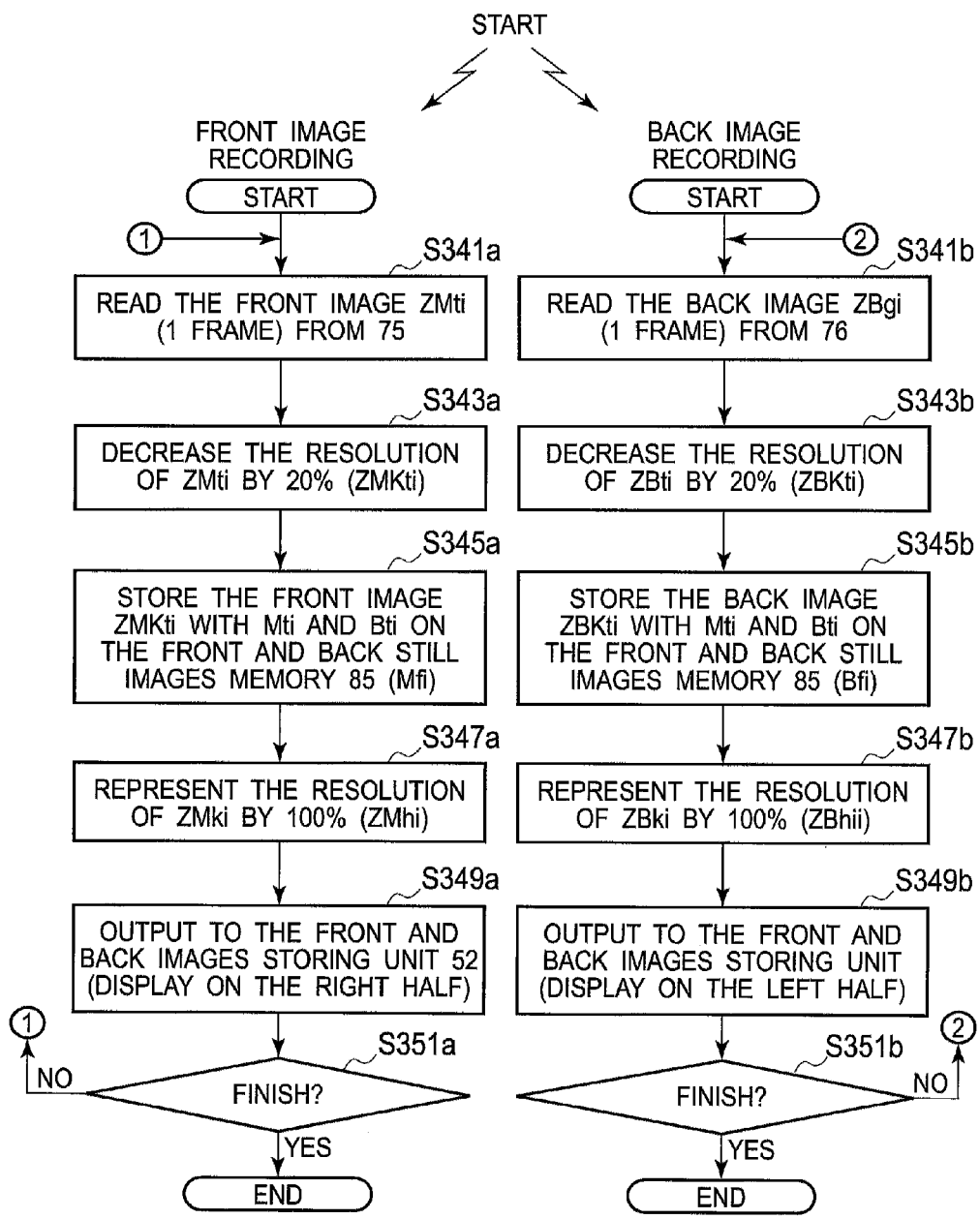
[FIG. 34]

The simultaneous record process is explained by referring to the flow chart of FIG. 34.

The front and back images record/stock/comparison unit 72 reads the front image ZMti (one frame) and the back image ZBgi (S341a and S341b).

Next, the front and back images record/stock/comparison unit 72 stores the images (the front still image ZMki and the back still image ZBki) in the front and back still images memory 85 by decreasing the each resolution by about 20 percents (S343a and S343b). At the time, the front and back images stilling unit 72a starts the front image file number generating unit 72c and the back image file number generating unit 72d. Then, the front and back images stilling unit 72a relates the front image file number Mfi generated by the front image file number generating unit 72c and the back image file number Bfi generated by the back image file number generating unit 72d to the front still image ZMki and the back still image ZBki respectively and stores them (S345a and S345b).

The front and back images stilling unit 72a represents the front still image ZMki and the back still image ZBki stored in the front and back still images memory 85 with the high resolution (100 percents representation) (S347a and S347b).

Then, the front and back images stilling unit 72a sends the represented images to the front and back images storing unit 54 as the front still image ZMhi and the back still image ZBhi (S349a and S349b).

It is determined whether the process is finished. If the process is not yet finished, the process is returned to the step S341a or S341b (S351a or S351b).

In the meantime, the front and back images storing unit 52 reads the display area from the image storing control data generating unit 45b in the first image/button transition management unit 45. Then, the front and back images storing unit 52 stores the front still image ZMhi in the right half scale (about 540 pixels in length by 1680 pixels in width) indicated as the display area and the back still image ZBhi in the left half scale (about 540 pixels in length by 1680 pixels in width) indicated as the display area from the image storing control data generating unit 45b.

Figure 36:
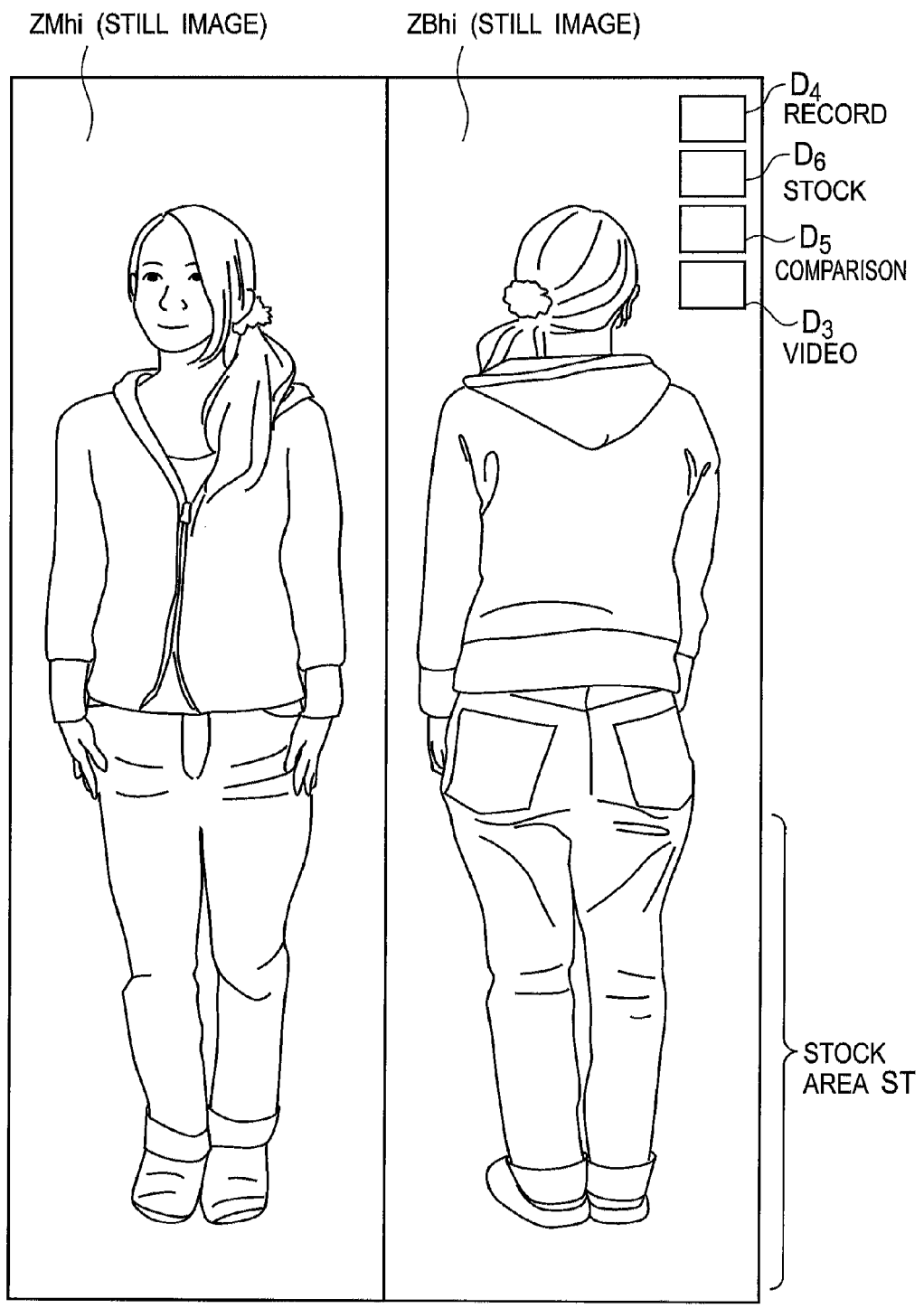
[FIG. 36]

The image output unit reads the image display memory 49a, the button display memory 49b and the effect display memory 49c periodically and displays both images on the flat panel television 10 as shown in FIG. 36.

On the other hand, if the selected button is not the record button at the step 307, the third image/button transition management unit 70 determines whether the selected button is the stock button (S311).

If the third image/button, transition management unit 70 determines that the stock button is selected at the step S311, the front and back images record/stock/comparison unit 72 executes the stock process to store the front still image ZMhi (ZMki) only on the stock area as shown FIG. 37 (S313).

Specifically, the front and back images stock unit 72b reads the front still image ZMki and the back still image ZBki having the file number Bif of the back still image linked with the front still image ZMki stored in the simultaneous display image memory 85.

Then, the front and back images stock unit 72b starts the stock number generating unit 72e and stores the information in the front and back images stock memory 82 by relating with the stock file number STfi, the file number Mfi of the front still image ZMki, the file number Bif of the back still image ZBki, and the stock area coordinates STgi stored in the simultaneous display image memory 85.

Next, the front and back images stock unit 72b reads the front still image ZMki having the front image file number Mfi stored in the front and back images stock memory 82 from the simultaneous display image memory 85, and outputs the image with the stock area coordinates STGi to the front and back images stock area storing unit 90 in order to display the front stock image SZMki only on the stock area ST as shown in FIG. 37.

On the stock area ST shown in FIG. 37, the stock image SMk1 stocked the simultaneous display of the pair of the front still image ZMh1 and the back still image ZBh1 is displayed. The stock image SMk2 stocked the simultaneous display of the pair of the front still image ZMh2 and the back still image ZBh2 is also displayed.

In addition, the stock image SMk3 stocked the simultaneous display of the pair of the front still image ZMh3 and the back still image ZBh3 is also displayed.

On the other hand, if the selected button is not the stock button at the step 311, the third image/button transition management unit 70 determines whether the selected button is the comparison button (S315).

If it is determined that the comparison button is selected at the step S315, the third image/button transition management unit 70 retrieves the simultaneous comparison button table 81d (refer to FIG. 27 (b)) to display the various comparison buttons (the front and back images comparison button (or the simultaneous comparison button)), the front comparison button, the back comparison button, a all comparison button, and so on) (S317).

The front comparison button is for comparing the front images only, the back comparison button is for comparing the back images only, and the all comparison button is for displaying all the images of the front and back in a thumbnail size.

Next, it is determined whether the simultaneous comparison button is selected (S319). If it is determined that the simultaneous comparison button is selected at the step S319, the simultaneous comparison process is executed (S321).

The simultaneous comparison process is explained in detail.

Figure 39:
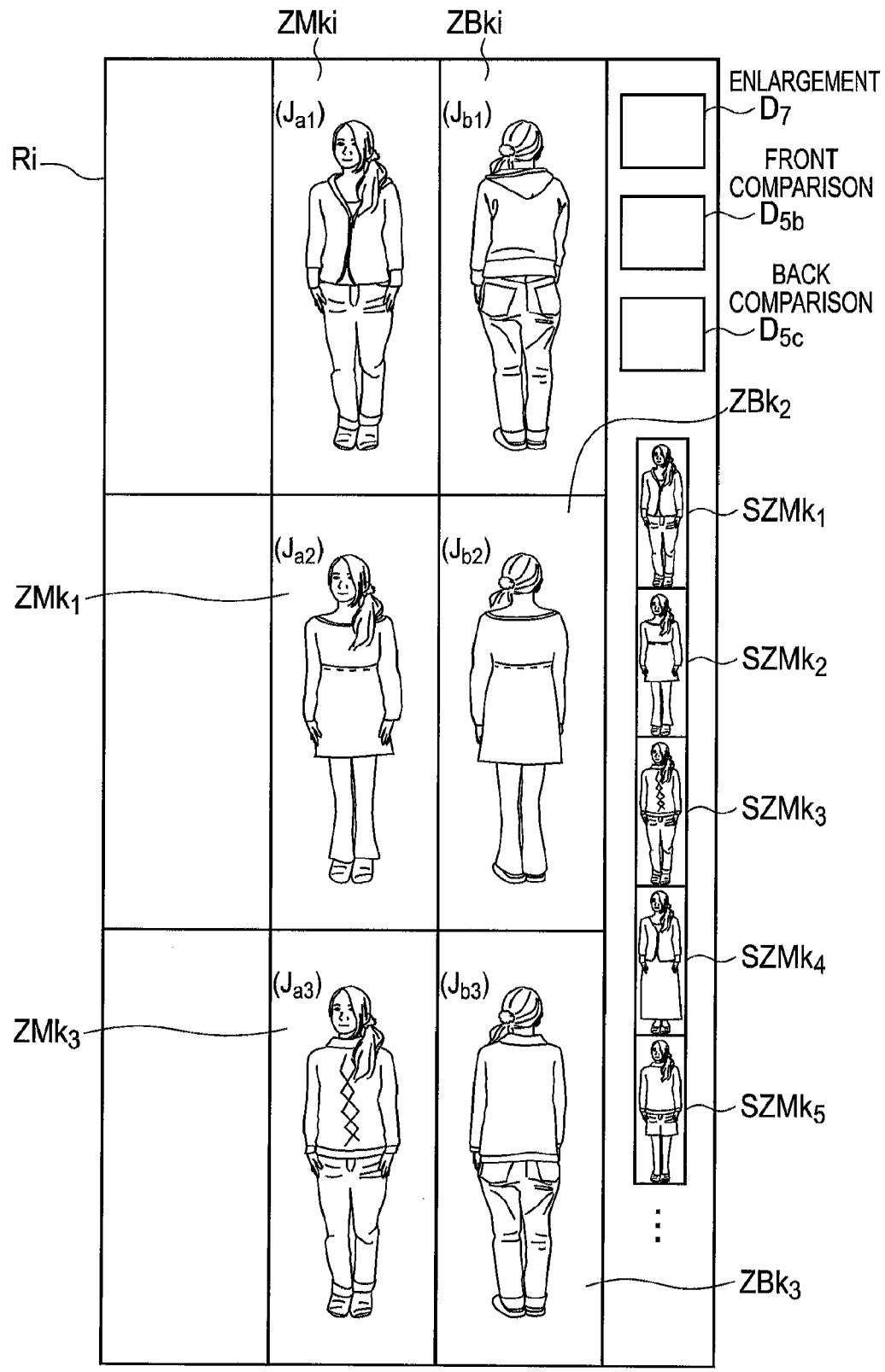
[FIG. 39]

The comparison area creating process 72fd of the front and back images comparison unit 72f displays the comparison area Ri having a plurality of frames as shown in FIG. 39 by the front and back images storing unit 52 at start. For instance, the comparison area Ri of nine frames as shown in FIG. 39 is created in the embodiment. The comparison area information (nine frames, a size of each frame, frame numbers, the right frame coordinates Jai (corresponding to the frame number), and the left frame coordinates Jbi (corresponding to the frame number)) is sent to the front and back images storing unit 52.

The front and back images storing unit 52 stores the display area based on the comparison area information in the image display memory 49a. The comparison area information is stored in the memories to manage by the front and back images comparison unit 72f and the front and back images storing unit 52.

The comparison area Ri may have two frames, four frames, six frames, nine frames, ten frames, twelve frames, . . . sixteen frames, . . . twenty-four frames and more.

Then, the front and back images comparison process 72fa reads the file number Mf1 of the front still image ZMk1 and the file number Bf1 of the back still image ZBk1 linked with the front stock image SZMki from the front and back images stock memory 82 whenever the front stock image SZMki displayed on the stock area ST is selected (touched).

The front still image ZMk1 having the file number Mf1 and the back still image ZBk1 having the file number Bf1 are read from the simultaneous display image memory 85.

The front and back images comparison unit 72f also sends the coordinates Ji (right frame coordinates Jai, left frame coordinates Jbi: i=1, 2, 3, . . . ) of the comparison area Ri to the front and back images storing unit 52.

The process explained above is executed whenever the front stock image SZMk1, SZMk2, SZMk3, . . . on the stock area are selected.

As a result, the front stock images and the back stock images corresponding to some front stock images displayed on the stock area are displayed in parallel as shown in FIG. 39.

Therefore, the images on the stock area are able to be compared by the front images and the back images at a glance.

Figure 38:
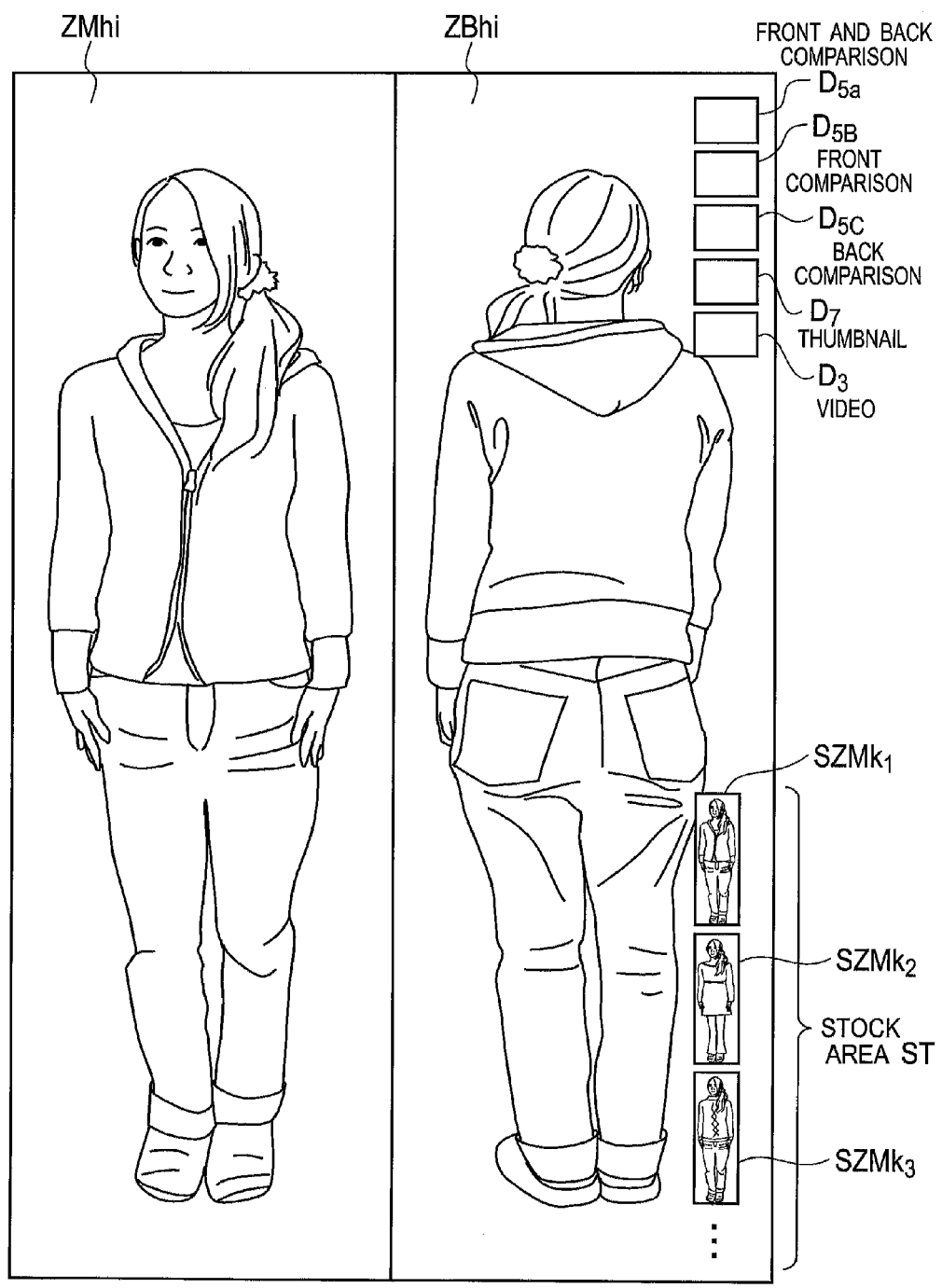
[FIG. 38]

In addition, when one of the frames of the comparison area Ri is touched after selecting an enlargement button, the front still image ZMhi and the back still image ZBhi are displayed as shown in FIG. 38.

Figure 40:
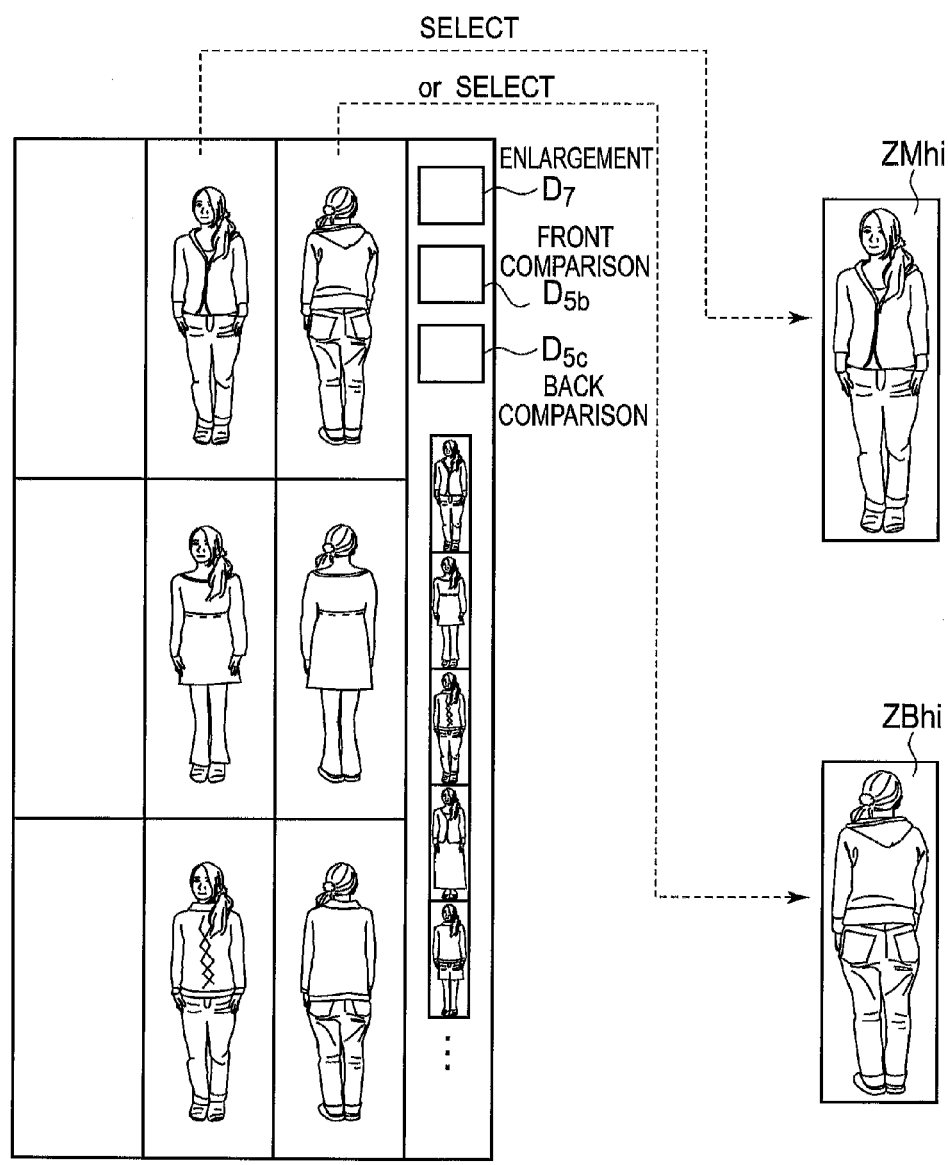
[FIG. 40]

Specifically, when the third image/button transition management unit 70 determines that the enlargement button is selected, the front still image ZMk1 having the file number linked with the frame number (for instance, the right frame coordinates Ja1) set in the comparison area information for the selected frame is read from the simultaneous display image memory 85. Then, the front still image represented with the 100 percents of resolution is sent to the front and back images storing unit 52 in order to display the front still image ZMhi (refer to FIG. 40).

When the top frame of the left side is selected, the back still image ZBk1 having the file number linked with the frame number (for instance, the right frame coordinates Rb1) for the selected frame is read from the simultaneous display image memory 85. Then, the back still image represented with the 100 percents of resolution is sent to the front and back images storing unit 52 in order to display the back still image ZBhi (refer to FIG. 40).

When the all comparison button is selected, thumbnail frames (about 20 frames) are displayed. Then, all pairs of the front image and the back image are read from the simultaneous display image memory 85 in order to display in the thumbnail frames by every ten pairs, for instance.

On the other hand, when the front comparison button or the back comparison button is selected, the images are read from the f simultaneous display image memory 85. Then the same process as the process of the front image record/stock/comparison unit 91 or the process of the back image record/stock/comparison unit 92 is executed.

(The Front Image Record/Stock/Comparison Unit)

Figure 41:
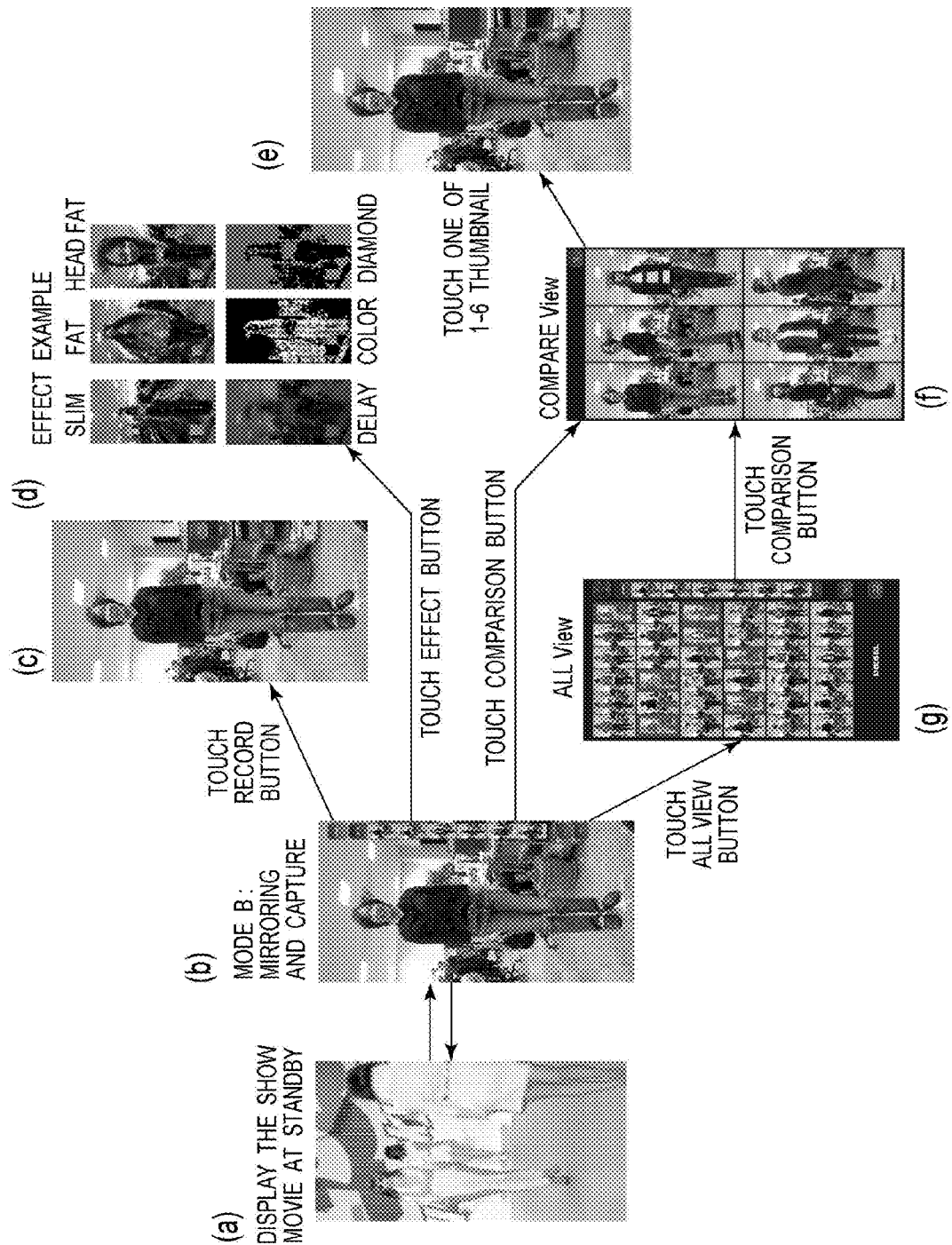
[FIG. 41] FIG. 41 (a) to (g) is an explanatory drawing to explain a front image record, stock and comparison process according to the embodiment 3.

The operation of the front image record/stock/comparison unit 91 is explained by referring to FIG. 41.

When the power is turned on, the first image/button transition management unit 45 orders the display image selecting unit 47 to display the video image as the video image is selected (refer to FIG. 41 (a)).

When the panel is touched next, the first image/button transition management unit 45 determines that the front image mode is selected and orders the display image selecting unit 47 to select the front image Msi and to display the image and the designated buttons after stopping the video play process (refer to FIG. 41 (b)). The stock button, the comparison button, the video button, the record (SHOOT) button, the thumbnail (ALL VIEW) button, and so on are displayed in the embodiment.

Then, when the record button is selected, the front image record/stock/comparison unit 91 is started by the third image/button transition management unit 70.

The front image record/stock/comparison unit 91 displays the recorded image (the front still image) as shown in FIG. 41 (c).

On the other hand, when the effect button is selected, the effect image is displayed by the second image/button transition management Unit as shown in FIG. 41 (d).

In addition, when the STOCK button is selected, the front image record/stock/comparison unit 91 displays the front still image corresponded to the present mirroring front image on the stock area by annulling the buttons in the record mode.

When the CANCEL button is selected, the still image pointed to delete is deleted from the memory 78 with annulling the buttons in the record mode.

When the comparison button is selected by touching, the comparison area is displayed and the front stock image selected on the stock area is displayed in the frame of the comparison area as shown in FIG. 41 (f).

In addition, when ALL VIEW button is selected, all the front still images are read from the memory and displayed in thumbnail size (refer to FIG. 41 (g).

Embodiment 4

Figure 42:
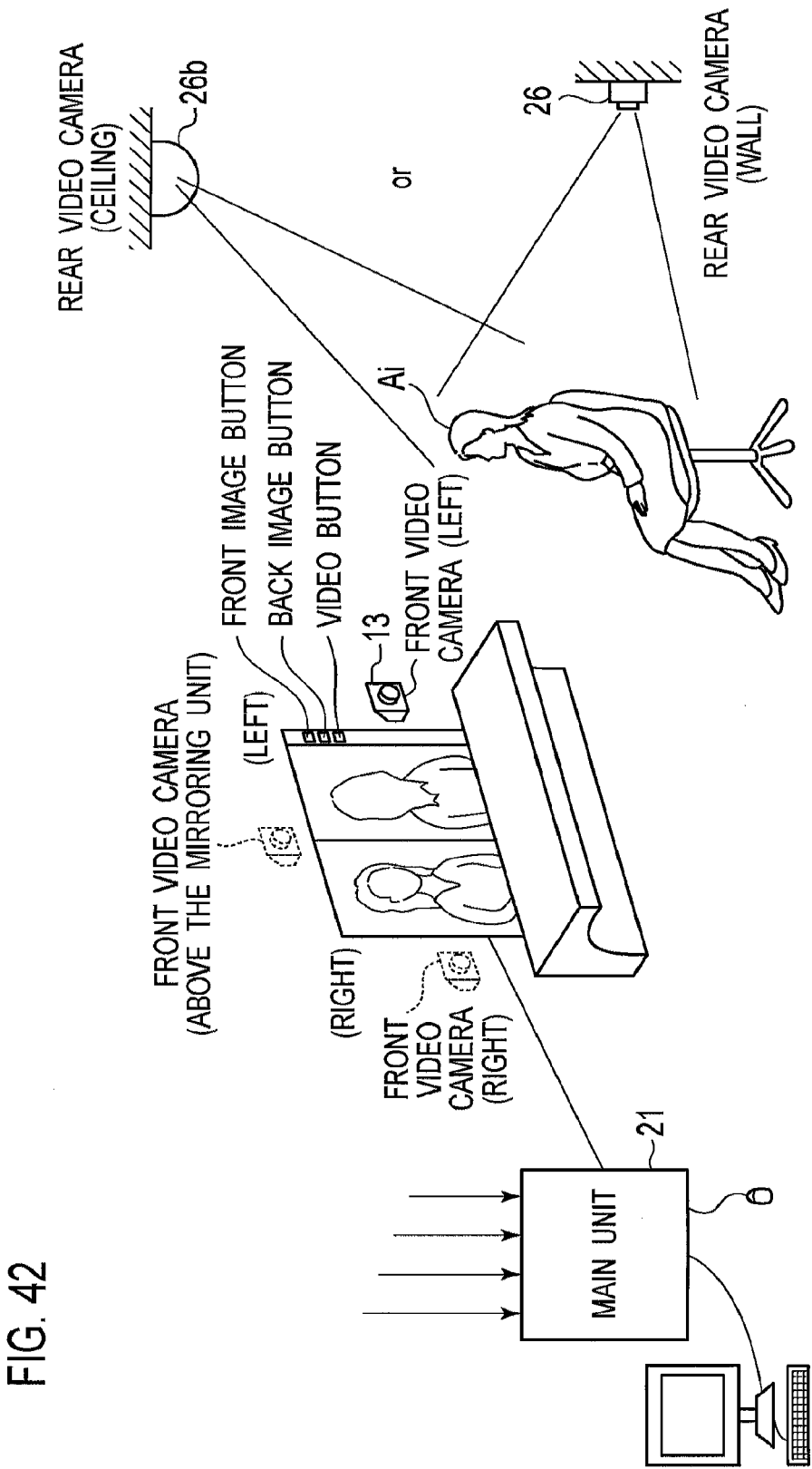
[FIG. 42]

The system above is explained as one example for the clothing store or a Japanese kimono store. The system as shown in FIG. 42 is possible to use in the beauty parlor or a hat shop. In FIG. 42, a dome camera 26b is installed on the ceiling as the rear video camera, or the rear video camera 26 is arranged just behind the subject Ai.

The size of the flat panel television is about 32 inches or 40 inches. The front video camera is arranged above the mirroring unit 12, or on the left side or the right side of the mirroring unit 12.

As a result, either of the pair of the front image and the back image, the pair of the front still image and the back still image, the front image (the front still image) only, or the back image (the back still image) only is displayed on the flat panel television 10 in the beauty parlor.

When the subject sit on a chair, the front image and the back image may be recorded before having hair cut. Then, after cutting is finished, the images of before and after are able to be compared by displaying at the same time on the comparison area.

Embodiment 5

Figure 43:
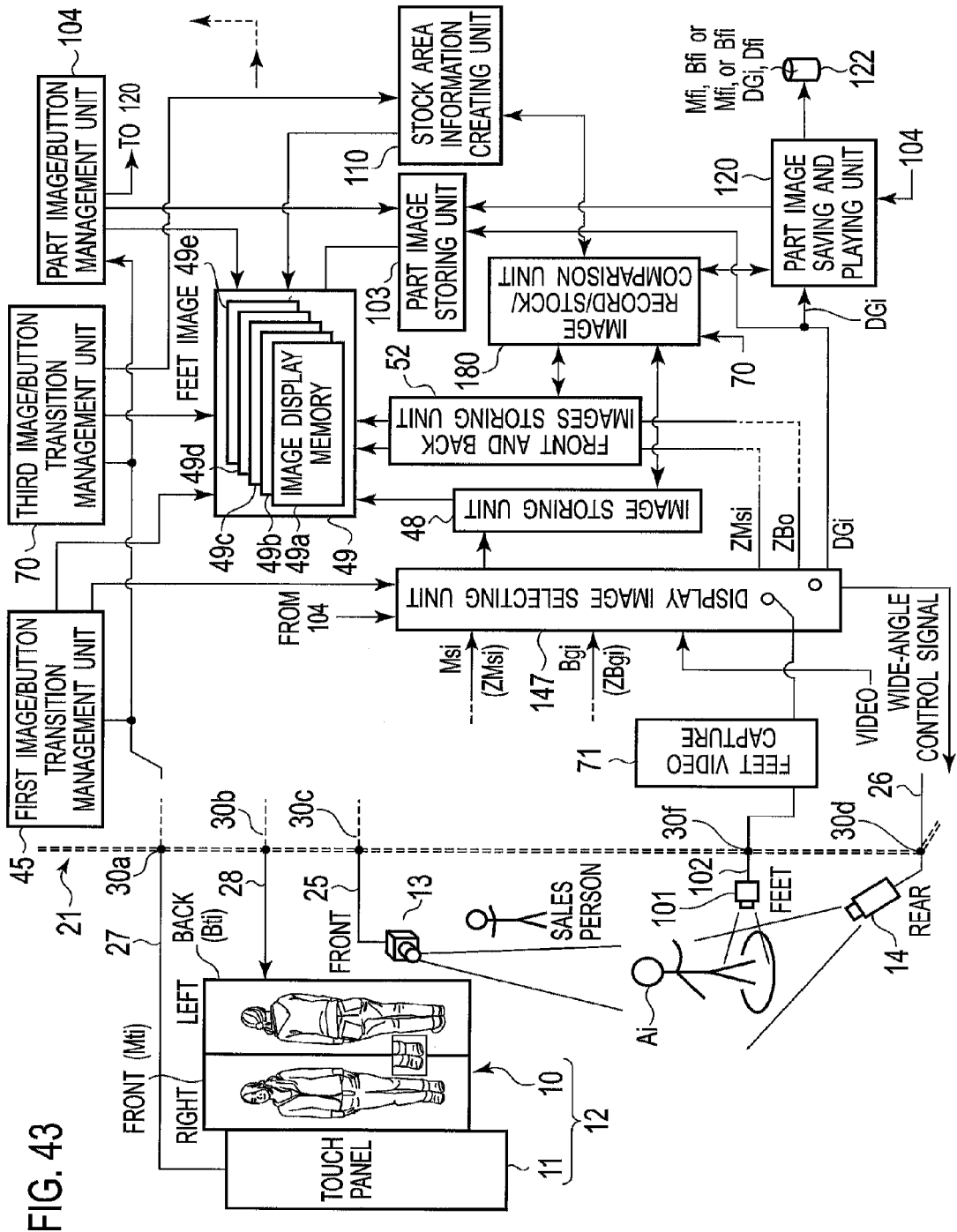
[FIG. 43]

FIG. 43 is an outline block diagram of the electronic mirroring system according to the embodiment 5. The explanation for the one in FIG. 43 with the same sign of each embodiment described above is omitted.

The panel controller 33, the image outputting unit 57, the front video capture 34, the back video capture 35, the front slimming unit 39, the back slimming unit 40, the video play unit 41, the front image buffer memory 36, the back image buffer memory 37, the hard disk 42, the glare eliminator 53, the front image area extracting unit 50, the back image area extracting unit 51, and the second image/button transition management unit 60 are omitted.

As shown in FIG. 43, a video camera (or a part recording video camera 101) for recording a part of the subject Ai (feet in the embodiment) is arranged. The part recording video camera 101 is connected to the main unit 20 with a cable 102 through a connector 30f. The part recording video camera 101 is installed in the wall on the mirroring unit side at the height of 15 centimeters to 20 centimeters facing the recording direction to the feet. In addition, the part recording video camera 101 has a CCD with the light receiving surface of 640 pixels by 480 pixels and a view angle to record the feet only.

The main unit 21 comprises a display image selecting unit 147, a part image saving and playing unit 121, a part image storing unit 103, a part image/button management unit 104, a video capture 71, and so on.

The display memory 49 has a part image display memory 49e to display a part image of feet (a feet image DGi) on the flat panel television 10.

The part image/button management unit 104 has a table (a part image button table: not shown) relating a part image button name (a part button) for displaying the feet image with a touch panel coordinates to display the button. The part button is displayed on the button area in the front image mode, the back image mode, or the front and back images mode. When the part button is selected, the part image/button management unit 104 sends the information that the part button is selected to the display image selecting unit 147 and the part image storing unit 103.

The display image selecting unit 147 has same function described above. Moreover, the display image selecting unit 147 outputs the image of the feet (the part image GDi) to the part image storing unit 103 by selecting with Msi, Bgi, or both Msi and Bgi when the part button is selected.

The part image storing unit 103 stores the part image GDi in the designated area of the part image display memory 49e to display the part image GDi (the mirroring part image GDi) by the image outputting unit.

Figure 44:
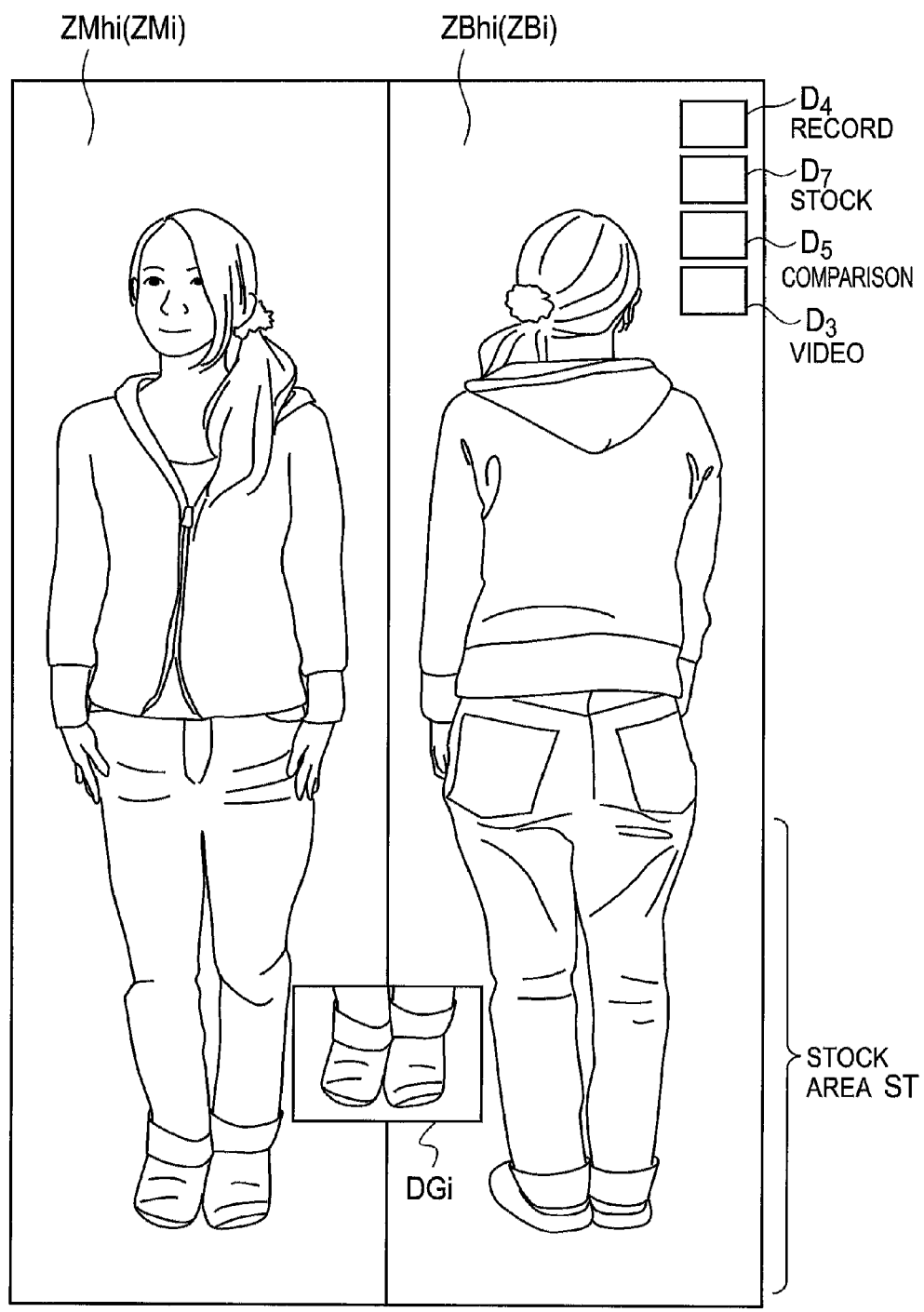
[FIG. 44]

As shown in FIG. 44, the mirroring part image DGi is displayed near the feet between the front image and the back image in the front and back images mode.

In the front and back images mode, the location to display the part image is set in the part image storing unit 103 as an area (coordinates) according to the kind of the part image in advance. The location near the feet between both images is preferable.

In the front image mode, the location to display the part image as shown in FIG. 44 is set in the part image storing unit 103 as an area (coordinates) in advance. The part image DGi may be displayed at the height of the knees in the front and back images mode.

Figure 45:
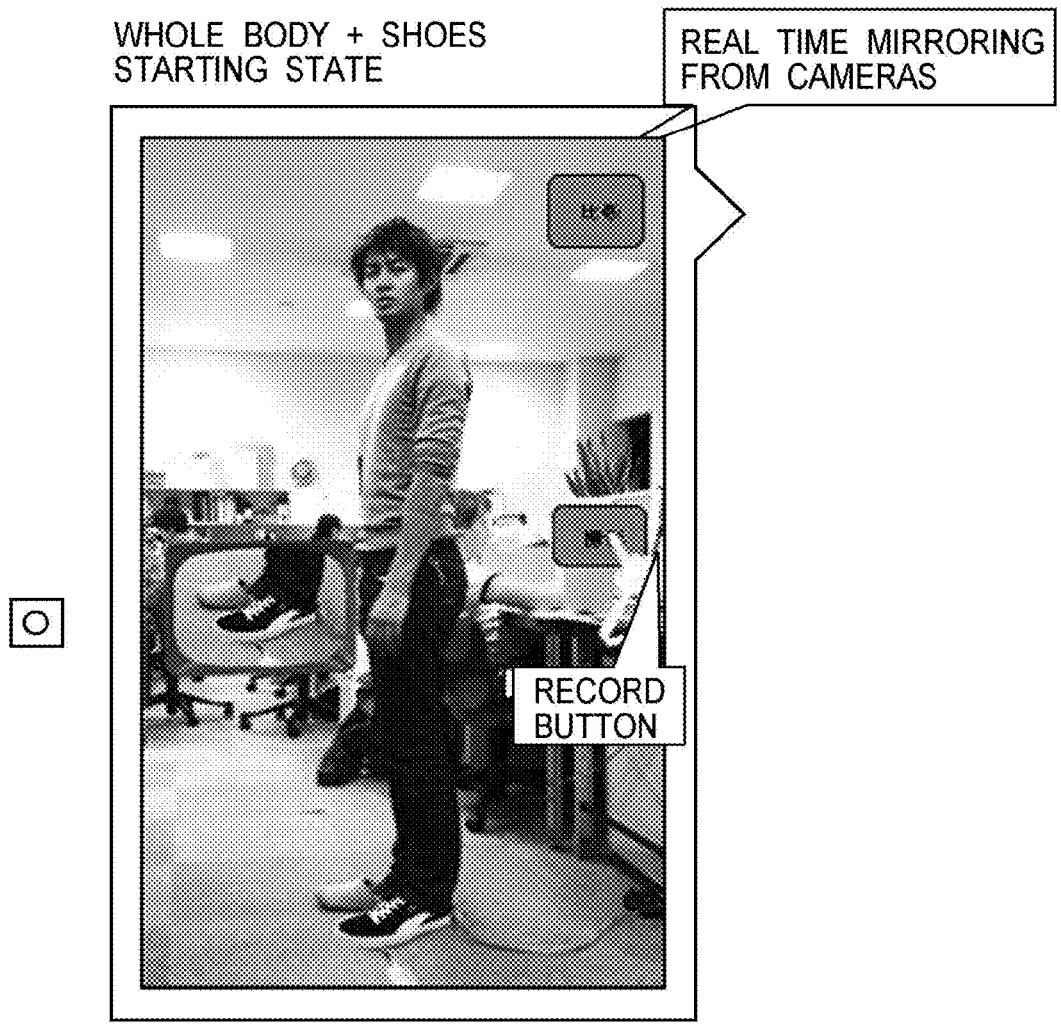
[FIG. 45]

As shown in FIG. 44, the part image recorded from the front is displayed with the back image so that the appearance of the shoes' back and the appearance of the shoes' front are checked at a glance. As shown in FIG. 45, the part image may be displayed near the waist.

In the front image mode, the back image mode, or the front and back images mode, the part image saving and playing unit 120 is memorized the part image GDi (the still image) in a part image memory 121 whenever the part image GDi is outputted (for each frame) when the part image/button management unit 104 determines that the record button for the part image is selected.

The part image saving and playing unit 120 reads the file number Mfi, the file number Bfi, or both the file numbers generated by the image record/stock/comparison unit 80. Then, the file number is saved with the part still image GDhi.

That is, both the file number Mfi and the file number Bfi are added when the record button is selected in the front and back images mode. The file number Mfi is added when the record button is selected in the front image mode. The file number Bfi is added when the record button is selected in the back image mode.

When the comparison button is selected in the front and back images mode, the part image saving and playing unit 120 reads the file number Mfi and the file number Bfi linked with the stock number Ji of the stock image selected on the stock area from the image record/stock/comparison unit 80. Then, the part still image Dhi is sent to the part image storing unit in order to display at the location as shown in FIG. 44.

When the comparison button is selected in the front image mode, the part image saving and playing unit 120 reads the file number Mfi linked with the stock number Ji of the stock image selected on the stock area from the image record/stock/comparison unit 80. Then, the part still image Dhi is sent to the part image storing unit 103 in order to display at the location as shown in FIG. 44.

Figure 46:
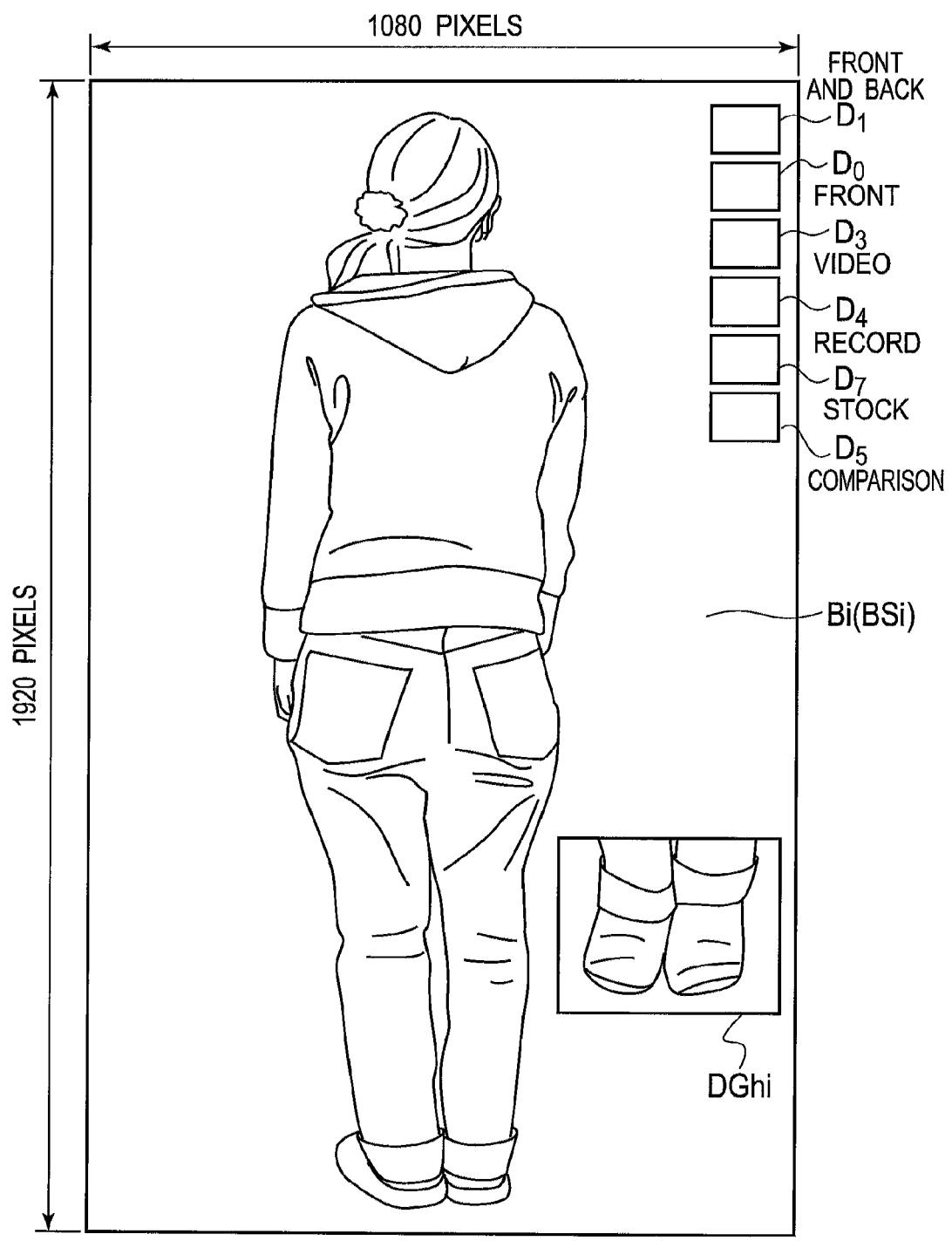
[FIG. 46]

When the comparison button is selected in the back image mode, the part image saving and playing unit 120 reads the file number Bfi linked with the stock number Ji of the stock image selected on the stock area from the image record/stock/comparison unit 80. Then, the part still image Dhi is sent to the part image storing unit 103 in order to display at the location as shown in FIG. 46.

Embodiment 6

Figure 47:
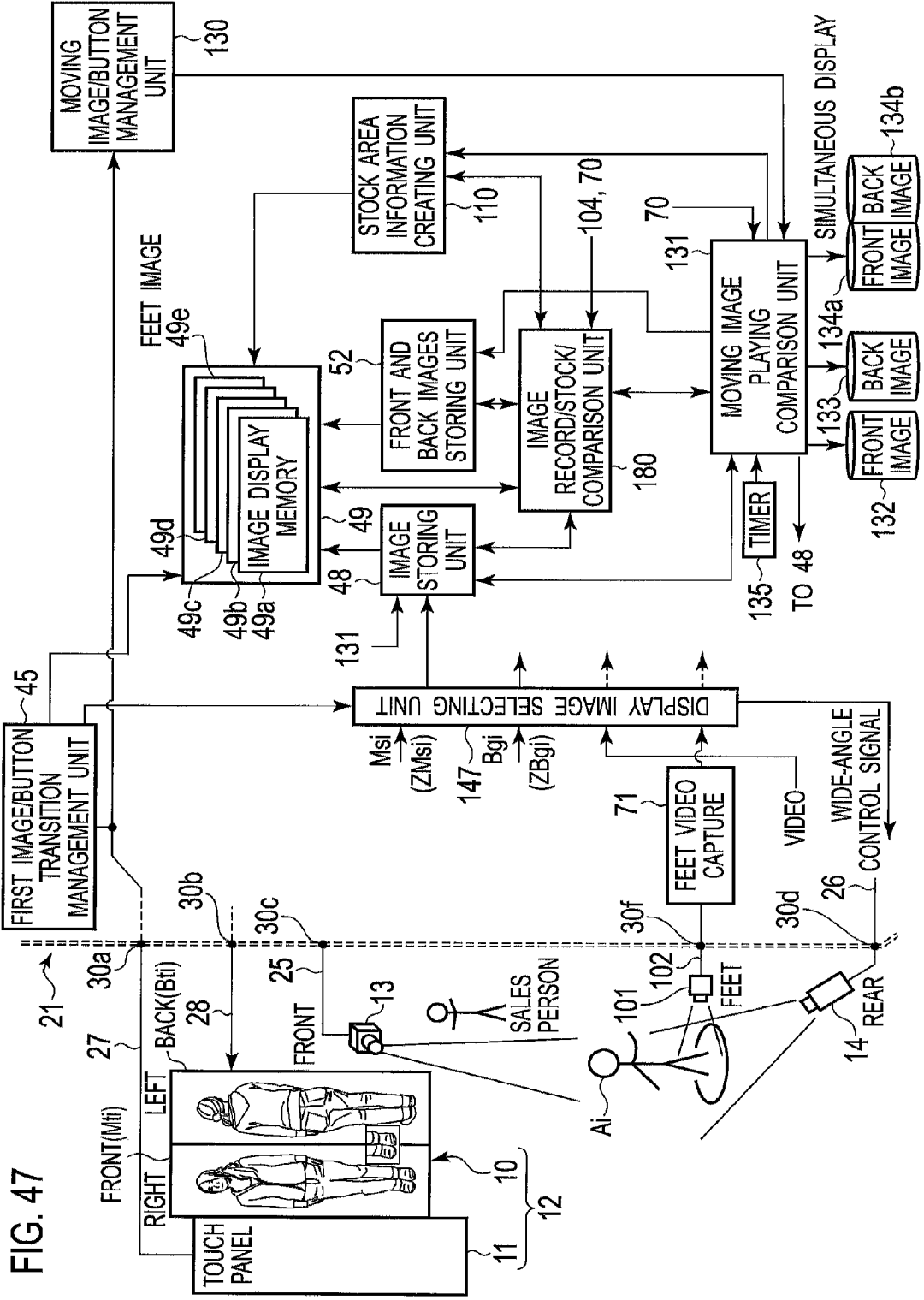
[FIG. 47]

FIG. 47 is an outline block diagram of the electronic mirroring system according to the embodiment 6. The explanation for the one in FIG. 47 with the same sign of each embodiment described above is omitted.

The panel controller 33, the image outputting unit 57, the front video capture 34, the back video capture 35, the front slimming unit 39, the back slimming unit 40, the video play unit 41, the front image buffer memory 36, the back image buffer memory 37, the hard disk 42, the glare eliminator 53, the front image area extracting unit 50, the back image area extracting unit 51, and the second image/button transition management unit 60, the third image/button transition management unit 70, the part image/button management unit 104, and the part image saving and playing unit 121 are omitted.

As shown in FIG. 47, the main unit 21 in the electronic mirroring system according to the embodiment 6 comprises a moving image/button management unit 130, a moving image stock/comparison unit 131, a timer 135, and so on.

When the third image/button transition management unit 70 determines that the mode is the front and back images record mode, the moving image/button management unit 130 stores the front image ZMai and the back image ZBgi for a designated period (a simultaneous moving images storing process).

When the play button is selected, the front image and the back image are played simultaneously (a simultaneous moving images playing process).

When the third image/button transition management unit 70 determines that the mode is the front image record mode, the moving image/button management unit 130 stores the front image ZMai for a designated period (a front moving image storing process). Then, when the play button is selected, the front image is played (a front moving image playing process).

When the third image/button transition management unit 70 determines that the mode is the back image record mode, the moving image/button management unit 130 stores the back image ZBai for a designated period (a back moving image storing process). Then, when the play button is selected, the back image is played (a back moving image playing process).

In addition, when the play button is selected in the simultaneous comparison mode, the moving image/button management unit 130 plays the selected image (the front image and the back image) on the comparison area. The process for playing the moving images on the comparison area in the front and back images display is called a simultaneous moving images comparison playing process. The process for playing the moving image on the comparison area in the front image display is called a front moving image comparison playing process. The process for playing the moving image on the comparison area in the back image display is called a back moving image comparison playing process.

The moving image/button management unit 130 has a table (not shown) relating a moving image play button with a touch panel coordinates to display the button.

When the record button is selected in the front image mode, in the back image mode, or in the front and back images mode, the moving image stock/comparison unit 131 is started.

The moving image stock/comparison unit 131 executes the simultaneous moving images storing process, the simultaneous moving images playing process, the front moving image storing process, the front moving image playing process, the back moving image storing process, the back moving image playing process, the simultaneous moving images comparison playing process, the front moving image comparison playing process, the back moving image comparison playing process, and so on.

(The Simultaneous Moving Images Storing Process)

In the simultaneous moving images storing process, the front image ZMai and the back image ZBgi from the display image selecting unit 147 are stored in a front moving image memory for the simultaneous play 134a and a back moving image memory for the simultaneous play 134b sequentially. The front and back images record/stock/comparison unit 72 in the image record/stock/comparison unit 180 reads the file number Mfi and the file number Bfi stored in the front and back still images memory 85 with the front still image and the back still image so that the images related to the file numbers are stores one by one.

(The Simultaneous Moving Images Playing Process)

When the moving image/button management unit 130 determines that the play button is selected, the file number Mfi and the file number Bfi of the still images (the front and back) displaying at the moment is read from the front and back still images memory 85 managed by the front and back images record/stock/comparison unit 72. Then the front moving image of the file number Mfi is read from the front moving image memory for the simultaneous play 134a, and the back moving image of the file number Bfi is read from the back moving image memory for the simultaneous play 134b. The moving images are outputted to the front and back images storing unit 52 in order to play the moving images simultaneously. The images are represented with 100 percents of the resolution at the time.

FIG. 48 (*a*) and (*b*) show an example of the moving images displayed by the simultaneous moving images playing process.

FIG. 48 (*a*) is the front still image and the back still image in the simultaneous record mode, and FIG. 48 (*b*) is playing images (moving images) of the front till image and the back still image in the simultaneous record mode. The front motion and the back motion are able to be monitored at a glance.

(The Front Moving Image Storing Process)

In the front moving image storing process, the front image ZMai from the display image selecting unit 147 is stored in a front moving image memory 132 sequentially. The front image record/stock/comparison unit 86 in the image record/stock/comparison unit 180 reads the file number Mfi stored in the front image memory 78 with the front still image so that the images related to the file numbers are stores one by one.

(The Front Moving Image Playing Process)

When the moving image/button management unit 130 determines that the play button is selected, the file number Mfi of the still image (the front and back) displaying at the moment is read from the front image memory 78 managed by the front image record/stock/comparison unit 86. Then the back moving image of the file number Mfi is read from the front moving image memory 132. The moving image is outputted to the image storing unit 48 in order to play the moving image. The image is represented with 100 percents of the resolution at the time.

FIG. 48 (*c*) is the front still image in the front record mode, and FIG. 48 (*d*) is a playing image (moving image) in the front record mode.

(The Back Moving Image Storing Process)

In the back moving image storing process, the back image ZBgi from the display image selecting unit 147 is stored in a back moving image memory 133 sequentially. The back image record/stock/comparison unit 87 in the image record/stock/comparison unit 180 reads the file number Bfi stored in the back still image memory 79 with the back still image so that the images related to the file numbers are stores one by one.

(The Back Moving Image Playing Process)

When the moving image/button management unit 130 determines that the play button is selected, the file number Bfi of the back still image displaying at the moment is read from the back still image memory 79 managed by the front image record/stock/comparison unit 86. Then the back moving image of the file number Bfi is read from the back moving image memory 133. The moving image is outputted to the image storing unit 48 in order to play the moving image. The image is represented with 100 percents of the resolution at the time.

FIG. 48 (*e*) is the back still image in the back record mode, and FIG. 48 (*f*) is a playing image (moving image) in the back record mode.

The designated period is measured by the timer 135, and the image is recorded for ten seconds or twenty seconds, for instance. The recorded image may be stored after compression.

(The Simultaneous Moving Images Comparison Playing Process)

In case the front image of the stock area and the back image corresponded to the front image are displayed on the comparison area in the simultaneous comparison mode, the moving image stock/comparison unit 131 plays the moving image of the selected image in the selected frame of the comparison area when one of the images is selected and the play button is touched (refer to FIG. 49 (*a*) and (*b*)).

That is, the front and back images record/stock/comparison unit 72 in the image record/stock/comparison unit 180 reads the file number Mfi and the file number Bfi linked with the frame coordinates Ji (corresponding to the frame number) of the comparison area. Then the front moving image of the file number Mfi is read from the memory 134a, and the back moving image of the file number Bfi is read from the memory 134b one by one. The moving images are outputted to the front and back images storing unit 52 in order to play the moving images for the front image and the back image on the comparison area as shown in FIG. 49 (*a*) and (*b*).

FIG. 49 (*b*) shows that the moving image for the front image is played when the front image of the frame Ja1 is selected in FIG. 49 (*a*).

(The Front Moving Image Comparison Playing Process)

In case the front image of the stock area is displayed on the comparison area in the front image comparison mode, the moving image stock/comparison unit 131 plays the moving image of the selected image in the selected frame when one of the frames of the comparison area is selected and the play button is touched (refer to FIG. 49 (*c*) and (*d*)).

That is, the front image record/stock/comparison unit 86 in the image record/stock/comparison unit 180 reads the file number Mfi linked with the frame coordinates Ji (corresponding to the frame number) of the comparison area. Then the front moving image of the file number Mfi is read from the memory 134*a* one by one. The moving images are outputted to the image storing unit 48 in order to play the moving image for the selected front image on the comparison area as shown in FIG. 49 (*c*) and (*d*).

FIG. 49 (*d*) shows that the moving image is played when the frame Ja1 is selected in FIG. 49 (*c*).

(The Back Moving Image Comparison Playing Process)

In case the back image of the stock area is displayed on the comparison area in the back image comparison mode, the moving image stock/comparison unit 131 plays the moving image of the selected image in the selected frame when one of the frames of the comparison area is selected and the play button is touched (refer to FIGS. 49 (*e*) and (*f*).

That is, the back image record/stock/comparison unit 87 in the image record/stock/comparison unit 180 reads the file number Bfi linked with the frame coordinates Ji (corresponding to the frame number) of the comparison area. Then the front moving image of the file number Bfi is read from the memory 79 one by one. The moving images are outputted to the image storing unit 48 in order to play the moving image for the selected back image on the comparison area as shown in FIG. 49 (*e*) and (*f*).

FIG. 49 (*f*) shows that the moving image is played when the frame Ja1 is selected in FIG. 49 (*e*).

When an all play button is selected, all moving images are played for the front image, the back image, or the front and back images displayed in the frames of the comparison area.

The moving image may be played each time when the frame of the comparison area is selected. In addition, some moving images may be played at the same time by selecting the play button after some frames are selected.

Embodiment 7

Figure 50:
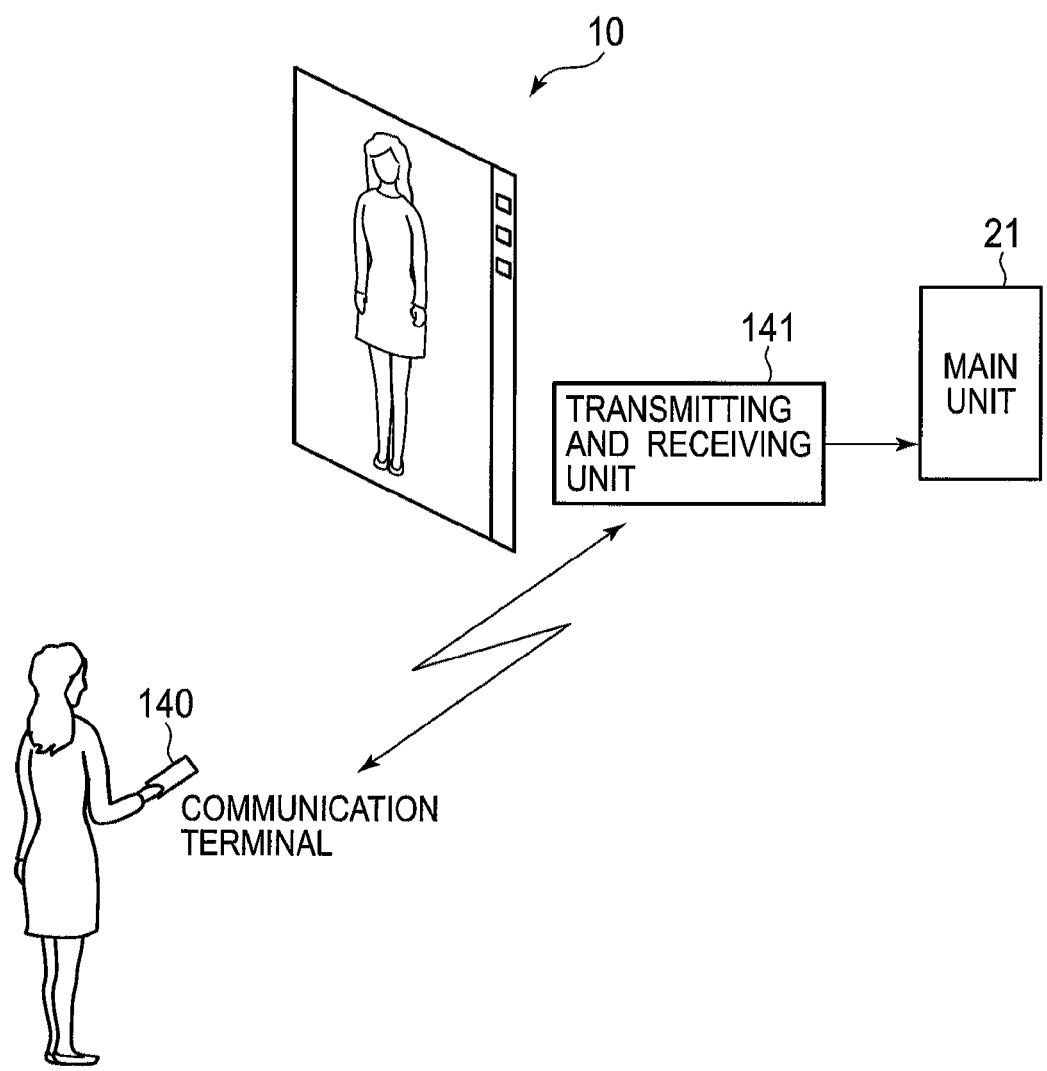
[FIG. 50]

FIG. 50 is an outline view of the electronic mirroring system according to the embodiment 7. As shown in FIG. 50, the electronic mirroring system comprises a communication terminal 140. A transmitting and receiving unit connected to the main unit receives a signal (an infrared signal or a radio wave signal for selecting a button instead of touching the panel). The main unit may have a function for decoding the received signal in order to send the coordinates corresponding with the button that supposed to be touched in place of the panel controller.

Thus, a target image (the front and back images, the front image, the back image, the moving image, the comparison image, and the stock image) is able to be obtained by standing toward the mirroring unit 10 even if the touch panel is not touched.

Other Embodiments

Figure 51:
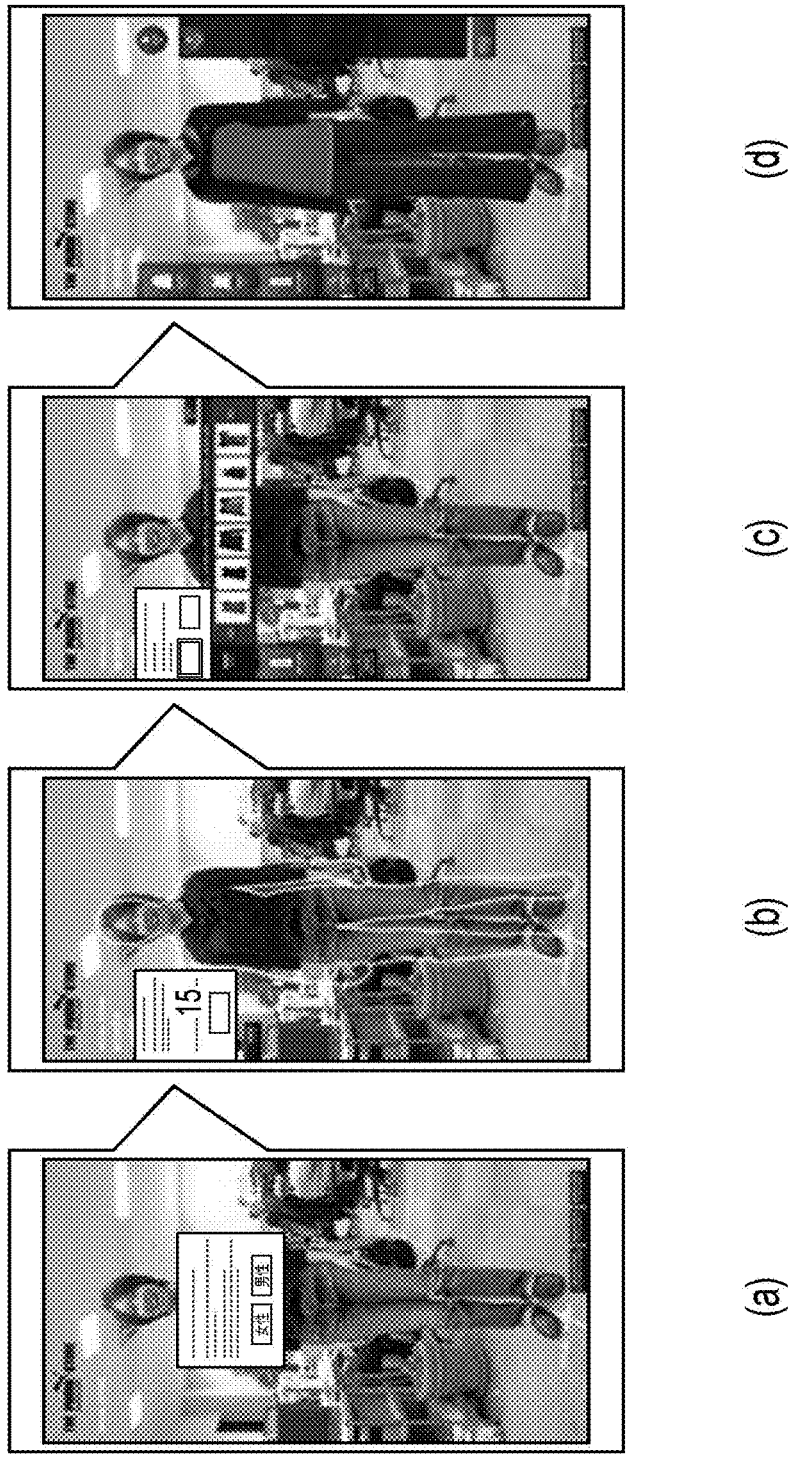
[FIG. 51] FIG. 51 (a) to (d) is an explanatory drawing of the electronic mirroring system according to other embodiments of the present invention.

The main unit may have the following function (process unit). That is, a window for inputting sexuality (female or male) is displayed on the front still image as shown in FIG. 51 (*a*). After sexuality is inputted, a predetermined human form Ei corresponding to the inputted sexuality is displayed over the front still image as shown in FIG. 51 (*b*). The human form is able to be adjusted in height or in width manually if necessary. Then, another window for selecting clothes is displayed as shown in FIG. 51 (*c*). The virtual images of the several selected clothes may be displayed over the front still image as shown in FIG. 51 (*d*).

Figure 52:
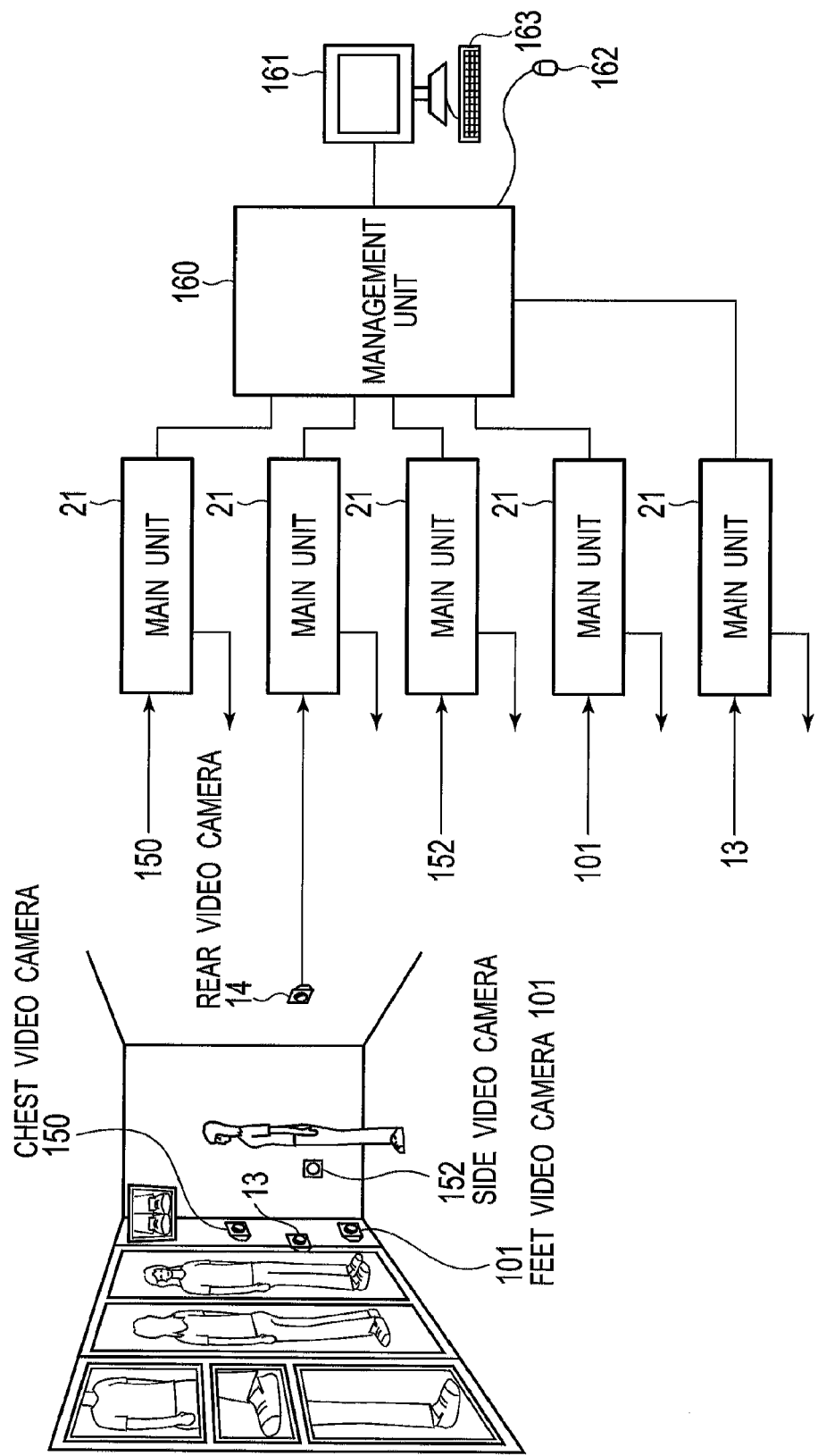
[FIG. 52]

In addition, as shown in FIG. 52, a plurality of the flat panel televisions is installed on the wall, and a plurality of the video cameras (the feet video camera 101, a side video camera 152, a chest video camera 150, the front video camera 13, the rear video camera 14, and so on) is arranged to display the images recorded by each video camera on the corresponded flat panel television. That is, the electronic mirroring system comprises the main unit 21 for inputting the image from the chest video camera, the main unit 21 for inputting the image from the rear video camera, the main unit 21 for inputting the image from the side video camera, and the main unit 21 for inputting the image from the feet video camera. Then, a management unit 160 (connected a mouse 162, a keyboard 163, and a monitor 161) manages the main units. The main units may do a designated operation by the instruction from the management unit 160.

Figure 53:
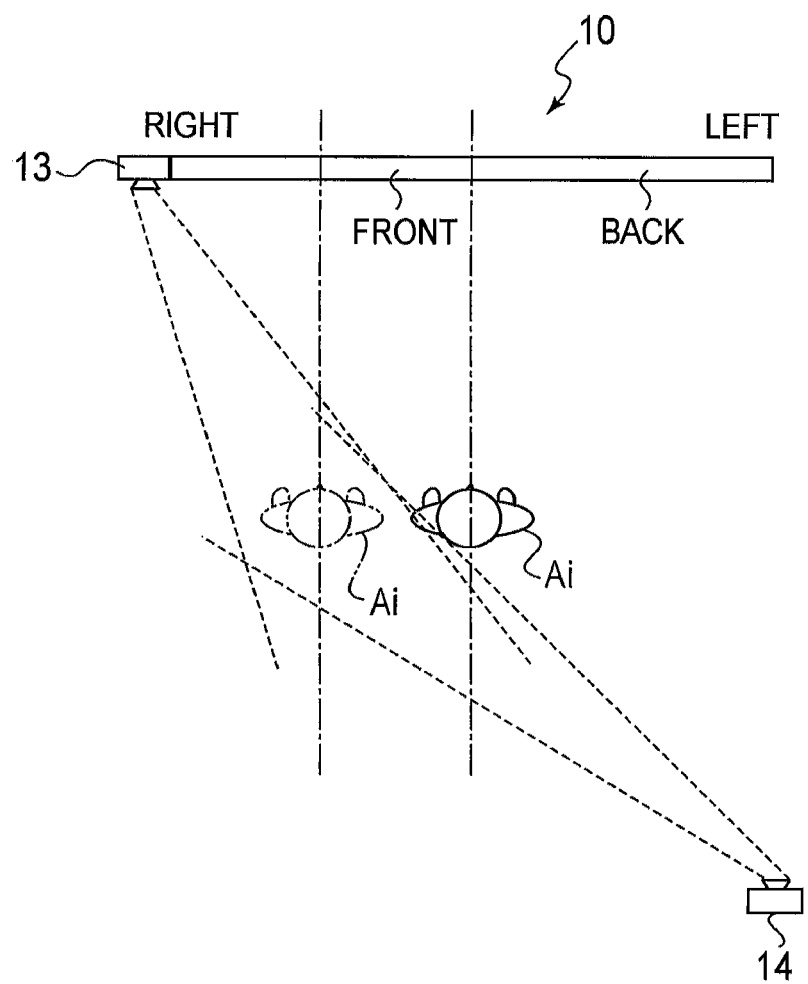
[FIG.53]

The front video camera 13 and the rear video camera 14 may be set on a platform (not shown). As shown in FIG. 53, the subject Ai may stand at the center of the area displaying the front image when the front image is displayed on the right side in the front and back images mode.

If the subject moves away from the center of the display, the front image and the back image are out of the ranges for both images.

To avoid such situation, as shown in FIG. 53, the wide-angle control signal generating unit 47*c* moves the platforms for the front video camera 13 and the rear video camera 14 horizontally when the wide-angle control signal is sent in the front and back images mode.

In other words, the wide-angle control signal generating unit 47*c* generates the control signal to move the optical axis to the central axis of the area displaying the front image and one meter from the display, for instance.

As a result, even if the subject moves toward the area displaying the front image, the front and back images are displayed in the display of 1080 pixels by 1920 pixels at the same time.

Either of the back image or the front image may be displayed in small size, or be displayed at the upper part or the lower part, or be displayed diagonally.

Moreover, another front video camera (540 by 1920) may be arranged at the same position of the front video camera 13 (1080 by 1920), and also another rear video camera (540 by 1920) may be arranged at the same position of the rear video camera 14 (1080 by 1920). Then, the images is able to be outputted to the front and back images storing unit 52 without processing by the front image area extracting unit 50 and the back image area extracting unit 51.

The front still image ZMhi and the back still image ZBhi memorized in the memory 85, the front still image Mhi memorized in the memory 78, the back still image Bhi memorized in the memory 79, the thumbnail image and the image on the comparison area are stored in other memories (not shown) by relating to the date, the time, the name of the user, and the name of the staffs. When the date, the time, and the name of the user (user code) are inputted, the front still image ZMhi, the back still image ZBhi, the front still image Mhi, the back still image Bhi, the thumbnail image and the image on the comparison area stored in the memories mentioned above are read by a reading unit (not shown), then the image is printed out by a printing device (or a printer) (not shown).

Although the units of each means according to the present invention in the embodiments are described below as an example, the units of each means are not limited by the following description. The method having the processes executed by each means is also included in the present invention.

A first means comprises the front video capture 34 and the front image buffer memory 36.

A second means comprises the back video capture 35 and the back image buffer memory 37.

A third means comprises the display image selecting unit 47, the image storing unit 48, the image display memory 49a, and the image outputting unit 57.

A fourth means comprises the image/button transition management unit 45, the display image selecting unit 47, and the wide-angle control signal generating unit 47c.

A fifth means corresponds to the front image area extracting unit 50, and a sixth means corresponds to the back image area extracting unit 51.

A seventh means comprises the front image area extracting unit 50, the front and back images storing unit 52, and the image outputting unit 57.

A eighth means comprises the back image area extracting unit 51, the front and back images storing unit 52, and the image outputting unit 57.

A ninth means, a tenth means, and a eleventh means comprise the front image area extracting unit 50 and the front and back images storing unit 52 respectively.

The twelfth means corresponds to the third image/button transition management unit 70.

A thirteenth means comprises the front and back images stilling unit 72a, the front and back images storing unit 52, the back image area extracting unit 51, and the image outputting unit 57.

A fourteenth means comprises the front and back images stock unit 72b and the front and back images stock memory 82.

A fifteenth means comprises the front and back images stock unit 72b, the front and back images stock area storing unit 90, the back image area extracting unit 51, and the image outputting unit 57.

A sixteenth means comprises the front and back images stock unit 72b, the front and back images stock area storing unit 90, the stock area display memory 49d, and the image outputting unit 57.

A seventeenth means corresponds to the comparison area creating process 72fd, an eighteenth means corresponds to the back image comparison process 72fc, and a nineteenth means corresponds to the video capture 71.

A twentieth means comprises the display image selecting unit 47, the part image storing unit 103, the part image display memory 49e, and the image outputting unit 57.

A twenty-first means, a twenty-second means, and a twenty-third means comprise the part image storing unit 103 and the part image/button management unit 104.

A twenty-fourth means corresponds to the moving image stock/comparison unit 131 shown in FIG. 47.

A twenty-fifth means comprises the moving image stock/comparison unit 131, the front and back images storing unit 52, the image display memory 49a, and the image outputting unit 57.

A twenty-sixth means and a twenty-seventh means correspond to the wide-angle control signal generating unit 47c.

A twenty-eighth means comprises the front slimming unit 39 and the back slimming unit 40.

A twenty-ninth means corresponds to the glare eliminator 53 shown in FIG. 7.

The invention claimed is:

1. An electronic mirroring system for interlockingly simultaneously displaying images of a person as a subject taken from multiple directions, the electronic mirroring system comprising:
a mirroring unit including a display of i pixels in length by m pixels in width and a touch panel provided on the display, the mirroring unit being arranged in front of the subject;
a front video camera having a CCD of i pixels in length by m pixels in width and a wide-angle control for widening a view angle and being arranged on a side of the mirroring unit for taking a front image of the subject, the front video camera being configured to output a frame of an image taken without the wide-angle control as a first front image and another frame of an image taken with the wide-angle control as a second front image;
a rear video camera having a CCD of i pixels in length by m pixels in width and a wide-angle control for widening a view angle and being arranged behind the subject for taking a back image of the subject, the rear video camera being configured to output a frame of an image taken without the wide-angle control as a first back image and another frame of an image taken with the wide-angle control as a second back image;
a first unit configured to capture the first front image or the second front image outputted from the front video camera;
a second unit configured to capture the first back image or the second back image outputted from the rear video camera;
a third unit configured to output the first front image to the mirroring unit and display only the first front image on the display while stopping input of the first back image or the second back image;
an instruction reception unit configured to receive from a user an instruction for changing display from single display of the front image or the back image to simultaneous display of the front image and the back image;
a fourth unit configured to send a wide-angle control signal to the front video camera and the rear video camera in order to widen view angles while canceling the stopping of the input by the third unit in response to the instruction from the instruction reception unit for the simultaneous display;
a fifth unit configured to extract an image of a first range including the subject therein from the second front image and output the extracted image as an extracted front image in response to the instruction for the simultaneous display after the fourth unit sends the wide-angle control signal;
a sixth unit configured to extract an image of a second range including a back of the subject therein from the second back image and output the extracted image as an extracted back image in response to the instruction for the simultaneous display after the fourth unit sends the wide-angle control signal;
a seventh unit configured to change the extracted front image outputted from the fifth unit to a size of e pixels in length by h pixels in width smaller than the size of i pixels in length by m pixels in width of the display and display the changed image as a mirroring front image on a first area in the display; and an eighth unit configured to change the extracted back image outputted from the sixth unit to a size of r pixels in length by s pixels in width smaller than the size of i pixels in length by m pixels in width of the display and display the changed image as a mirroring back image on a second area different from the first area in the display along with the mirroring front image in the display.

2. The electronic mirroring system according to claim 1, further comprising a ninth unit configured to set an about half area of the display of i pixels in length by m pixels in width as the first area and another about half area of the display of i pixels in length by m pixels in width as the second area for displaying the mirroring front image and the mirroring back image in a same size.

3. The electronic mirroring system according to claim 1, further comprising a tenth unit configured to set the size of r pixels in length by s pixels in width smaller than the size of e pixels in length by h pixels in width for simultaneously displaying the mirroring back image smaller than the mirroring front image.

4. The electronic mirroring system according to claim 1, further comprising an eleventh unit configured to set the size of e pixels in length by h pixels in width smaller than the size of r pixels in length by s pixels in width for simultaneously displaying the mirroring front image smaller than the mirroring back image.

5. The electronic mirroring system according to claim 1, further comprising:
  a twelfth unit configured to create a stock area on a side of the display;
  a thirteenth unit configured to display still images simultaneously taken from the mirroring front image and the mirroring back image on the display in response to a record instruction when the mirroring front image and the mirroring back image are being displayed on the display;
  a fourteenth unit configured to store the still image of the mirroring front image and the still image of the mirroring back image being displayed in an image stock memory with linking each other in response to a stock instruction when the still images of the mirroring front image and the mirroring back image are being displayed on the display;
  a fifteenth unit configured to reduce only the still image of the mirroring front image read from the image stock memory and display the reduced image as a selectable stock image on the stock area; and
  a sixteenth unit configured to, upon every selection of stock images, change the still image of the mirroring front image of a selected stock image to the size of e pixels in length by h pixels in width, change the still image of the mirroring back image linked with the still image of the mirroring front image of the selected stock image to the size of r pixels in length by s pixels in width, and display both the still images as changed on the display.

6. The electronic mirroring system according to claim 5, further comprising:
  a seventeenth unit configured to display a comparison area having frames on the display in response to a comparison instruction; and
  an eighteenth unit configured to, upon every selection of stock images being displayed on the stock area, display a selected stock image by enlarging in a first frame of the comparison area, and display the still image of the mirroring back image linked with the still image of the mirroring back image of the selected stock image read from the image stock memory by enlarging in a second frame adjacent to the first frame.

7. The electronic mirroring system according to claim 5, further comprising:
  a part video camera for taking an image of a part of the subject;
  a nineteenth unit configured to capture a part image outputted from the part video camera;
  a twentieth unit configured to display the captured part image on the display;
  a twenty-first unit configured to display a still image taken from the part image in response to a record instruction;
  a twenty-second unit configured to store the still image of the part image being displayed linked to the mirroring front image and the mirroring back image in the image stock memory in response to the stock instruction when the still image of the part image is being displayed; and
  a twenty-third unit configured to, upon selection of the stock image, display the part image with at least one of the still image of the mirroring front image and the still image of the mirroring back image linked to the still image of the part image on the display.

8. The electronic mirroring system according to claim 1, further comprising:
  a twenty-fourth unit configured to store at least one of the mirroring front image and the mirroring back image for a prescribed period in a moving image memory; and
  a twenty-fifth unit configured to, upon simultaneous display of a front image and a back image of the subject, change the mirroring front image stored in the moving image memory to the size of e pixels in length by h pixels in width while changing the mirroring back image stored in the moving image memory to the size of r pixels in length by s pixels in width, and display both the changed images on the display, and, upon display of one of the mirroring front image and the mirroring back image of the subject, change one of the mirroring front image and the mirroring back image stored in the moving image memory within the size of i pixels in length by m pixels in width and display the changed image on the display.

9. The electronic mirroring system according to claim 1, further comprising:
  a first platform and a second platform configured to rotatably support the front video camera and the rear video camera respectively, the first platform and a second platform being movable horizontally;
  a twenty-sixth unit configured to, upon simultaneous display of a front image and a back image of the subject, send a first platform control signal in order to move the first platform so that a central optical axis of the front video camera coincides with a vertical central axis of an area of the display for the front image; and
  a twenty-seventh unit configured to, upon simultaneous display of the front image and the back image of the subject, send a second platform control signal in order to move the second platform so that a central optical axis of the back video camera coincides with a vertical central axis of another area of the display for the back image.

10. The electronic mirroring system according to claim 1, further comprising a twenty-eighth unit configured to slim the first front image and the first back image by reducing transversely.

11. The electronic mirroring system according to claim 1, further comprising a twenty-ninth unit configured to eliminate a glare from the first back image.

12. The electronic mirroring system according to claim 1, wherein the display of the mirroring unit is a flat panel television placed vertically or horizontally.

13. A non-transitory computer-readable recording medium storing a program to be executed by a computer in an electronic mirroring system including
- a mirroring unit including a display of i pixels in length by m pixels in width and a touch panel provided on the display, the mirroring unit being arranged in front of the subject,
- a front video camera having a CCD of i pixels in length by m pixels in width and a wide-angle control for widening a view angle and being arranged on a side of the mirroring unit for taking a front image of the subject, the front video camera being configured to output a frame of an image taken without the wide-angle control as a first front image and another frame of an image taken with the wide-angle control as a second front image, and
- a rear video camera having a CCD of i pixels in length by m pixels in width and a wide-angle control for widening a view angle and being arranged behind the subject for taking a back image of the subject, the rear video camera being configured to output a frame of an image taken without the wide-angle control as a first back image and another frame of an image taken with the wide-angle control as a second back image, the stored program which causes a computer to perform the steps of:
- (a) storing the first front image or the second front image outputted from the front video camera in a first memory;
- (b) storing the first back image or the second back image outputted from the back video camera in a second memory;
- (c) outputting the first front image to the mirroring unit and displaying the first front image on the display while stopping an input of the first back image or the second back image;
- (d) receiving from a user an instruction, via an instruction reception unit, for changing display from single display of the front image or the back image to simultaneous display of the front image and the back image;
- (e) sending a wide-angle control signal to the front video camera and the rear video camera in order to widen view angles while canceling the stopping of the input in the step (c) in response to the instruction from the instruction reception unit for the simultaneous display;
- (f) extracting an image of a first range including the subject therein from the second front image and outputting the extracted image as an extracted front image in response to the instruction for the simultaneous display;
- (g) extracting an image of a second range including the back of the subject therein from the second back image and outputting the extracted image as an extracted back image in response to the instruction for interlocking display;
- (h) changing the extracted front image outputted in the step (f) to a size of e pixels in length by h pixels in width smaller than the size of i pixels in length by m pixels in width of the display and displaying the changed image as a mirroring front image on a first area in the display; and
- (i) changing the extracted back image outputted in the step (g) to a size of r pixels in length by s pixels in width smaller than the size of i pixels in length by m pixels in width of the display and displaying the changed image as a mirroring back image on a second area different from the first area in the display along with the mirroring front image in the display.

14. The non-transitory computer-readable recording medium storing a program according to claim 13, the stored program which causes a computer to perform further steps of:
- (j) creating a stock area on a side of the display;
- (k) displaying still images simultaneously taken from the mirroring front image and the mirroring back image on the display in response to a record instruction when the mirroring front image and the mirroring back image are being displayed on the display;
- (l) storing the still image of the mirroring front image and the still image of the mirroring back image being displayed in an image stock memory with linking each other in response to a stock instruction when the still images of the mirroring front image and the mirroring back image are being displayed on the display;
- (m) reducing only the still image of the mirroring front image read from the image stock memory and displaying the reduced image as a selectable stock image on the stock area;
- (n) upon every selection of stock images, changing the still image of the mirroring front image of a selected stock image to the size of e pixels in length by h pixels in width, changing the still image of the mirroring back image linked with the still image of the mirroring front image of the selected stock image to the size of r pixels in length by s pixels in width, and displaying both the still images as changed on the display;
- (o) displaying a comparison area having frames on the display in response to a comparison instruction; and
- (p) upon every selection of stock images being displayed on the stock area, displaying a selected stock image by enlarging in a first frame of the comparison area, and displaying the still image of the mirroring back image linked with the still image of the mirroring front image of the selected stock image read from the image stock memory by enlarging in a second frame adjacent to the first frame.

15. A method for an electronic mirroring system including
- a mirroring unit including a display of i pixels in length by m pixels in width and a touch panel provided on the display, the mirroring unit being arranged in front of the subject,
- a front video camera having a CCD of i pixels in length by m pixels in width and a wide-angle control for widening a view angle and being arranged on a side of the mirroring unit for taking a front image of the subject, the front video camera being configured to output a frame of an image taken without the wide-angle control as a first front image and another frame of an image taken with the wide-angle control as a second front image, and
- a rear video camera having a CCD of i pixels in length by m pixels in width and a wide-angle control for widening a view angle and being arranged behind the subject for taking a back image of the subject, the rear video camera being configured to output a frame of an image taken without the wide-angle control as a first back image and another frame of an image taken with the wide-angle control as a second back image, the method comprising:
- capturing the first front image or the second front image outputted from the front video camera;
- capturing the first back image or the second back image outputted from the back video camera;

outputting the first front image to the mirroring unit and displaying only the first front image on the display while stopping input of the first back image or the second back image;

receiving an instruction from a user through an instruction reception unit for changing display from single display of the first front image or the first back image to simultaneous display of the front image and the back image;

sending a wide-angle control signal to the front video camera and the rear video camera in order to widen view angles while canceling the stopping of the input in response to the instruction from the instruction reception unit for the simultaneous display;

extracting an image of a first range including the subject therein from the second front image and outputting the extracted image as an extracted front image in response to the instruction for the simultaneous display;

extracting an image of a second range including the back of the subject therein from the second back image and outputting the extracted image as an extracted back image in response to the instruction for simultaneous display;

changing the extracted front image as outputted to a size of e pixels in length by h pixels in width smaller than the size of i pixels in length by m pixels in width of the display and displaying the changed image as a mirroring front image on a first area in the display; and changing the extracted back image as outputted to a size of r pixels in length by s pixels in width smaller than the size of i pixels in length by m pixels in width of the display and displaying the changed image as a mirroring back image on a second area different from the first area in the display along with the mirroring front image in the display.

* * * * *